US012556522B2

(12) United States Patent
Autry et al.

(10) Patent No.: US 12,556,522 B2
(45) Date of Patent: Feb. 17, 2026

(54) APPARATUS AND METHODS FOR ENCRYPTED COMMUNICATION

(71) Applicant: Iothic Ltd, Essex (GB)

(72) Inventors: Christopher Patrick Autry, Essex (GB); Mykhailo Magal, Essex (GB)

(73) Assignee: Iothic Ltd, Essex (GB)

( * ) Notice: Subject to any disclaimer, the term of this patent is extended or adjusted under 35 U.S.C. 154(b) by 134 days.

(21) Appl. No.: 17/783,920

(22) PCT Filed: Dec. 11, 2020

(86) PCT No.: PCT/GB2020/053184
§ 371 (c)(1),
(2) Date: Jun. 9, 2022

(87) PCT Pub. No.: WO2021/116700
PCT Pub. Date: Jun. 17, 2021

(65) Prior Publication Data
US 2023/0045486 A1 Feb. 9, 2023

(30) Foreign Application Priority Data
Dec. 13, 2019 (GB) ..................... 1918419

(51) Int. Cl.
*H04L 9/40* (2022.01)
*H04L 9/08* (2006.01)
(Continued)

(52) U.S. Cl.
CPC ........ *H04L 63/0428* (2013.01); *H04L 9/0819* (2013.01); *H04L 9/0866* (2013.01);
(Continued)

(58) Field of Classification Search
CPC ... H04L 9/0819; H04L 9/0866; H04L 9/0869; H04L 9/14; H04L 9/321; H04L 63/0428; H04L 9/088; H04L 9/0816; H04L 9/0861
See application file for complete search history.

(56) References Cited

U.S. PATENT DOCUMENTS 7,234,058 B1 * 6/2007 Baugher ............... H04L 9/0833
713/168
8,316,237 B1 * 11/2012 Felsher ................. H04L 63/061
380/282
(Continued)

FOREIGN PATENT DOCUMENTS

CN 110048829 B * 9/2019
CN 112448808 A * 3/2021 ......... H04L 63/0428
(Continued)

OTHER PUBLICATIONS

Khan Academy Labs, "Diffie Hellman Key Exchange part 2", Apr. 28, 2014, https://web.archive.org/web/20161010211457/https://www.youtube.com/watch?v=M-0qt6tdHzk (Year: 2014).*
(Continued)

*Primary Examiner* — William S Powers
(74) *Attorney, Agent, or Firm* — Jordan IP Law, LLC

(57) ABSTRACT

A communication system including a first device and a second device. The first device comprises a memory storing first-device-specific identification data and the second device comprises a memory storing second-device-specific identification data. The first device is configured to receive a copy of the second-device-specific identification data and to store the copy in the memory of the first device and the second device is configured to receive a copy of the first-device-specific identification data and to store the copy in the memory of the second device. The first device is configured to derive a first encryption key from the first-device-specific identification data and the received copy of
(Continued)

the second-device-specific identification data. The second device is configured to derive the first encryption key from the second-device-specific identification data and the received copy of the first-device-specific identification data. The first device encrypts transmission data using the first encryption key and transmits the encrypted transmission data to the second device. The second device receives the encrypted transmission data from the first device and decrypts the encrypted transmission data using the first encryption key.

16 Claims, 42 Drawing Sheets

(51) Int. Cl.
*H04L 9/14* (2006.01)
*H04L 9/32* (2006.01)

(52) U.S. Cl.
CPC ............ *H04L 9/0869* (2013.01); *H04L 9/088* (2013.01); *H04L 9/14* (2013.01); *H04L 9/321* (2013.01)

(56) References Cited

U.S. PATENT DOCUMENTS

| | | | | |
|---|---|---|---|---|
| 8,738,898 | B2* | 5/2014 | Herwono | H04W 12/0431 380/247 |
| 11,601,402 | B1* | 3/2023 | Delaney | H04L 63/0823 |
| 2006/0072745 | A1* | 4/2006 | Fukaya | G06F 21/606 380/28 |
| 2006/0282662 | A1 | 12/2006 | Whitcomb | |
| 2007/0255952 | A1 | 11/2007 | Zhou | |
| 2008/0137856 | A1 | 6/2008 | Ja Beom | |
| 2008/0270794 | A1 | 10/2008 | Falk et al. | |
| 2009/0239500 | A1 | 9/2009 | Aripirala | |
| 2010/0220856 | A1* | 9/2010 | Kruys | H04L 9/321 380/270 |
| 2012/0063597 | A1 | 3/2012 | Tropp | |
| 2014/0317410 | A1* | 10/2014 | Yamaguchi | H04L 63/08 726/4 |
| 2014/0331297 | A1* | 11/2014 | Innes | H04L 63/0823 726/7 |
| 2016/0149899 | A1* | 5/2016 | Abbott | H04L 63/062 713/171 |
| 2019/0207912 | A1* | 7/2019 | Nielson | H04L 9/0877 |
| 2019/0327220 | A1* | 10/2019 | Huber | H04L 9/3268 |
| 2019/0356482 | A1* | 11/2019 | Nix | H04W 12/041 |
| 2021/0111874 | A1* | 4/2021 | Tanji | H04L 9/0866 |
| 2021/0111875 | A1* | 4/2021 | Le Saint | H04L 9/0863 |
| 2021/0209237 | A1* | 7/2021 | Gurin | H04L 9/3247 |

FOREIGN PATENT DOCUMENTS

| | | | | |
|---|---|---|---|---|
| EP | 2034659 | | 3/2009 | |
| EP | 2034659 | A2 * | 3/2009 | ........... H04L 9/0844 |
| JP | 11163850 | A | 6/1999 | |
| JP | 2005038411 | | 2/2005 | |
| JP | 2006333095 | | 12/2006 | |
| JP | 2009515448 | A | 4/2009 | |
| JP | 2014147117 | A * | 8/2014 | ............. G06F 21/10 |
| JP | 2017163612 | A * | 9/2017 | ......... H04L 63/0823 |
| JP | 2018157512 | A * | 10/2018 | |
| KR | 20180003196 | | 1/2018 | |
| WO | WO-2004100487 | A1 * | 11/2004 | ......... H04L 63/0869 |
| WO | WO-2008086567 | A1 * | 7/2008 | ............. H04L 63/08 |
| WO | 2015001600 | | 1/2015 | |
| WO | 2018/004114 | | 1/2018 | |
| WO | 2018/158564 | | 9/2018 | |
| WO | WO-2019239066 | A1 * | 12/2019 | |

OTHER PUBLICATIONS

Diffie, W. and Hellman, M. E. "New Directions in Cryptography", Nov. 1976, IEEE Transactions on Information Theory, vol. IT-22, No. 6. (Year: 1976).*
Rawat, A. S., Deshmukh, M. "Efficient Extended Diffie=Hellman Key Exchange Protocol", Sep. 27-28, 2019, 2019 International Conference on Computing, Power, and Communication Technologies (GUCON) (Year: 2019).*
HCBK: security technology for the mobile generation. (2010). University of Oxford. https://www.cs.ox.ac.uk/files/3079/HCBKBrochure.pdf.
Nguyen, L. H., & Roscoe, A. W. (2010). Authentication protocols based on low-bandwidth unspoofable channels: A comparative survey. *Journal of Computer Security*, 19(1), 139-201. https://doi.org/10.3233/jcs-2010-0403.
Roscoe, A. W. (2017). Detecting Failed Attacks on Human-Interactive Security Protocols. *Security Protocols XXIV*, 181-197. https://doi.org/10.1007/978-3-319-62033-6.
Xu et al., "Secure Transfer Protocol Between App and Device of Internet of Things," Lecture Notes in Computer Science, vol. 10658. Springer, pp. 25-34. 2017.

* cited by examiner

Fig. 6a

| code module | produced event | AAP milestone | A | B | P | DWP milestone | A | B | P | ARW milestone | A | B | P |
|---|---|---|---|---|---|---|---|---|---|---|---|---|---|
| 401 Asset discovery | List of assets, which can assist in obtaining asset settings, is created | | | | | + | | | | | | | |
| 402 Asset nomination | Asset nominated for contact | | | | | | + | | | | | | |
| 403 Asset selection | Asset discovery accomplished | | | | | | + | | | | | | |
| 404 New asset handshake | Received the trigger to initiate a communication cell | | | | | + | + | | | + | + | | |
| | | | + | + | | | | | | | | | |
| 405 Proxy discovery | List of online proxy is created | | + | | | | + | | | | | + | |
| 406 Proxy nomination | Asset is nominated for proxy service | | | + | | | | + | | | | | + |
| 407 Proxy selection | Proxy has been chosen and connected to | | | | | + | | | | + | | | |
| | | | | + | | | | | | | | | |
| 408 Proxy handshake | Trigger to generate symmetric keys | | + | + | | | + | + | | | + | + | |
| 409 Key provisioning | Symmetric keys received | | + | + | + | | + | + | + | | + | + | + |

Fig. 6a (Cont.)

| process block | description | start case | trigger | outcome |
|---|---|---|---|---|
| peer discovery | New asset seeks opportunities to initiate a connection with an established peer | New device arrived form factory and is physically installed on LAN | Device is on, no PS available | Found IP of the peers, which might be interested in data from/data supply to the device |
| peer discovery | An established asset offers new asset the opportunity to connect | New device arrived form factory and is physically installed on LAN | Detected PEER_PROBE request | Sends connection & utility data with PEER_PROBE_REPLY or skips if MID of the requesting party is not whitelisted |
| peer discovery | Asset chooses an established peer for provisioning assistance | Asset nomination produced an non-empty list of peers, who would accept new asset connection | Asset discovery timeout, or full theater event | A peer to contact with is selected. It is referred by IP or UID |
| handshake | asset requests connection to a peer | a communication is required | no established/valid connection present | Public Key is disclosed along with AUTH_PROBE command and multiple parameters of the requesting asset |
| | | | | Additional parameters: a list of assets, which know the recent ASD of the asset A |
| handshake | The asset, which is being asked for connection to, seeks proxies available online | Found no entries in the online assets list, and the AWP to entries in the list of preferred proxy were not successful | there is no authenticated link to potential proxy | List of potential proxies with their proxy election values and their markers, which indicate availability of an established connection to backend |
| handshake | An asset offers opportunity to use it as proxy | Proxy discovery process is in progress | Detected PROXY_PROBE request | Proxy candidate sends actual proxy election value and indicates availability of connection to backend along with PROXY_PROBE_REPLY |
| handshake | The asset, which is being asked for connection to, picks appropriate proxy to establish authenticated link. It considers the list of up-to-date peers received from the asset A as a priority factor | Another asset attempts to connect | Received AUTH_PROBE | successful AAP to proxy, which has suitable communication parameters |
| handshake | asset B request proxy assistance | An asset in the B-mode has elected one proxy and proceeds with the workflow | proxy selection accomplished | AUTH_REQUEST, along with Public key for asset A, its address (shortened to HID, if in DWP) and its other parameters |
| handshake | Proxy generates symmetric keys for authentication session and passes them to the assets in the actual communication cell | proxy handshake received | AUTH_REQUEST | assets receive PROXY_AUTH_REPLY and store: • one key for proxy; • one key for another asset in the current communication cell proxy receives two replies: KEYS_RECEIVED |

Fig. 6b

| Ref | Step | Description | | | | | | | | | | | |
|---|---|---|---|---|---|---|---|---|---|---|---|---|---|
| 410 | Identity check | Identity of the asset is proven | | | | | | + | + | | | | |
| 411 | Setup provisioning | Configuration is uploaded to the asset | | | | | | + | + | | | | |
| 412 | System check | System compatibility checked | + | + | | + | + | | | + | + | | |
| 413 | Peer settings exchange | Asset settings are exchanged within the communication cell | | | | M1 | + | + | + | | | | |
| 414 | ASD calculation | a. Local ASD is calculated from scratch | + | + | + | | | + | + | | + | + | + |
| | | b. Historical ASD is applied | + | + | | | | | | | | | |
| 415 | Commitment value calculation | Commitment value is derived from the universe and ASD values | + | + | + | | | + | + | | + | + | + |
| 416 | Commitment value exchange | Commitment values are exchanged within the communication cell | + | + | + | M2 | | + | + | | + | + | + |

Fig. 6b (Cont.)

| | | | | |
|---|---|---|---|---|
| DWP identity check | Preliminary proof for authenticity of the connecting asset and the responding backend. Prevents impose & replay attacks | After successful handshake in DWP | KEYS_RECEIVED from both assets | Proof that the backend does have an entry for S/N of new asset. Proof that the asset does have a valid S/N; |
| provisioning | Digital twin upload, the asset gets its full native address. Backend sends encrypted data to proxy, proxy forwards it encrypted further. Proxy is additionally informed by backend about expected ASD of the asset A | After successful identity check in DWP | for asset: ASSET_SN_REPLY is correct for proxy: PROP_REQUEST | asset A: New asset receives a copy of its digital twin. VID, CID are passed over; Asset B: gets informed about asset A full address Proxy: receives and temporarily stores ASD-A, receives confirmation PROP_RECEIVED |
| provisioning | Asset's system compatibility is being checked | After successful handshake or in DWP after initial provisioning | KEYS_RECEIVED or PROP_RECEIVED | M1; volatile and tunable system values Xv and Xn do match across different assets; |
| provisioning | All peers exchange their settings in form of partition hashes, each fits into one network package. (the network package is symmetric key encrypted) | asset A has received settings and they are suitable for the present communication cell interaction | For asset A and P system proof was successful, or for asset B PROP_PARTS received from a peer within the communication cell | M1; asset's properties exchanged; PROP_RECEIVED |
| commitment calculation | Each asset calculates and submits its digest of settings | begin an authentication routine | DWP: PROP_RECEIVED from 2 participating assets; other workflows • asset A and asset P: system check passed; • asset B: CA and CP received | proper local ASD is ready to use |
| | Asset A or B may use a historical value once instead of calculation | | all of the case a, and: Asset has an updated ASD, its record shows that the peer has an outdated ASD | |
| commitment calculation | ASD is salted by a random one-time reverse-resistant secret key as well as by universe values | after ASD calculation | ASD has been calculated/ extracted from historical lists | A digest for salted local settings (commitment value) is available on each peer |
| commitment calculation | each asset in the communication cell receives a copy of commitment value from every peer | listening for commitment value begins with the start of authentication routine (process 14) | | M2; All assets have commitment values for all three peers in the communication cell (i.e. local and remote digests) |
| | each asset informs the peers about its current commitment value | sending of the commitment value appends the process 15 | | |

Fig. 6c

| # | Name | Description | | | | | | | | | | | | | |
|---|---|---|---|---|---|---|---|---|---|---|---|---|---|---|---|
| 417 | Secret key exchange | Secret keys (nonce) received | | | + | + | + | M3 | + | + | + | | + | + | + |
| 418 | ASD exchange | Setting digests are exchanged | | | | | | | + | + | + | | | | |
| 419 | ASD comparison & store | ASD is stored in nonvolatile memory | | | | | | | + | + | + | | | | |
| | | | | | | | | | | + | | | | | |
| 420 | Commitment value comparison | Commitment values do match locally | | | + | + | + | M4 | + | + | + | | + | + | + |
| 421 | Commitment values report | Recalculated commitment values are received by proxy | | | + | + | | | + | + | | | + | + | |
| 422 | Commitment values check | Commitment values in the communication cell do match | | | | | + | | | | + | | | | + |

Fig. 6c (Cont.)

| | | | | |
|---|---|---|---|---|
| commitment calculation | 3 participating assets receive the salt (nonce) of their counterparts | After successful process 16, the asset sends its secret key to two counterparts | Received C value form two participating assets | M3; counterparts' SECRET (secret key) are received |
| provisioning | Each asset calculates and submits its digest of settings to two other peers in the communication cell | before checking commitment values | SECRET value from two peers have been received | ASD's from two counterparts are locally available |
| checking commitment | Recalculate peer's ASD from the recently received peer setting partition hashes (obtained in process 13) Compare the ASD with the received ASD (obtained in process 18) | After successful ASD exchange | Received ASD from 2 assets which participate in the communication cell | counterpart's ASD are recalculated and their match with the received versions of ASD is ensured; Partition hashes are removed, the corresponding ASDs are stored |
| | additionally: Compare ASD-A received from asset A with the ASD-A received from backend | | Received BACKEND_PROP_REPLY from backend | ASD-A-asset matches ASD-A-backend |
| checking commitment | Recalculate commitment values for two peers, while using locally stored peer ASDs Prove that the calculated commitment values are identical to the received commitment values | (DWP) after successful process 19 (other workflows) after successful commitment calculation - process 17 | ASD comparison is successful Received SECRET (secret key) form 2 participating assets | M4; counterpart's commitment values are recalculated and their match with the received versions of commitment values is ensured |
| checking commitment | Assets of the communication cell supply locally recalculated commitment value sets to the proxy. The sets contain own and peer values. Own commitment value is calculated from settings. The peer's commitment values are calculated from ASD | After successful local comparison of commitment values - process 20 | | proxy replied with OMEGA |
| checking commitment | Proxy ensures that all recalculated and received commitment values do match and, thus all units had been identically supplied with peer's ASD, while peer's settings have not been changed | Peers have no mismatch and have both reported to proxy | Received sets of commitment values CA, CB, CP from other two assets | Proxy ensures that: -Its own commitment value -The commitment values for all participating assets (recalculated by the proxy),- do match. It ensures the commitment values that every participating asset has recalculated for their counterparts and has submitted to the proxy in fact do match. That is the proxy ensures that all recalculated by assets and proxy commitment values match |

Fig. 6d

| | | | | | | | | | | | | | | |
|---|---|---|---|---|---|---|---|---|---|---|---|---|---|---|
| 423 Omega calculation | Omega calculated | | | | + | M5 | | | + | | | | | + |
| 424 Omega check | Omega received and checked | | | + | + | M5 | + | + | | | + | + | | |
| 425 Milestones check | Milestones checked | | | + | + | | + | + | | | + | + | | |
| 426 Setup provisioning | Configuration provisioned | | | | | | | | | | | + | | + |
| 427 System check | System compatibility checked | | | | | | | | | | | + | | + |
| 428 Peer settings exchange | Peer settings are exchanged | | | | | | | | | | | + | + | + |
| 429 ASD update | Asset A informs about recent configuration change | | + | | | | | | | | | | | |

Fig. 6d (Cont.)

| | | | | |
|---|---|---|---|---|
| final digest | The asset exchanges digest of the concatenated ASD with its two peers. The ASD for all three assets, which participate in the communication cell, are considered | proxy initiates OMEGA exchange after successful provisioning and commitment values check<br><br>asset A stores newly received settings in permanent memory | all commitment values did match, or... | M5; The proxy sends its OMEGA to the two peers in the communication cell |
| final digest | The assets recalculate OMEGA from locally stored ASDs and check if they match the one from proxy | | Received OMEGA_P | M5; the local OMEGA matches the one from proxy |
| final digest | The asset proves that all milestones M1-M5 have been executed. Sends the result to proxy | after successful OMEGA comparison | Proxy OMEGA equals asset's OMEGA | The assets confirm to proxy that OMEGA values match |
| provisioning | identical to module #11<br><br>Digital twin upload, the asset gets an update for native address. Backend sends encrypted data to proxy, proxy forwards it encrypted further<br><br>Proxy is additionally informed by backend about expected ASD of the asset A | in ARW after successful authentication - process 25 | for asset: OMEGA matched for proxy: PROP_REQUEST | asset A: New asset receives a copy of its digital twin. VID, CID are passed over;<br><br>Asset B:<br>gets informed about asset A full address<br><br>Proxy: receives and temporarily stores ASD-A, receives confirmation PROP_RECEIVED |
| provisioning | identical to module #12<br>Asset's system compatibility is being checked | in ARW after reception of settings | PROP_SUPPLIED or PROP_RECEIVED | volatile and tunable system values Xv and Xn do match across different assets; |
| provisioning | identical to module #13<br><br>All peers exchange their settings in form of partition hashes, each fits into one network package | asset A has received settings and they are suitable for the present communication cell interaction | For asset A and P system proof was successful, or for asset B PROP_PARTS received from a peer within the communication cell | assets' properties exchanged; PROP_RECEIVED |
| provisioning | similar (shorter) to peer settings exchange - module #13, module #28<br><br>asset reports that it has an updated ASD: One asset sends new partition hashes to its peers for ASD calculation | authentication with old ASD have been successful. The initiating asset (either A or B, here A) has an updated ASD (as it would be viewed by the receiving asset, here B), the proxy could confirm the recent ASD, i.e. is in the list of informed assets | • Proxy OMEGA is received<br>• it equals asset's OMEGA<br>• there is an updated ASD<br>• For initiating asset: system check was successful. For the receiving asset and proxy: PROP_PARTS received from a peer within the communication cell<br>• initiation asset's records for proxy indicate that it can use the updated ASD | ASD_UPDATE is sent along with the most recent ASD value |

Fig. 6e

| # | Name | Description | C1 | C2 | C3 | C4 | C5 | C6 | C7 | C8 | C9 | C10 | C11 | C12 | C13 |
|---|---|---|---|---|---|---|---|---|---|---|---|---|---|---|---|
| 430 | ASD inquire | | | | | + | | | | | | | | | |
| 431 | ASD report | | | | | | + | | | | | | | | |
| 432 | ASD proof | The two ASD values are compared and match. ASD for the asset A is updated | | | | + | | | | | | | | | |
| 433 | ASD calculation | Local ASD is calculated from scratch | | | + | + | + | | | | | | + | + | + |
| 434 | Commitment value calculation | Commitment value is derived from the universe and ASD values | | | + | + | + | | | | | | + | + | + |
| 435 | Commitment value exchange | Commitment values are exchanged within the communication cell | | | + | + | + | | | | | | + | + | + |
| 436 | ASD exchange | Settings digests are exchanged | | | | | | | | | | | + | + | + |
| 437 | ASD comparison & store | Asset settings digest is stored in nonvolatile memory | | | | + | | | | | | | + | + | + |
| | | | | | | | | | | | | | | | + |

Fig. 6e (Cont.)

| | | | | |
|---|---|---|---|---|
| ASD check | The receiving asset (here B) inquires ASD for the initiating asset at proxy | Peer sends update instead of milestones check that would result in a distribution of session keys | ASD_UPDATE | ASD_UPDATE_CHECK |
| ASD check | proxy responds with the most recent init asset ASD | one of the communication cell assets inquires recent ASD for the peer | ASD_UPDATE_CHECK | ASD_REPLY |
| ASD check | The value received from proxy (ASD) is compared to the value calculated on the basis of data received from asset A (partition hashes) | proxy responded with the most recent ASD known | ASD REPLY | next process |
| commitment calculation | identical to module #14a Each asset calculates and submits its digest of settings | begin an authentication routing with all recent ASD | (ARW) peer settings are exchanged (AAP) • receiving asset : ASD proof passed successfully • other assets: commitment value from receiving asset (module #35) received | proper local ASD is ready to use |
| commitment calculation | similar to module #5 ASD is salted by a random one-time reverse-resistant secret key as well as by universe values | | ASD has been calculated | A digest for salted local settings (commitment value) is available on each peer |
| commitment calculation | identical to module #16 Each asset in the communication cell receives a copy of commitment value from every peer | | commitment value has been calculated | All assets have commitment values for all three peers in the communication cell (i.e. local and remote digest) |
| provisioning | identical to module #18 Each asset calculates and submits its digest of settings to two other peers in the communication cell | before checking commitment values | | ASD's from two counterparts are locally available |
| checking commitment | similar to module #19 Recalculate peer's ASD from the recently received peer setting partition hashes (obtained in process 28 or 29) Compare the ASD with the received ASD (obtained in process 36) | After successful ASD exchange | ARW: Received ASD from 2 assets which participate in the communication cell AAP: Receiving asset gets ASD from initiating asset | counterpart's ASD are recalculated and their match with the received versions of ASD is ensured; Partition hashes are removed, the corresponding ASDs are stored |
| | additionally: Compare ASD-initiating received from initiating asset with the ASD-initiating received from backend | | Received BACKEND_PROP_REPLY from backend | ASD-initiating-asset matches ASD-initiating-backend |

Fig. 6f

| Ref | Label | Description | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|---|
| 438 | Commitment value comparison | Commitment values do match locally | + | + | + |   |   |   |   |   |   |   |   | + | + | + |
| 439 | Commitment values report | Recalculated commitment values are received by proxy | + | + |   |   |   |   |   |   |   |   |   | + | + |   |
| 440 | Commitment values check | Commitment values in the communication cell do match |   |   |   |   | + |   |   |   |   |   |   |   |   | + |
| 441 | omega calculation | Omega is calculated by proxy |   |   |   |   | + |   |   |   |   |   |   |   |   | + |
| 442 | omega check |   |   |   | + | + |   |   |   |   |   |   |   | + | + |   |

Fig. 6f (Cont.)

| | | | | |
|---|---|---|---|---|
| checking commitment | identical to module #20 Recalculate commitment values for two peers, while using locally stored peer ASDs. Prove that the calculated commitment values are identical to the received commitment values | after successful process 37 | ASD comparison is successful | counterpart's commitment values are recalculated and their match with the received versions of commitment value is ensured |
| checking commitment | identical to module #21 Assets of the communication cell supply locally recalculated commitment value sets to the proxy. The sets contain own and peer values. Own commitment value is calculated from settings. The peer's commitment values are calculated from ASD | After successful local comparison of commitment values - process 38 | | proxy replied with OMEGA |
| checking commitment | identical to module #22 Proxy ensures that all recalculated and received commitments values do match and, thus all units had been identically supplied with peer's ASD, while peer's settings have not been changed | Peers have no mismatch and have both reported to proxy | Received sets of commitment values CA,CB,CP from other two assets | proxy ensures that: -Its own commitment value. The commitments values for all participating assets (recalculated by the proxy),- do match. It ensures the commitment values that every participating asset has recalculated for their counterparts and has submitted to the proxy in fact do match. That is the proxy ensures that all recalculated by assets and proxy commitment values match |
| final digest | similar to module #23 The proxy produces a digest of all concatenated ASD. All means the ASD for all three assets, which participate in the communication cell. Proxy shares the result with its two peers | proxy initiates OMEGA exchange after successful provisioning and commitment values check | all commitment values did match | The proxy sends its OMEGA to the two peers in the communication cell ARW: asset A stores newly received settings in permanent memory after OMEGA reception |
| final digest | identical to module #24 The assets recalculate OMEGA from locally stored ASDs and check it the match the one from proxy | | Received OMEGA_P | the local OMEGA matches the one from proxy |

Fig. 6g

| | | | | | | | | | | | | |
|---|---|---|---|---|---|---|---|---|---|---|---|---|
| ~~check final digest~~ | not to implement | | | | + | | | | | | | + |
| 444 ASD list update | | | | + | | | | | | | | |
| 445 Milestones check | Milestones checked | | + | + | | | + | + | | | + | + |
| 446 Milestones match | Milestones check value received and match | | | | + | | | | + | | | | + |
| 447 Software installation | Provisioning accomplished | | | | | | + | | | + | | | |
| 448 Session key generation | Session keys are generated and distributed | | | | + | | | + | | | | + | |
| 449 Session start | Session keys and UAN received | | + | + | | | + | + | | | + | + | |
| 450 Session logging | Session logged | | | | + | | | + | | | | + | |

Fig. 6g (Cont.)

| | | | | |
|---|---|---|---|---|
| final digest | | | | |
| | The initiating asset updates the list of assets, which are informed about its new ASD | after confirmation of checked commitment that was calculated with the new ASD | Received OMEGA_P or passed OMEGA check | records indicate that the receiving asset is up to date (all self-values are equal to actual-values, all log-values are shifted by one entry) |
| checking milestones | The asset proves that all milestones M1-M5 have been executed. sends the result to proxy | After last final digest | Proxy OMEGA equals asset's OMEGA | AUTHENTICATED; The assets confirm to proxy that OMEGA values match |
| checking milestones | The asset proves that all its one milestones M1-M5 have been executed. The proxy checks that all results at different assets were the same | After assets report their milestones checked | AUTHENTICATED from 2 participating assets | proxy confirms that all three OMEGA are identical |
| session logging | asset launches as asset application that should install the software applications, which were specified in the settings file | all checks are passed | assets A has sent the AUTHENTICATED command | asset: new settings are applied sans asset applications; proxy received: INSTALLATION_STARTED, timestamp |
| session logging | Proxy sends the UAN and the data-session encryption keys to the peers in the communication cell | After the final milestones check | Opens data session | AES keys for data-session are generated for every participating asset based on the OMEGA value, UAN |
| session logging | Asset receives data-session encryption keys and applies them | | | Symmetric keys are available and the data exchange session is established |
| | proxy documents successful ending of the authentication process | | | |

Handshake

Secret Exchange

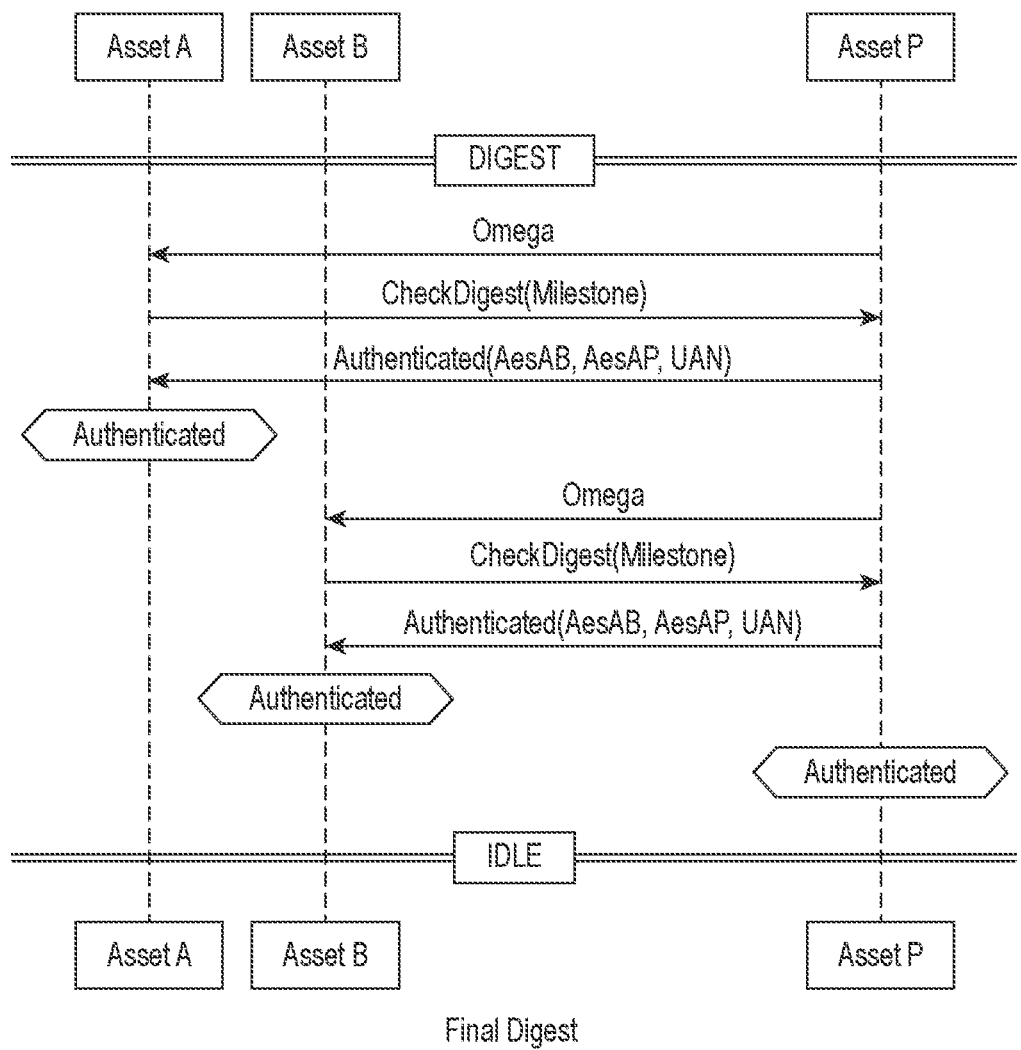

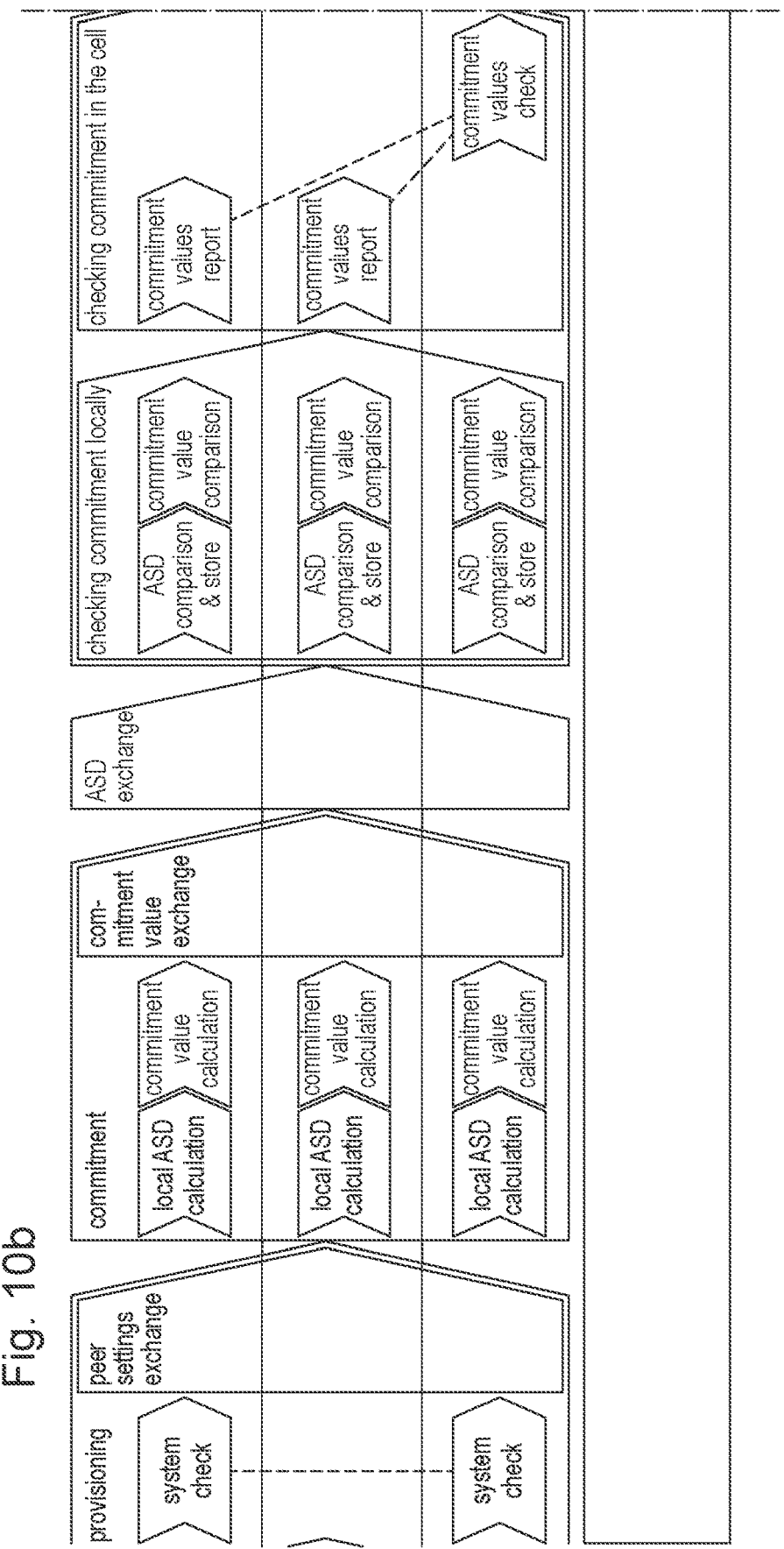

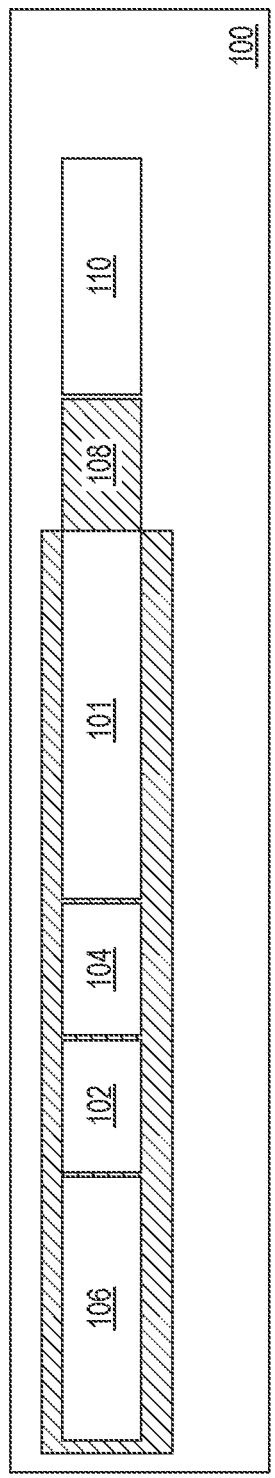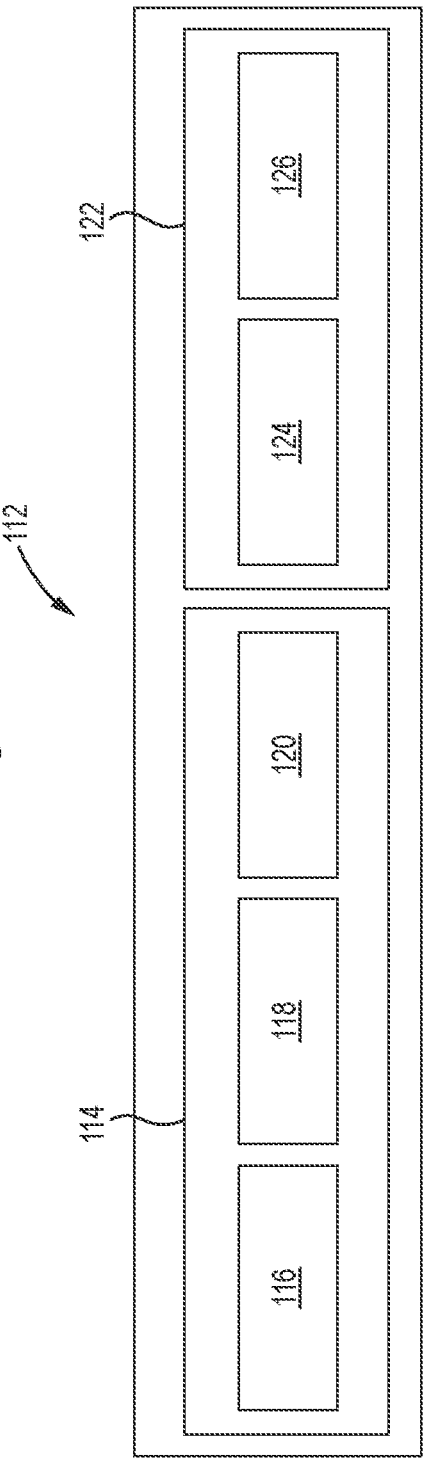

APPARATUS AND METHODS FOR ENCRYPTED COMMUNICATION

CROSS-REFERENCE TO RELATED APPLICATIONS

This application represents the U.S. National Phase of International Application number PCT/GB2020/053184, entitled "Apparatus and Methods for Encrypted Communication", filed on 11 Dec. 2020, which claims benefit to Great Britain patent application number 1918419.1, filed 13 Dec. 2019, all of which are incorporated herein by reference.

BACKGROUND OF THE INVENTION

This invention relates to apparatus and methods for establishing an encrypted communication link.

It is known to use encrypted communication links to protect information from being observed or tampered with as it is communicated from one device to a second device—e.g. over a wired or wireless link.

An encrypted link may conventionally be established using a pre-shared secret key (symmetric encryption) or using a public key infrastructure (PKI) (asymmetric encryption). In PKI, centralised trusted third parties (TTPs), also referred to as certification authorities (CAs), carefully check a first party's identity and then certify a public key of an asymmetric key pair held by the first party. When a second party sees this certificate, the second party can then use the first party's public key to send encrypted data to the first party. The use of PKI is advantageous in that it avoids the burden and security risks involved in distributing and storing pre-shared secrets among every pair of devices that wishes to communicate.

However, PKI is not well suited to all situations. PKI is designed for a centralised client-server model in which all parties that wish to exchange encrypted data must communicate via a centralised network, commonly the public Internet, in order to complete the transaction. Its complexity makes it poorly suited to the Internet of Things (IoT), in which it is desirable to provide encrypted links between billions of nodes, many of which are mobile and may lack any commonly understood sense of identity, at least from the point of view of the world at large. Even if the nodes do have a meaningful identity (e.g., by virtue of their ownership, or their physical location), the cost of creating and maintaining an effective PKI at this scale will be very great. The bigger and more structured a PKI is, the more layers of CAs are typically required. This can place unacceptable computer power and electrical power demands on devices, which may be simple battery-powered sensors, due to the complex mathematical calculations that PKI authentication requires. Moreover, in complex IoT systems many assets typically need to communicate with many other assets, in real-time, in short, one-off bursts.

The symmetric keys and asymmetric keys certified by the CAs are usually not re-generated very often; they are therefore prone to being reverse engineered by adversaries fairly quickly, especially with the use of quantum computing resources.

The longer the period over which the same keys are used, the higher the quantity of data that is encrypted using these keys, and then transmitted, and therefore the higher the probability that the key may be compromised.

The present invention seeks to provide an alternative approach to encrypted communication, which overcomes at least some of these shortcomings that are present in conventional centralised PKI methods.

SUMMARY OF THE INVENTION

From a first aspect, the invention provides a communication system comprising a first device and a second device, wherein:
  the first device comprises a memory storing first-device-specific identification data;
  the second device comprises a memory storing second-device-specific identification data;
  the first device is configured to receive a copy of the second-device-specific identification data and to store the copy in the memory of the first device;
  the second device is configured to receive a copy of the first-device-specific identification data and to store the copy in the memory of the second device;
  the first device is configured to derive a first encryption key from the first-device-specific identification data and the received copy of the second-device-specific identification data;
  the second device is configured to derive the first encryption key from the second-device-specific identification data and the received copy of the first-device-specific identification data;
  the first device is configured to encrypt transmission data using the first encryption key and to transmit the encrypted transmission data to the second device; and
  the second device is configured to receive the encrypted transmission data from the first device and to decrypt the encrypted transmission data using the first encryption key.

From a second aspect, the invention provides a method for establishing an encrypted communication link between a first device and a second device, wherein:
  the first device stores first-device-specific identification data;
  the second device stores second-device-specific identification data;
  the first device is configured to receive a copy of the second-device-specific identification data and to store the copy in a memory of the first device; and
  the second device is configured to receive a copy of the first-device-specific identification data and to store the copy in a memory of the second device, the method comprising:
  the first device deriving a first encryption key from the first-device-specific identification data and the received copy of the second-device-specific identification data; and
  the second device deriving the first encryption key from the second-device-specific identification data and the received copy of the first-device-specific identification data, wherein the first device is configured to encrypt transmission data using the first encryption key and to transmit the encrypted transmission data to the second device, and the second device is configured to receive the encrypted transmission data from the first device and to decrypt the encrypted transmission data using the first encryption key.

From a third aspect, the invention provides a first device, wherein the first device comprises a memory storing first-device-specific identification data and is configured to;
  receive a copy of second-device-specific identification data from a second device and store the copy in the memory;

send a copy of the first-device-specific identification data to the second device;

derive a first encryption key from the first-device-specific identification data and the received copy of the second-device-specific identification data; and encrypt transmission data using the first encryption key and to transmit the encrypted transmission data to the second device.

From a fourth aspect, the invention provides a second device, wherein the second device comprises a memory storing second-device-specific identification data and is configured to;

send a copy of the second-device-specific identification data to a first device;

receive a copy of first-device-specific identification data from the first device and store the copy in the memory;

the second device is configured to derive a first encryption key from the second-device-specific identification data and the received copy of the first-device-specific identification data;

the second device is configured to receive an encrypted transmission data from the first device, encrypted using the first encryption key, and to decrypt the encrypted transmission data using the first encryption key.

Thus it will be seen that, in accordance with the invention, an encrypted communication link, from a first device to a second device, is established based on an exchange of device-specific identification data. By deriving a shared encryption key from the device-specific identification data, this approach avoids the key distribution challenges of conventional symmetric-encryption systems, and the challenges of operating a complex PKI infrastructure.

The device-specific identification data, of any or all of the first, second and any further devices, may comprise or be derived from one or more values or properties. These values or properties may include one or more of: a model number, a serial number, a unique ID, a class, an owner, a mission identifier, a hardware unique identifier, a vendor identifier, a customer identifier. Each of these values or properties may be specific to a particular device or to a particular class of devices. Some or all of the device-specific identification data for a device may be hard-wired and/or stored in a memory of the device—e.g. in a read-only memory (ROM), or an eFuse, or a re-writeable non-volatile memory. Some or all of the device-specific identification data may be set during a manufacturing step or during a configuring step of the device. By selecting and/or combining appropriate values or properties, device data may be derived therefrom that is unique to each device. The device-specific identification data may be specific (i.e. unique) to each device within the system, or across a communications network, or globally.

In some embodiments, the first device is configured to generate a random value, and to send the random value to the second device. The first and second devices may each be configured to use the random value when deriving the first encryption key. The inclusion of a random value in the encryption key makes it extremely unlikely that any two encryption keys generated by the communication system will be the same. In some embodiments the first device and/or the second device are configured to check that the random value is different to at least one previously received random value. This thus lessens the chance of an attacker being able to successfully carry out a replay attack.

In some embodiments, the first device and the second device may also be configured to derive a second encryption key from the first and second-device-specific identification data e.g. the one-time digest. The first encryption key may be used to encrypt payload data transmitted from the first device to the second device, and the second encryption key may be used to encrypt payload data transmitted from the second device to the first device. This may similarly be the same for the third device i.e. such that payload transmission between a pair of devices is encrypted using an encryption key specific to that pair, and possibly specific to the direction of data transmission between that pair.

In some embodiments, the first device is configured to encrypt and/or transmit transmission data (e.g. payload data) using the first encryption key during a first time period. It may be configured, after the end of the first time period, to generate a subsequent encryption key using the first-device-specific identification data and the second-device-specific identification data. It may encrypt further transmission data (e.g. further payload data) using the subsequent encryption key. The second device may also be configured to generate the subsequent encryption key, and to receive and decrypt the further transmission data. The generation of multiple encryption keys, so that each is valid only for a limited time period, or is a "one-time" secret key, lessens the chance of an attacker successfully deriving, or reverse engineering, the encryption key, at least whilst that encryption key is still in use. The first time period may be short—e.g. an hour, a minute, a second or even a millisecond or less. In some embodiments, the first device and the second device may be configured to trigger the generation of a new encryption key before making a transmission of payload data to the other device.

In some embodiments, the second device is configured, upon receiving the first-device-specific identification data, to communicate with a remote server (e.g. a backend) to determine whether the received first-device-specific identification data corresponds to first-device-specific identification data stored on the remote server. This advantageously allows a network of such devices to be controlled by a system administrator with access to the remote server (e.g. backend). The system administrator may allow the device-specific identification data of a selected set of devices to be stored on the remote server. In some embodiments, the second device will not proceed to calculate the first encryption key if the first-device-specific identification data does not correspond to first-device-specific identification data stored on the remote server. Advantageously, the system administrator may therefore control which devices can establish authenticated communication links, since only those with device-specific-data stored in the remote server will be able to establish an encrypted communication link.

In some embodiments, at least two system administrators might be required to successfully pass an independent authentication process, e.g. a three factor authentication, in order for any one system administrator to be able to access the remote server. A report of activity by the system administrator may be generated at the end of the session and may be sent to multiple nominated parties, e.g. within an organisation. This may help to mitigate mishaps, either intentional or unintentional, and improve the security of the remote server.

The devices (which may include one or more further devices of the communication system) may share an encryption key—e.g., a symmetric AES key—which they may use to encrypt some or all of the data communications between the devices. However, the integrity of the first encryption key preferably does not rely on the security of this AES key. The AES key may be used for establishing the encrypted communication link, but, at least in some embodiments, is not used for encrypting payload data sent over the communication link.

In some embodiments, a first-and-second-device-specific key (which may be a symmetric key, such as an AES key) is stored in the first device memory. In some embodiments, the first-and-second-device-specific key is stored in the second device memory. In some embodiments the first device encrypts data using the first-and-second-device-specific key before sending the data to the second device. In some embodiments the second device encrypts data using the first-and-second-device-specific key (e.g. an AES key) before sending the data to the first device. In some embodiments the first device is configured to send the first-and-second-device-specific key to the second device. This advantageously allows any data which is to be exchanged between the first and second device to be encrypted using a key which is specific to the communication only between those devices, even before a derived encryption key has been established using the methods described herein. This advantageously allows for communication between the first device and the second device to be somewhat secure even before a secure encrypted communication link is established.

In some embodiments, a first-device-specific public key is stored in the first device memory and a second-device-specific public key is stored in the second device memory. These keys may, for example, be lattice based asymmetric public keys e.g. NTRU keys. The first device may send the first-device-specific public key to the second device. The second device may send the second-device-specific public key to the first device. There may be a corresponding first-device private key, which is stored in the first device memory and is not sent to the second device. There may be a corresponding second-device private key, which is stored in the second device memory and is not sent to the first device. These private-public key pairs may be used in the process of establishing an encrypted communication link, for example, the first and/or second device may encrypt data using the public key of another device e.g. second device public key, and may then send data e.g. data which is to be sent during the process of establishing a communication link, to that device e.g. the second device, which may then decrypt the data using its respective private key. But, at least in some embodiments, are not used in the transmission of payload data over the communication link. In some embodiments, these private-public key pairs may be generated directly on the first device. In some embodiments, the private-public key pair is re-generated by the first device within every new authentication session or after every N consecutive sessions, where N may be a number chosen at random.

In some embodiments, the communication system further comprises a third device (e.g. a proxy device). The third device may be configured to mediate communication between the first device and the remote server (e.g. a backend) and/or between the second device and the remote server (e.g. backend), for example during a provisioning phase, as described below. In some embodiments the third device (e.g. proxy device) is configured to communicate with the first device and a remote server (e.g. backend) in order to determine whether second-device-specific identification data received by the first device corresponds to second-device-specific identification data stored in the remote server. In some embodiments the third device is configured to communicate with the second device and a remote server in order to determine whether first-device-specific identification data received by the second device corresponds to first-device-specific identification data stored in the remote server. In some embodiments the third device stores first-device-specific identification data and/or second-device-specific identification data. In some embodiments, the third device generates a first-and-second-device-specific key, e.g. an AES key, as disclosed above, and sends the first-and-second device-specific key to the first device and/or to the second device.

From a further aspect, the invention provides a device configured for implementing methods steps disclosed herein as being performed by the first device. From another aspect, the invention provides a device configured for implementing methods steps disclosed herein as being performed by the second device. From another aspect, the invention provides a device configured for implementing methods steps disclosed herein as being performed by the third device.

Thus it will be seen that, in accordance with embodiments of the invention, a third device, also referred to herein as a proxy device, may be used to provide brokerage, independent data validation, and confidence to the second device that the first device is who or what it claims to be—i.e., that the first device is actually the device identified by the first-device-specific identification data, as well as confidence to the first device that the second device is who or what it claims to be—i.e., that the second device is actually the device identified by the second-device-specific identification data.

The third device may be a trusted device. In particular, the second device (and optionally the first device) may trust the third device—e.g., as a result of a data exchange occurring prior to the steps of the present methods. In some embodiments, the second device (and optionally the first device) may establish trust with the third device through at least some of the steps disclosed herein. The third device and the second (and/or the first) device may share a third-device-second-device encryption key (and/or third-device-second-device encryption key), e.g. a symmetric AES key, which may be derived from an earlier data exchange (i.e. occurring prior to the present method steps). The third-device-second-device encryption key may be used to encrypt certain data exchanged between the second device and the third device during a method embodying the invention. Similarly, the third-device-first-device encryption key may be used to encrypt certain data exchanged between the first device and the third device during a method embodying the invention, e.g. during an authentication process.

The third device may store third-device-specific-identification data. The third device may generate and/or store a third-device private key. The first device and/or the second device may store third-device-specific identification data.

The first device and/or the second device and/or third device may be any electronic devices. They may be wireless devices. They may be routers and/or servers. They may be portable devices. They may be battery-powered. In a preferred set of embodiments, they are wireless sensor devices. They may communicate with each other and/or with the third device (e.g. proxy) by radio—e.g., using an IEEE 802.15 protocol such as ZigBee™ and/or using WiFi or Bluetooth or any other short-range, medium-range or long-range radio protocol. However, this is not essential, and they may communicate using a wireless optical channel, a microwave link, an electrical wire, a fibre-optic cable, Ethernet, etc. The first and/or second devices may comprise Internet interfaces; they may have respective IP addresses or may have no IP addresses; they may be IoT devices. The encrypted communication link described herein may be suitable for use both at the edges (e.g. gateways) and at the core of a network, such as a complex "Internet of Things" system.

The first, second and third device may have different operating systems (e.g. Linux, OpenWrt, Windows, non-OS) and hardware (e.g. Aacrch64, Amd64, Armhf, Armv7, MC Arduino-like) but may be able to communicate interoperably according to embodiments of the present invention. The system may further comprise a network filter which provides cross-platform portability since it can be ported to many different platforms. The network filter may restrict data transmission so that encrypted payload data transmission is allowed only between authenticated devices according to one or more specified rules. In some embodiments, upon successful authentication, payload messages may contain one or more commands triggering certain device actions depending on the device permissions and/or pre-defined rules.

The third device may be any device. It may have any of the features of the first and/or second device. In particular, it may be a further sensor device. In some embodiments, the third device is a sensor hub or a gateway.

The first device, second device and third device may all be in proximity of each other—e.g., within less than 1 kilometre, or less than 100 metres, or less than 10 metres— or they may be distributed over larger distances or even globally.

The first and second devices are preferably not configured to communicate with a centralised certificate authority. This can simplify the design of the devices and reduce processing requirements and power consumption compared with using a PKI authentication protocol.

The communications between the devices may be divided over two or more different channels, such as over two different radio protocols, or over a wired channel and a wireless channel. This may provide greater security.

In some embodiments, the communication system is configured to perform an authentication process, the authentication process comprising:

the first device generating first-device-authentication-information from the first-device-specific identification information and an authentication-random-value, and sending the first-device-authentication-information and the authentication-random-value to the second device;

the second device generating the first-device-authentication-information from the copy of the first-device-specific identification data stored in the memory of the second device and the authentication-random-value sent by the first device; and the second device checking that the first-device-authentication-information generated by the second device matches the first-device-authentication-information received from the first device.

The second device may consider the first device to be unauthenticated unless the information matches.

The first device may authenticate the second device similarly, using second-device-authentication-information. The devices may perform such mutual authentication before deriving an encryption key from the device-specific identification data, and may be configured to derive an encryption key only after a successful mutual authentication.

This advantageously improves the security of the system since each device can authenticate the other device, ensuring that only devices which have previously shared their device-specific data can subsequently establish a communication link. This prevents "rogue" device from being able to easily establish a communication link with a device, since that rogue device will not have stored a copy of the device data which is necessary for authentication.

The communication system may comprise one or more further devices, configured similarly to the first and second devices. These further devices may thus be able to derive shared encryption keys with the first and/or second device using exchanged device-specific identification data. The system may comprise three, four, ten, a hundred or more such devices.

In some embodiments, these authentication methods may be used to authenticate a first plurality or group of devices to a second plurality or group of devices, and optionally vice versa (i.e. mutual authentication).

In some embodiments, the first device stores a first-device private key and the second device stores a second-device private key. The first device may use the first-device private key in decrypting second-device-authentication-information or third-device-authentication-information. The second device may use the second-device private key in decrypting first-device-authentication-information or third-device-authentication-information. Each respective private key is generated by the respective device and is not shared by the device.

In some embodiments, the third (e.g. proxy) device may receive the first-device-authentication-information from the first device, and may receive the second-device-authentication-information from the second device. The authentication process may further comprise a digest phase, performed after a successful verification of the first-device-authentication information:

the third (e.g. proxy) device calculating a one-time digest from i) first-device-specific identification data stored by the third device, ii) second-device-specific-identification data stored by the third device, iii) the first-device-authentication-information received from the first device, and iv) the second-device-authentication-information received from the second device;

the third device sending the one-time digest to the first device; and the first device authenticating the second device by using at least i) the copy of the second-device-specific identification data stored by the first device, ii) the first-device-specific identification data, iii) the second-device-authentication-information received from the second device, and iv) the first-device-authentication-information, to verify the one-time digest received from the third device.

In some embodiments the authentication process further comprises:

the third device sending the one-time digest to the second device; and the second device authenticating the first device by using at least i) the copy of the first-device-specific identification data stored by the second device, ii) the second-device-specific identification data, iii) the first-device-authentication-information received from the first device, and iv) the second-device-authentication-information, to verify the one-time digest received from the third device.

In some embodiments, the one-time digest may additionally be calculated from third-device-specific-identification data stored by the third device. In some embodiments the authentication process further comprises the first device authenticating the second device by additionally using the third-device-authentication-information received from the third device.

In some embodiments the authentication process further comprises the second device authenticating the first device by additionally using the third-device-authentication-information received from the third device.

In this way, the third device (e.g. a proxy) may mediate a secure mutual authentication between the first and second devices.

In some embodiments the first and/or second devices derive the first encryption key (and optionally the second encryption key) from the one-time digest.

The authentication-random-value may be generated by the first device. Each authentication-random-value (or nonce) may be generated from a source of true randomness or by a pseudo-random number generator. Each authentication-random-value (or nonce) may be generated using a cumulative random number generator, configured to generate a random number using both local data (i.e. local to the device) and external data (i.e. data received from another device or asset). This enables entropy to be continually acquired by a device from the first device and/or the second device, and other devices optionally participating in authentication processes according to the present invention. For example, the cumulative random number generator may be seeded with a value extracted from data received from another asset, as well as being seeded with a local hardware source of entropy. This allows devices with low entropy to benefit from higher entropy acquired from other devices in the network to improve their randomization capacity.

The first and/or second device may communicate the outcome of successful authentications to the third device. In some embodiments the third device additionally uses third-device-specific-identification data and third-device-authentication-information when calculating the one-time digest value. The second device (and optionally the first device) may then authenticate the first device by additionally using the third-device-specific-identification data and the third-device-authentication information to verify the one-time digest received from the third device. This data and information may be stored in respective memories of the first and second devices.

The one-time digest may additionally be calculated from the third-device-specific identification data and the third-device-authentication information. The second device may additionally use a copy of the third-device-specific identification data stored by the second device, and third-device-authentication-information received from the third device, to verify the one-time digest received from the third device, when authenticating the first device. The first device may additionally use the copy of the third-device-specific-identification data stored by the first device, and third-device-authentication-information received from the third device, to verify the one-time digest received from the third device, when authenticating the second device.

Some embodiments may use a hash operation, such as a SHA function (e.g. SHA-3 hash function), to generate the respective first-device-authentication information and/or second-device-authentication information and/or third-device-authentication information. This typically places less computation burden on the devices than performing asymmetric key operations.

Thus, in some embodiments, the authentication and subsequent establishing of an encrypted communication link use three cryptosystems: symmetric encryption, asymmetric encryption, and SHA-3 hashing. This can help to improve the quantum resistance of the encrypted communication link and to protect against other known security threats.

Embodiments may perform a handshaking phase in which one or more of the first device, the second device and the third device, is identified by one or more other device of the first device, the second device and the third device. This identification may be performed without strong authentication. It may comprise exchanging one or more relatively short hash values—e.g., 20-bit hash values—which may be derived from the device-specific identification data of one or more of the devices. Each hash value may include a respective random nonce as input to the hash, so that the hash values are one-time values. Each hash value may include a respective time stamp as input to the hash. Each random nonce may be communicated by a respective device to at least one of the other devices. The handshaking may comprise the first device determining the identity of the second device by recalculating a hash value based on the copy of the second-device-specific identification data stored by the first device and a random nonce received from the second device. The first device may compare the recalculated hash value with a hash value received from the second device, and identify the second device when the hash values match. Similarly, the handshaking may comprise the second device determining the identity of the first device by recalculating a hash value based on the first-device-specific identification data stored by the first device and a random nonce received from the first device. The second device may compare the recalculated hash value with a hash value received from the first device, and identify the first device when the hash values match.

The method may additionally comprise a pre-deployment handshaking phase for providing the second device and the third device with the first-device-specific identification data, and for providing the first device and the third device with the second-device-specific identification data.

The one-time digest calculated by the third device may further depend on time-stamp information from one or more of the devices. The second device and/or the first device may use the time-stamp information to verify the freshness of the one-time digest. This can help to prevent replay attacks.

The first-device-authentication-information or the second-device-authentication-information generated by the first device or the second device, respectively, may additionally depend on time-stamp information from an internal clock of the respective device. A device (e.g., the third device) receiving authentication information may check that the authentication information satisfies a freshness condition (e.g., being no older than 0.1 second from the current time according to a clock of the verifying third device) as part of verifying the authentication information.

The first device may perform a milestone check in which the first device checks that the first device has performed a set of phases of an authentication method disclosed herein. The set of phases may include the submitting of authentication-information, and/or the digest phase. It may further include a handshaking phase. The checking phase may provide a key-exchange milestone and a separate checking milestone. If the milestone check fails, the first device may withdraw from the authentication method. The first device may be configured to prove to the third device that it has performed the milestone set of phases. The second device may be similarly configured to perform some or all of these milestone operations.

The third device and/or the first or second device may be configured to record a successful authentication—e.g., in a blockchain.

Preferably, the system is configured so that different data is exchanged between the devices every time the authentication protocol is performed. This may be achieved through the use of nonces, as disclosed herein. In this way, authentication may happen de novo each time, which can prevent an attacker from deciphering keys or certificates. Embodiments may provide quantum resistance.

Preferably, there is no permanent authentication between the devices. Authentication may occur on a need-only basis. In some cases, the authenticated status may last only for one communication session, which may last only a few seconds or less. This is particularly appropriate where the devices are mobile and may be in proximity of each other (e.g., in short-range radio range) only for a few seconds.

The devices may be provisioned to communicate with each other. Provisioning is typically different from authentication. It may be a necessity for the devices to be provisioned for mutual communication before initiating the authentication protocol.

Each device may comprise software instructions, for execution by a processor, for implementing one or more steps disclosed herein. The software may be stored in a memory of the device. Each device may comprise one or more of: CPUs, DSPs, CPUs, FPGAs, ASICs, volatile memory, non-volatile memory, inputs, outputs, displays, network connections, power supplies, radios, clocks, and any other appropriate components. It may be configured to store or display or output a result of the authentication.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which:

FIG. 6 (split across sub-FIGS. 6a-6g) is a table showing what steps are performed in various authentication process scenarios, and providing details of each step.

FIG. 11 is a schematic drawing showing a message format which may be used for transmission data to be transmitted using an encrypted communication link according to the present invention;

FIG. 12 is schematic drawing representing the structure of an Asset Identity Signature (AIS), which may be used in embodiments of the present invention to refer to information stored on a first asset which relates to a second asset.

DETAILED DESCRIPTION

Figure 1:
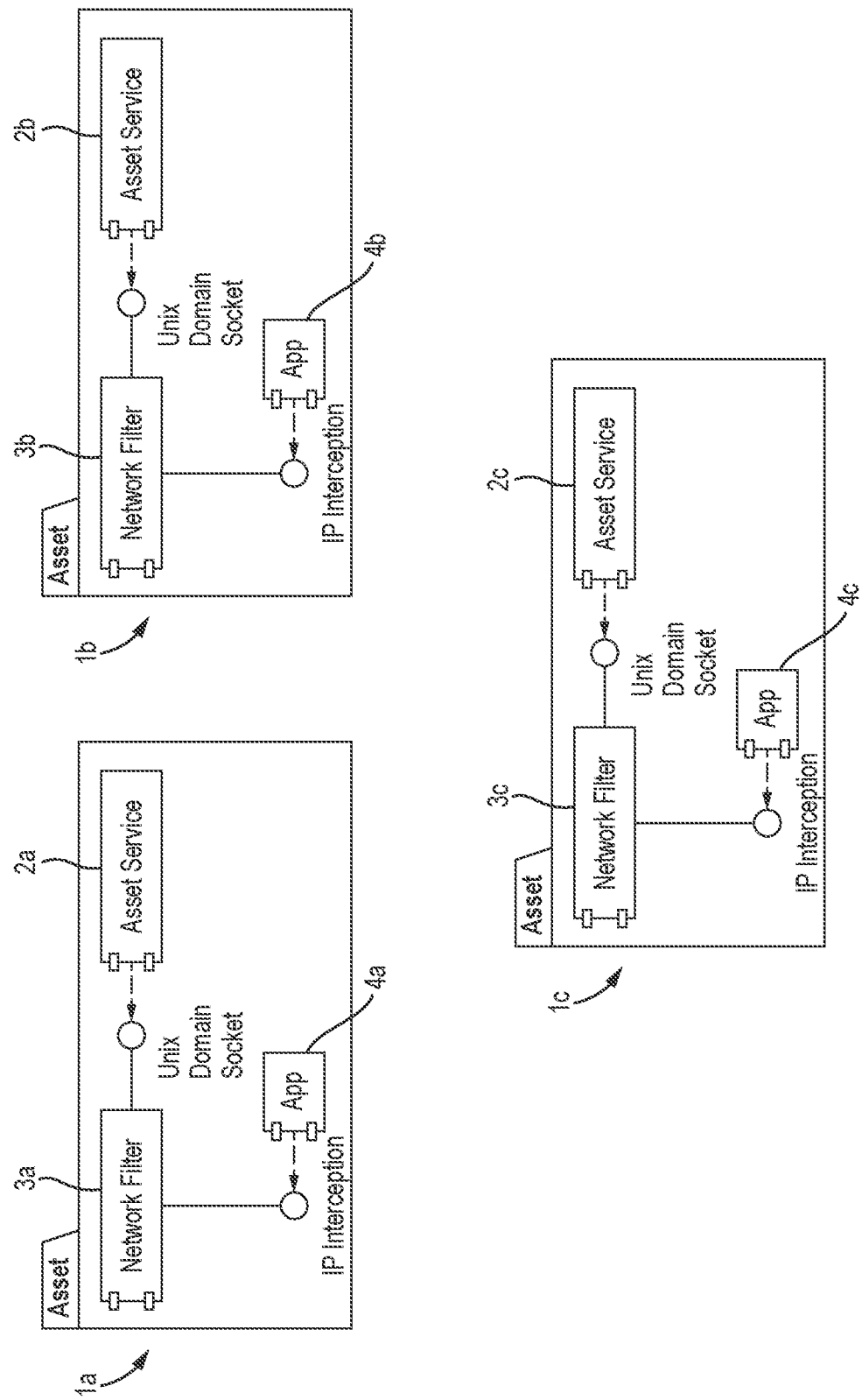
FIG. 1 is a schematic diagram of a communication system embodying the invention.
Figure 2:
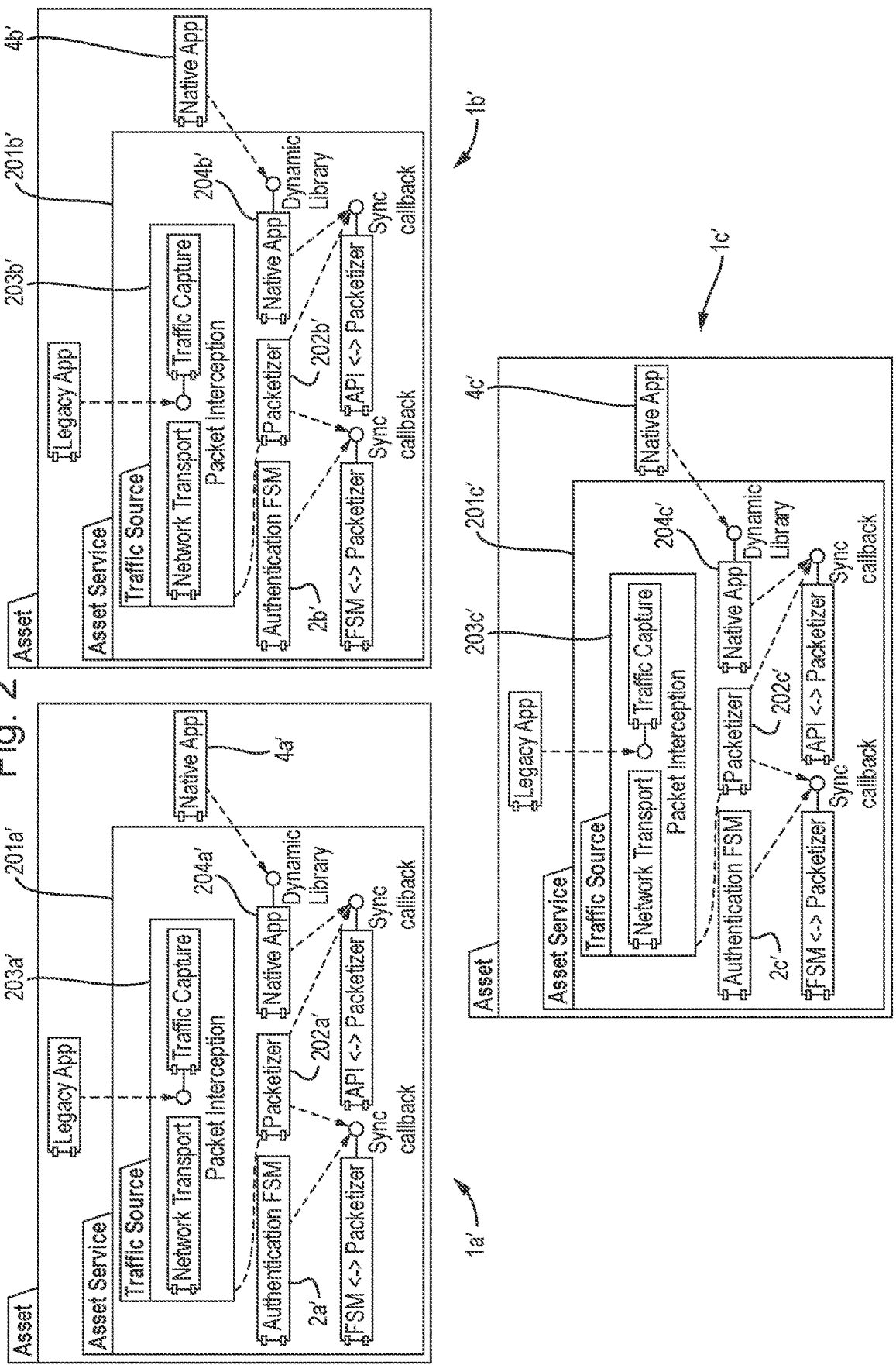
FIG. 2 is a schematic diagram of another communication system embodying the invention.

FIG. 1 shows a communication system comprising three Internet-of-Things assets (e.g., devices, such as wireless sensors), referred to herein as asset A $1a$, asset B $1b$ and a third asset $1c$ which, in this example, is acting as a proxy P e.g. for authentication purposes. FIG. 2 shows another communication system according to the present invention, comprising three Internet-of-Things assets A, B and C, similar to those of FIG. 1, numbered $1a'$, $1b'$ and $1c'$.

Each asset is a computational device that:
supports at least one, or preferably two channels of communication from a list of known protocols;
has enough computation power and memory to execute cryptographic algorithms such as hash function calculations, encryption and decryption, etc.;
is compatible with programs compiled by a GCC compiler on Linux for an AMD™ processor or processors;
is capable of storing all the necessary information demanded by the authentication protocol described herein, for a particular configuration;
preferably has a secure storage to keep secrets;
supports sufficient data throughput to be able to conduct all the exchange traffic as a regular asset and/or as a proxy (as explained in more detail below); and
has all the information to perform initial authentication and configuration using the authentication protocol described herein, including the asset's physical unique ID number and asset properties.

An asset that is configured and capable of communicating with other assets in a system as disclosed herein, is referred to as the 'peer' for the assets it communicates with. An asset and its peer are tied by an asset link. A first asset and a linked second asset are in a symmetric relation, whereby the second asset is a peer for the first asset, and the first asset is a peer for the second asset.

Using an asset service $2a$, $2b$, $2c$ and a network filter $3a$, $3b$, $3c$, each asset $1a$, $1b$, $1c$ can mutually authenticate with its peers $1a$, $1b$, $1c$ and, using information generated during the authentication process, establish a secure communication channel between itself and another one of the assets with which it is authenticated. Alternatively, as shown in FIG. 2, the assets $1a'$, $1b'$, $1c'$ may comprise a single asset service $201a'$, $201b'$, $201c'$, fulfilling the roles of both an asset service and a network filter. In this example, the asset service $201a'$, $201b'$, $201c'$, may include a component called an Authentication FSM component $2a'$, $2b'$, $2c'$, configured to carry out the role which is carried out by the asset service $2a$, $2b$, $2c$ of the assets of FIG. 1. All other components of the assets $1a'$, $1b'$, $1c'$ are either new compared to the assets of FIG. 1, or were a part of the network filter $3a$, $3b$, $3c$ of the assets of FIG. 1.

Asset Service

Each asset 1a, 1b, 1c (and 1a', 1b',1c') includes an asset service 2a, 2b, 2c (201a', 201b', 201c'). The asset service is software code delivered in the form of a software package (also referred to herein as a protocol package). When executed on one or more processors in an asset, the asset service establishes a connection between two trusted (i.e. previously authenticated) assets and encrypts network traffic that is exchanged between them. The software package is also capable of deploying, provisioning and re-provisioning changes to the assets, i.e. to introduce trusted assets to the system and manage them, as will be explained in more detail below. Thus the asset service executes authentication between devices, creates fresh AES keys for encryption of payload data to be transmitted between authenticated devices.

Deployment is a process of installing an asset within an asset group or system. The result of deployment is the introduction of a new asset to the system of assets and the enabling of trusted communication between that asset and its peers.

The process of deploying a new asset includes the steps of:
a. configuring a "digital twin" for the new asset;
b. connecting the asset into an asset group network(s);
c. running a 'Deployment with Provisioning' (DWP) workflow (described in more detail below); and
d. successfully provisioning the asset.

The "digital twin" of an asset is a digital representation of an asset's configuration, which is stored in a backend of the system. The configuration of an asset contains properties of the asset. The digital twin stores the current and two previous configurations (i.e. the most recent three configuration sets) of the asset. It is therefore possible for the system to, optionally, distinguish whether a deployment process is for a new asset that just went through steps a to d of this process, given above, or whether it is re-deploying an already deployed asset which has since been wiped clean to factory default state. The digital twin is managed by a backend service and is the primary source of all settings propagated throughout an asset group or system. The backend is essentially a central server, physically and logically distinct from the assets of the system, which may be distributed in the cloud, and to which any asset may refer when operating as a proxy. The backend server address may be burned into each asset as a factory-default setting or may be pre-installed at an authorized service centre. Among many other user and asset management features, the backend holds information on the digital twin of each asset. As well as assets being able to connect to the backend using a proxy, the backend may initiate a connection to an asset using its own proxy or proxies (e.g. for assets to get provisioned or re-provisioned).

Provisioning an asset involves uploading, to the asset, the configuration information stored in the digital twin on the backend. After arriving from the factory, or after being "factory reset", or due to a limited memory size, an asset may not have stored the settings of all of the peers in the network; these can be uploaded to the asset during provisioning as the asset's digital twin, or the settings of an assets peers can be acquired during subsequent authentication sessions. Any change in an asset's properties should first appear at the backend. This results in an edited digital twin which is stored and then uploaded to each asset. Some sections of a digital twin may be linked to other digital twins. During an update, which may be initiated by a human operator through a graphical user interface (GUI) to the backend, all digital twins are updated manually or automatically depending on security policy. An asset, whose digital twin has been changed but the change has not been uploaded to the asset, may stay operational until its peers are aware of the changes. The assets and the backend can function independently, e.g. should the need arise, data of asset twins can be edited by an operator, without communication to the assets, and then the assets can be provisioned/re-provisioned at a time when authenticated connection between the asset(s) and backend is next established according to a schedule or on demand. The backend executables comprise: a backend engine, backend proxies (agents), a storage subsystem, and a rich Internet application (e.g. a frontend).

The asset service performs a service function, comparable to functions of an operating system; it preferably does not perform payload functionality, which is performed by the asset application (described below). In the embodiment of FIG. 1, the asset service 2a, 2b, 2c is designed to work together with a network filter service 3a, 3b, 3c, present within each asset 1a, 1a, 1b and also within the virtual private network, which can span globally. Asset services (together with the Network Filter, in the embodiment of FIG. 1) on separate devices enable connectedness and interoperability between devices. The asset service 2a, 2b, 2c and the network filter service 3a, 3b, 3c communicate using a common API.

Network Filter

The network filter service 3a, 3b, 3c is responsible for handling network traffic, including ciphering of the network traffic, and for requesting a new authentication process to be carried out between assets if the encryption key of the current session has expired, or if the target asset has not been authenticated for some reason. The network filter offers cross-platform portability since it can be ported to many different platforms e.g. Aacrch64, Amd64, Armhf, Armv7, MC Arduino-like. Assets A and B and proxy P may have different operating systems (e.g. Linux, OpenWrt, Windows, non-OS) and different hardware but are able to communicate interoperably using the same protocol as described herein.

In the alternative embodiment of FIG. 1, there is not a separate network filter and asset service. Rather the functionality of both is carried out by the asset service 201a', 201b', 201c'. The asset service 201a', 201b', 201c' is an executable running in the background and can be built from various sets of components. In this example the main components are the authentication FSM component 2a', 2b', 2c', Packetizer component 202a', 202b', 202c', and a traffic component 203a', 203b', 203c'. The authentication FSM component 2a', 2b', 2c' is responsible for the asset authentication process described herein, validation of any kind of authentication data from other peers, checking of milestones, and for generating the ciphering keys to be used by other components. The packetizer 202a', 202b', 202c' is responsible for encapsulating application level messages to network packets and for encryption/decryption of the packets. The traffic component Y, which may be either a transport component and/or a Capture component, acts as a network traffic stream.

These main components described above are united by communication components having synchronous callback interfaces. The components create a secure channel used by third-party applications (both native and legacy) to encrypt network traffic implicitly. A native API component 204a', 204b', 204c' allows the asset 1a', 1b', 1c' to interface with native applications of the asset.

Asset Applications

Each app 4a, 4b, 4c, 4a', 4b', 4c', is an asset software application, which may be any third-party code which runs on the asset hardware, and which outputs and/or receives data. The asset application is typically a payload, i.e. it fulfils the useful functionality for which the asset has been developed, produced, sold and installed. The implementation of the authentication protocol described herein, running on an asset, is not considered as part of the payload functionality.

Significantly, the asset application 4a, 4b, 4c (or 4a', 4b', 4c') doesn't need an awareness of the asset service 2a, 2b, 2c (201a', 201b', 201c') and, in the embodiment of FIG. 1, of the network filter 3a, 3b, 3c. The message encrypting/decrypting and peer authentication occurs automatically, without any intrusion to the asset application 4a, 4b, 4c (4a', 4b', 4c'). This means that existing app's 4a, 4b, 4c (4a', 4b', 4c'), may be incorporated into the present system without having to be modified. This is true likewise of a legacy app e.g. as seen in FIG. 2.

However, the asset service 2a, 2b, 2c, 201a', 201b', 201c', and network filter 3a, 3b, 3c may contain references to the asset application 4, 4'. There is a Mission ID (MID) parameter, described below, which characterizes the useful functionality of an asset application 4, 4', and which is known to the network filter 3 and the asset service 2, 2'.

In some embodiments, the asset application 4a', 4b', 4c' may have an awareness of the asset service 201a', 201b', 201c' by being integrated with the asset service using APIs, as shown in FIG. 2. In this case, the asset service may also run an authentication process over the communication channels being handled by the asset application.

Asset Setup

Before an asset 1, 1' can operate, or be provisioned to an asset group, the asset must be set up, for example in the factory. This set up requires:

installing an operating system on the asset 1, 1';
installing a communication stack for all relevant network interfaces on the asset 1, 1';
installing the asset service 2, 2' (and the optional network filter 3); and
configuring the asset factory settings, which are:
 MID;
 HID;
 serial number;
 MIDSLOTS, the number of available communication slots; and
 PROTOCOL VERSION, the protocol version.

The Mission ID (MID) is a four-digit numeric reference which indicates hardware functionality, by reference to a catalogue of MID values. It is provided by the hardware manufacturer, who outfits the basic computational platform with peripheral attachments. If the MID is not provided by the hardware manufacturer, it can be assigned by owner of the network, where the asset is deployed.

The hardware functionality summarizes the functions of the asset 1, 1' that can be provided by the available hardware modules within the asset. For example, a four digit MID could be used to indicate that an asset has a temperature sensor, i.e. can provide temperature readings, or similarly a pressure and/or humidity sensor. If an asset 1, 1' runs an asset application 4, 4' that does not use its temperature sensing abilities, the MID may nevertheless still indicate that the asset 1, 1' has a temperature sensor.

The Hardware unique identifier (HID) is an 8-byte string which specifies the particular asset identity. It is expected that each HID exists not more than once in a system. A system provider, who provides the asset service 2, 2' and the network filter 3, may assign, to accredited manufacturing partners, particular ranges of HID values, which the manufacturers are then permitted to assign to the particular assets which they manufacture.

An administrator of a system or asset is a person who has command and control authority, as well as means to impose this authority on an asset 1, 1' in the asset system.

An asset 1, 1' is branded with an HID at the asset initial setup. The HID may be openly disclosed information. In order to install an asset 1, 1' into an existing group of assets (i.e. to deploy an asset) the HID is entered into the backend GUI by a system administrator to create a corresponding digital twin of the asset 1, 1'.

The asset serial number is a semi-unique 32-byte hex string specified by manufacturer. An asset is branded with a serial number at the asset initial setup. The manufacturer has free choice in assigning the serial number to each asset 1, 1'. It is expected that each serial number exists not more than once across all product lines.

An asset's serial number is restricted information which may be exposed exclusively to the system administrator. It is entered in the backend GUI by the system administrator to create the corresponding digital twin, in order to allow a new asset 1, 1' to be deployed.

An asset 1, 1' additionally has a vendor identifier (VID), which is a unique 4-byte string that indicates an accredited vendor organisation. The VID may be provided as part of the initial asset configuration, although it is typically supplied during DWP, a process described below. The unique VIDs are assigned by the system provider to accredited partners. The number may characterize the manufacturing company (OEM), engineering bureau, system integrator or other supply chain participants, who delivers the asset to the end user. It typically reflects the last entity who altered the asset content and composition.

An asset additionally has a customer identifier (CID). This is a unique 4-byte string that indicates the asset owner. The unique CIDs are assigned by the system provider to service users registered with the backend. The CID may be provided as part of the initial asset configuration, although it is typically supplied during DWP, a process described below.

The values HID, VID and CID are concatenated as a single string "HID.VID.CID" to give a unified asset identifier (UID), which is a 16-byte string that is used during the authentication process. After an asset has been deployed and provisioned it will contain a UID value. In some small footprint device embodiments, the length of the values HID, VID and CID may be reduced to up to 4, 2 and 2 bytes respectively.

The rest of the required setup information may be supplied through the provisioning process. Other processes, such as the installation of asset applications 4, 4', the download of customer settings, etc. may be carried out as part of the deployment of an asset 1, 1'. System differentiators like x-functions parameters can be loaded as part of the initial setup, or as part of the provisioned configuration. X-functions include Xv, which is used to provide a system version differentiator. Xv is a function which can output a hash of the concatenated version numbers assigned to the components supplied with the system, to check the code compatibility of authenticating assets. Another X-function, $X_n$ is the function that outputs a hash of concatenated time-period stamps of authentication current time and some system performance parameters (like processor load, used memory, transmission bitrate, etc.) and an allowed time variation and variation of the parameters for authenticating assets. It is used to provide a time- and parameter dependent differentiator eliminating the possibility of replay attacks and eliminating the possibility of authentication in the case of essentially unusual behaviour of the asset caused by e.g. compromised asset application or operating system. Assets may check time stamps and the parameters against allowed variations to ensure freshness and acceptable parameter deviations during the authentication procedures disclosed herein. Both of these X-functions are used to confirm the universe (i.e. the code, time and parameter acceptance context) in which the asset is going to function. It is up to the asset or system designer to determine which parameters are permanent and which are changeable.

Communication Link

The third party application 4a, 4a' on a first asset device 1a, 1a' can send an Internet Protocol (IP) packet to a third-party application 4b, 4b' on a different asset device 1b, 1b' using any transport protocol, for example UDP, TCP, ICMP etc., by establishing a one-time encrypted communication link. The encryption key is different for every new secure data transmission session between authenticated devices.

Figure 3:
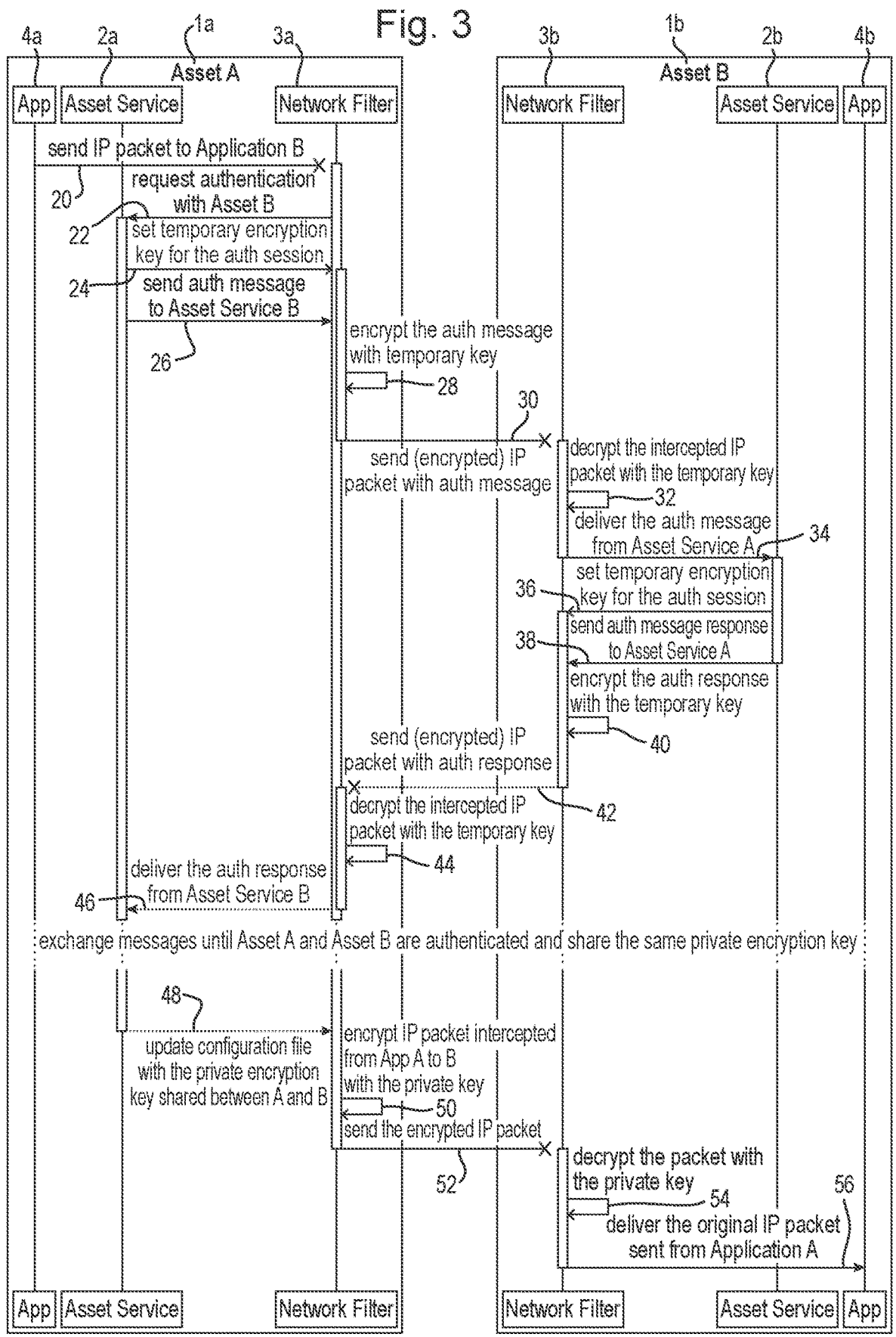
FIG. 3 is message sequence chart showing how a software application on a first asset of the system can communicate securely with a software application on a second asset of the system.

FIG. 3 shows schematically the stages that are involved in establishing an encrypted communication link to ensure secure end-to-end encrypted transmission of payload messages between authenticated assets, for assets as shown in FIG. 1.

In this example, the third-party application 4a of the first asset 1a (Asset A) causes the Asset A to transmit an IP packet to a second asset 1b (Asset B). At a first step 20, this IP packet is intercepted by the network filter 3a of Asset A. The network filter 3a of Asset A checks whether the configuration files of the Asset A, stored locally on Asset A, contain a current (not expired) encryption key, which is a one-time symmetric encryption key, shared by Asset A and Asset B.

If an encryption key is already present in the configuration files, then the payload message transmission process proceeds to step 50 of the method. At step 50, the IP packet, intercepted by the network filter 3a, is encrypted with the encryption key from the configuration files. At stage 52, this encrypted IP packet is transmitted to Asset B. Then, at stage 54, the encrypted IP packet is decrypted by the network filter 3b of Asset B. At stage 56 this decrypted IP packet is then sent, by the network filter 3b, to the third-party application 4b of Asset B.

Thus the network filters 3 provide secure communication by intercepting payload messages between the assets 1, and encrypting and decrypting the messages, as appropriate, using an encryption key which is shared by two of the assets, and which is unique to those assets.

If, at stage 20, the encryption key is not found to be present in the configuration files of Asset A, then the Assets A and B must authenticate with each other in order to establish a shared encryption key and therefore enable an encrypted communication link to be established. There are three cases in which an encryption key is not found in the configuration files, the first is if the Assets A and B have never previously established an encrypted communication link (i.e. have never authenticated to each other). Alternatively, the assets A and B may previously have established an encrypted communication link, but this link may now have expired. In some small footprint embodiments, the assets A and B may previously have established an encrypted communication link, but this link may now have displaced by newer links due to limited storage size.

In either case, this process begins at step 22, when the network filter 3a of Asset A sends a message to the asset service 2a of Asset A, initiating an authentication process with Asset B. If the assets previously successfully completed an authentication process with each other, then they both possess a shared temporary (one-time) symmetric authentication key. This previous key can be used by these assets as a temporary encryption key to encrypt or decrypt payload messages during the present authentication session. In this case, the asset service 2a of Asset A sets a temporary encryption key for the current authentication session with Asset B, at step 24. The asset service 2a then transmits a payload message from Asset A to Asset B, at step 26. This payload message is intercepted by the network filter 3a of Asset A, and if a temporary encryption key has been set, at stage 28 this message is encrypted. At stage 30 the (optionally encrypted) message is sent to Asset B.

This payload message from Asset A is then intercepted by the network filter 3b of Asset B, and, if it has been encrypted, is decrypted by the network filter of Asset B using the temporary key, at step 32. Asset B has the correct shared temporary decryption key available to it, as a result of a previously successful authentication with Asset A. At step 34, the network filter 3b of Asset B sends the decrypted payload message to the asset service 2b of Asset B. The asset service 2b optionally sets the temporary encryption key, at step 36, and sends a receipt acknowledgement response to asset service 2a of Asset A, at step 38, which is encrypted by the network filter 3b at step 40, using the temporary encryption key set by the asset service 2b of Asset B, if it is available. The network filter then sends the (optionally encrypted) response, at step 42, to Asset A. If the message has been encrypted then at step 44 the message is decrypted and then, at step 46, sent to the asset service 2a of Asset A.

Figure 4:
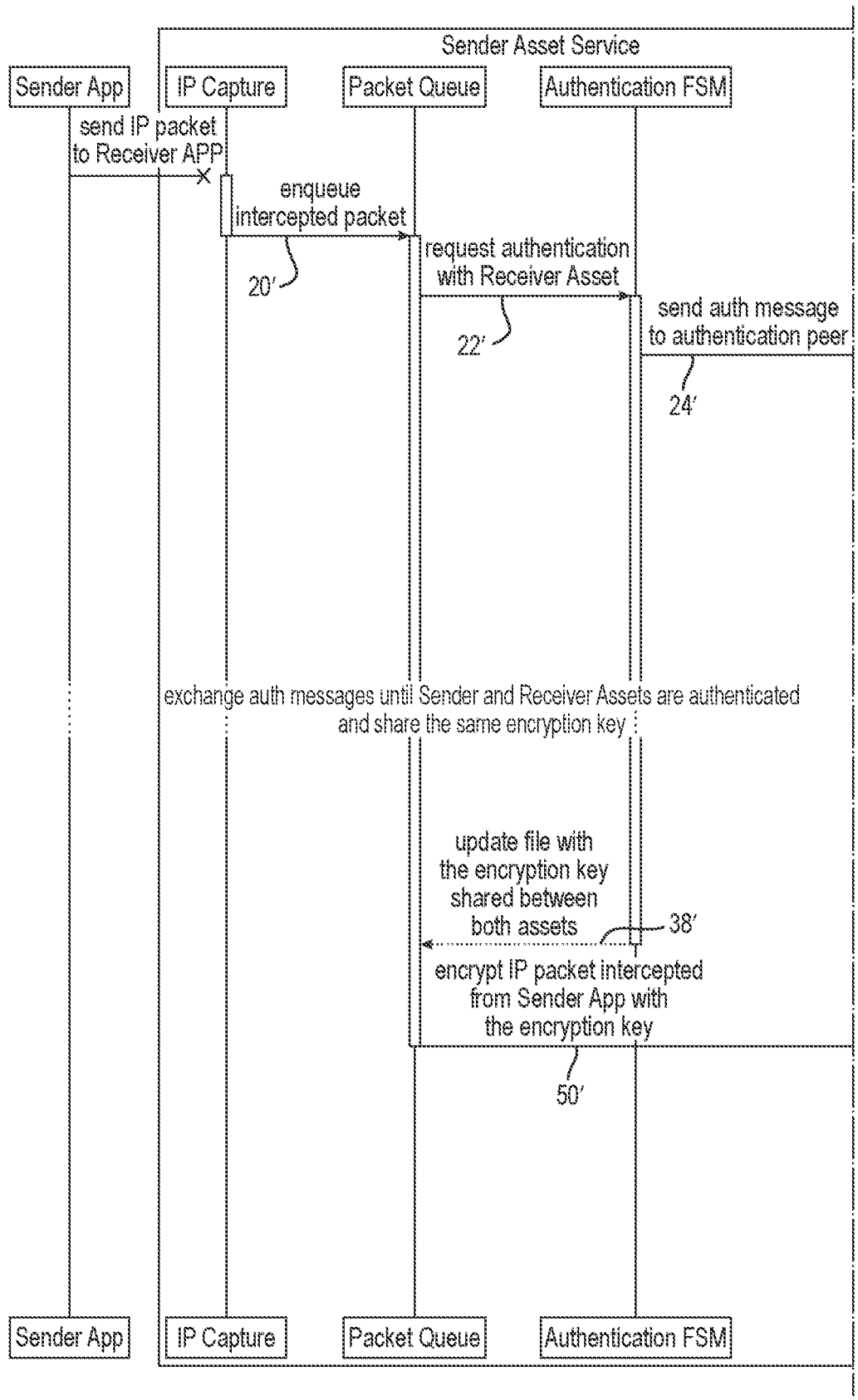
FIG. 4 is message sequence chart showing how a software application on a first asset, as shown in FIG. 2, can communicate securely with a software application on a second asset, as shown in FIG. 2.
Figure 4:
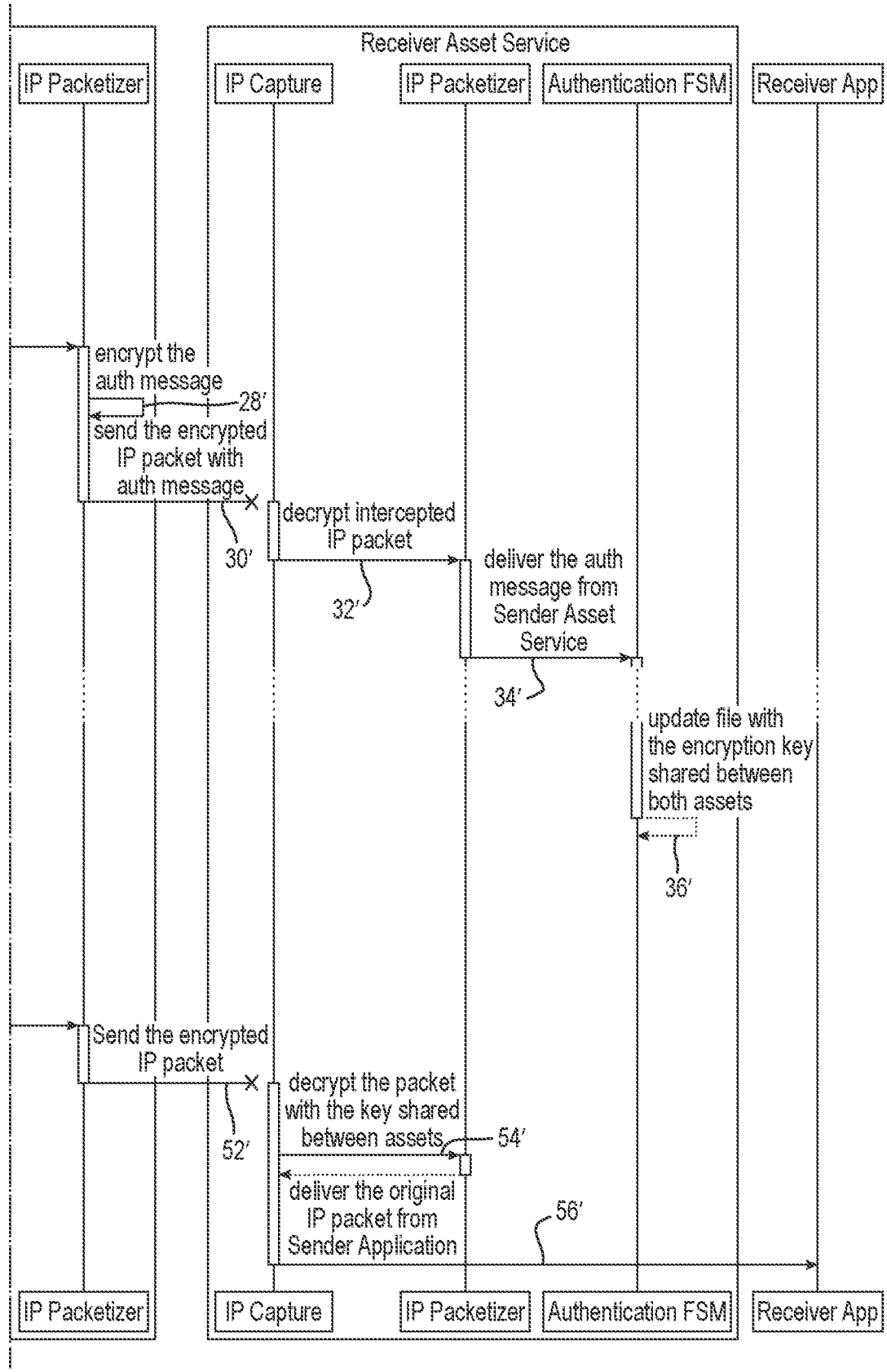

FIG. 4 shows schematically the stages that are involved in establishing an authenticated encrypted communication link to ensure secure end-to-end encrypted transmission of payload messages between authenticated assets, for assets as shown in FIG. 2. This process proceeds analogously to that shown in FIG. 3, with the tasks shown being carried out by the various components of the assets 1a', 1b', 1c'.

Specifically the third-party application 4a' of the first asset 1a' (Asset A) causes the Asset A to transmit an IP packet to a second asset 1b' (Asset B). At a first step 20', this IP packet is intercepted by IP capture, one component of the traffic source 203a' of Asset A. A "packet queue" component of Asset A then checks whether the configuration files of the Asset A, stored locally on Asset A, contain an encryption key, which is a one-time symmetric encryption key, shared by Asset A and Asset B.

If an encryption key is already present in the configuration files, then the payload message transmission process proceeds to step 50' of the method. At step 50', the IP packet, intercepted by IP capture, is encrypted with the encryption key from the configuration files. At stage 52', this encrypted IP packet is transmitted to Asset B. Then, at stage 54', the encrypted IP packet is decrypted by the IP capture of Asset B. At stage 56' this decrypted IP packet is then sent, by the IP capture, to the third-party application 4b' of Asset B.

Thus the asset services 201a', 201b', 201c' provide secure communication by intercepting payload messages between the assets 1', and encrypting and decrypting the messages, as appropriate, using an encryption key which is shared by two of the assets, and which is unique to those assets.

If, at stage 20', the encryption key is not found to be present in the configuration files of Asset A, then the Assets A and B must authenticate with each other in order to establish a shared encryption key and therefore enable an encrypted communication link to be established. This process begins at step 22', when a "packet queue" of Asset A sends a message to the authentication FSM 2a' of Asset A, initiating an authentication process with Asset B. This message is then sent to the packetizer 202a' at step 24'. The message is then encrypted, if a previous key is available or a temporary key has been set by the authentication FSM 2a', at step 28'. At stage 30' the (optionally encrypted) message is sent by the packetizer 202a' to Asset B.

This payload message from Asset A is then intercepted by the IP capture component of the traffic source 203b' of Asset B, and, if it has been encrypted, is decrypted at step 32'. Asset B has the correct shared temporary decryption key available to it, as a result of a previously successful authentication with Asset A. At step 34', the packetizer 202b' of Asset B sends the decrypted payload message to the authentication FSM 2b' of Asset B.

The assets A and B then exchange messages as required until they are authenticated with each other. Following successful authentication, the authentication FSM 2b' then updates the encryption key which is stored in its files, at step 36'. Similarly, at stage 38', the authentication FSM 2a' of Asset A updates its files to store the newly established encryption key.

In the manner described above, Assets A and B exchange a series of messages with each other, and with the proxy asset P, in order to authenticate, as explained in more detail below with reference to FIGS. 5, 6a-6g, and 7a-e, 8a-c, 9a-b and 10a-b. At the end of this authentication process, the Assets A and B are authenticated to each other, and both store a common final one-time digest value, referred to herein as an "OMEGA" value.

Each asset then generates a shared encryption key that is unique for the current session, using this OMEGA value. Each of the two assets which have just authenticated to each other first checks whether the OMEGA value generated by the authentication process is at least twice as long as a desired length of the encryption key. If the OMEGA value is sufficiently long, then it is used as a seed to generate the encryption key. If the OMEGA value is not at least twice as long as the desired length of the encryption key then the OMEGA value is concatenate with itself until a string is produced, the total length of which exceeds twice the desired length of the encryption key, at which point the value is seeded to generate the shared encryption key (i.e. the communication key).

Once this is complete, at stage 48, the asset service of each asset updates the configuration file of a transmitted IP packet with the shared encryption key. The communication process then proceeds through steps 50 to 56, as described above with reference to the case in which a shared encryption key is already present in the configuration files of the transmitting asset 1a.

Authentication

The asset service 2a, 2b, 2c of respective devices Asset A, Asset B and Asset P (the proxy) are responsible for carrying out authentication between the two devices 1a, 1 b.

Figure 5:
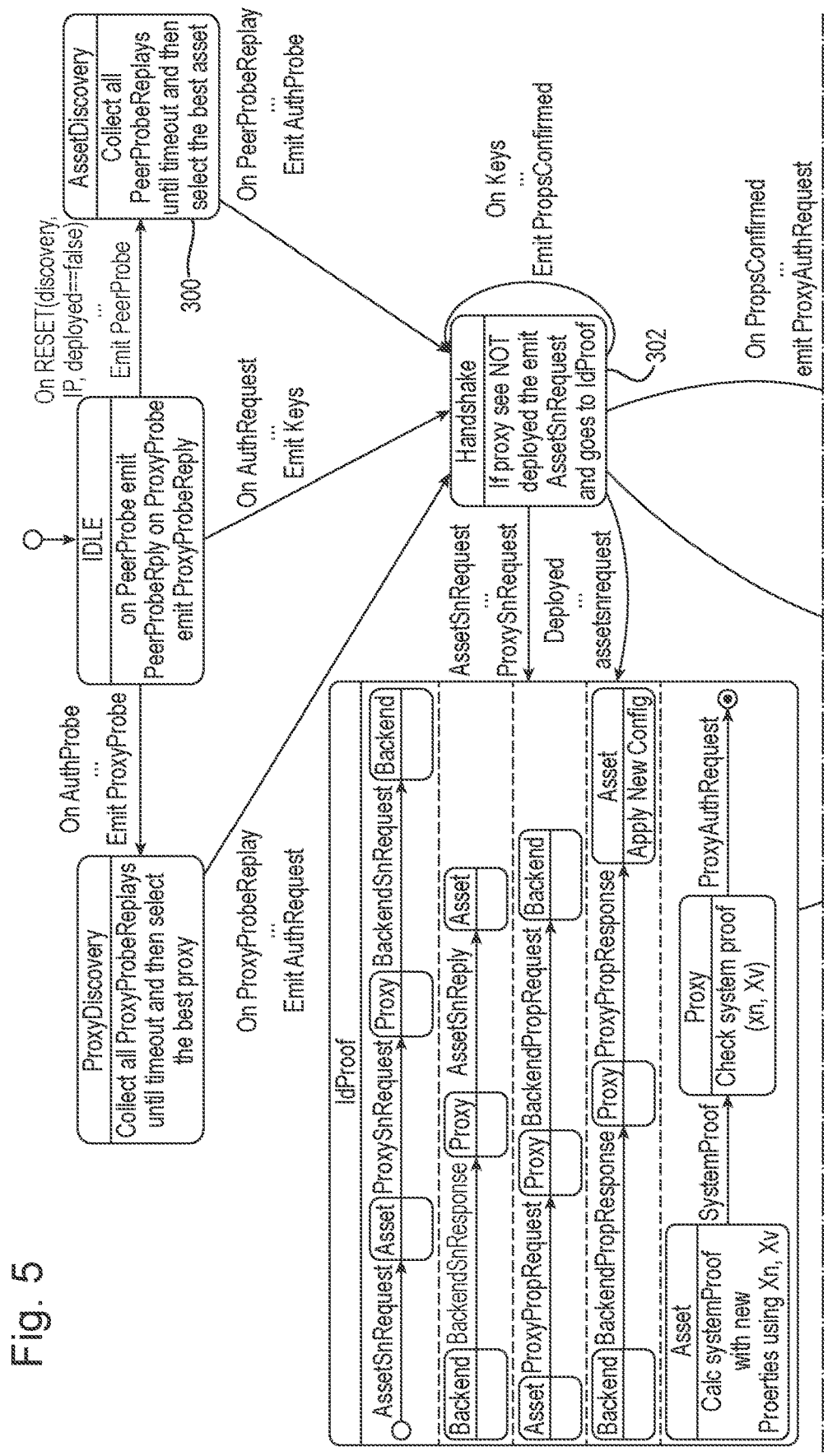
FIG. 5 is a control-flow graph of an authentication process used in the communication system for establishing an encrypted communication channel.
Figure 5:
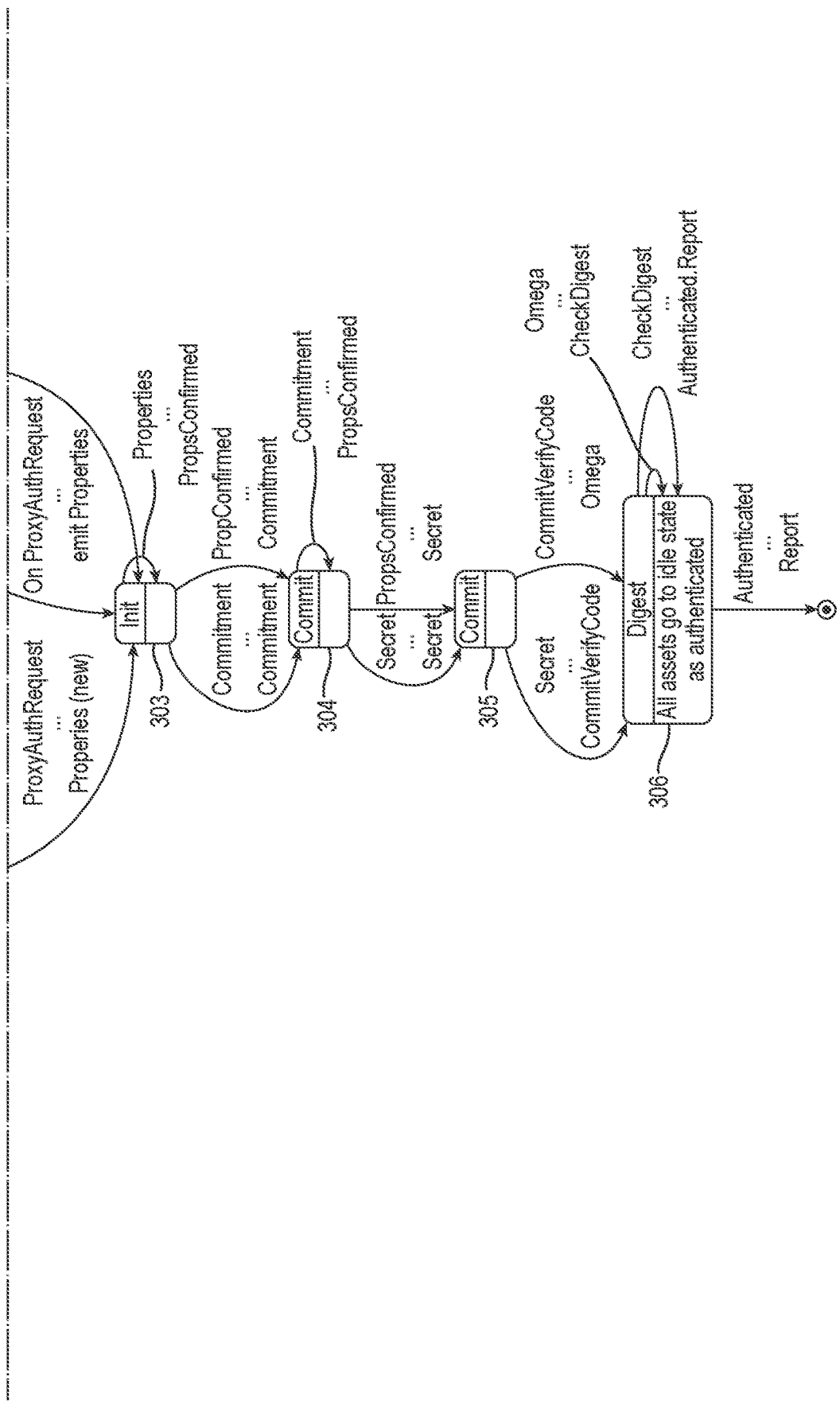

FIG. 5 shows the authentication flow schematically, while FIG. 6 (which is split into sub-FIGS. 6a, 6b, 6c, 6d, 6e, 6f and 6g) describes the same authentication flow in tabular form, with the rows describing steps from a set of different possible authentication paths.

The table of FIG. 6 summarises the purpose of each process step, the state of the devices at the start of each step, the trigger which initiates the particular process step, the outcome of each process stage, and which assets take part in each stage for different types of authentication process.

The three adjacent columns of the table labelled "AAP", "DWP" and "ARW" show which assets out of the two authenticating assets, Asset A and Asset B, and the proxy asset, Asset P, take part in each stage of a particular authentication process, for the three different variants of the authentication process.

Figure 8A:
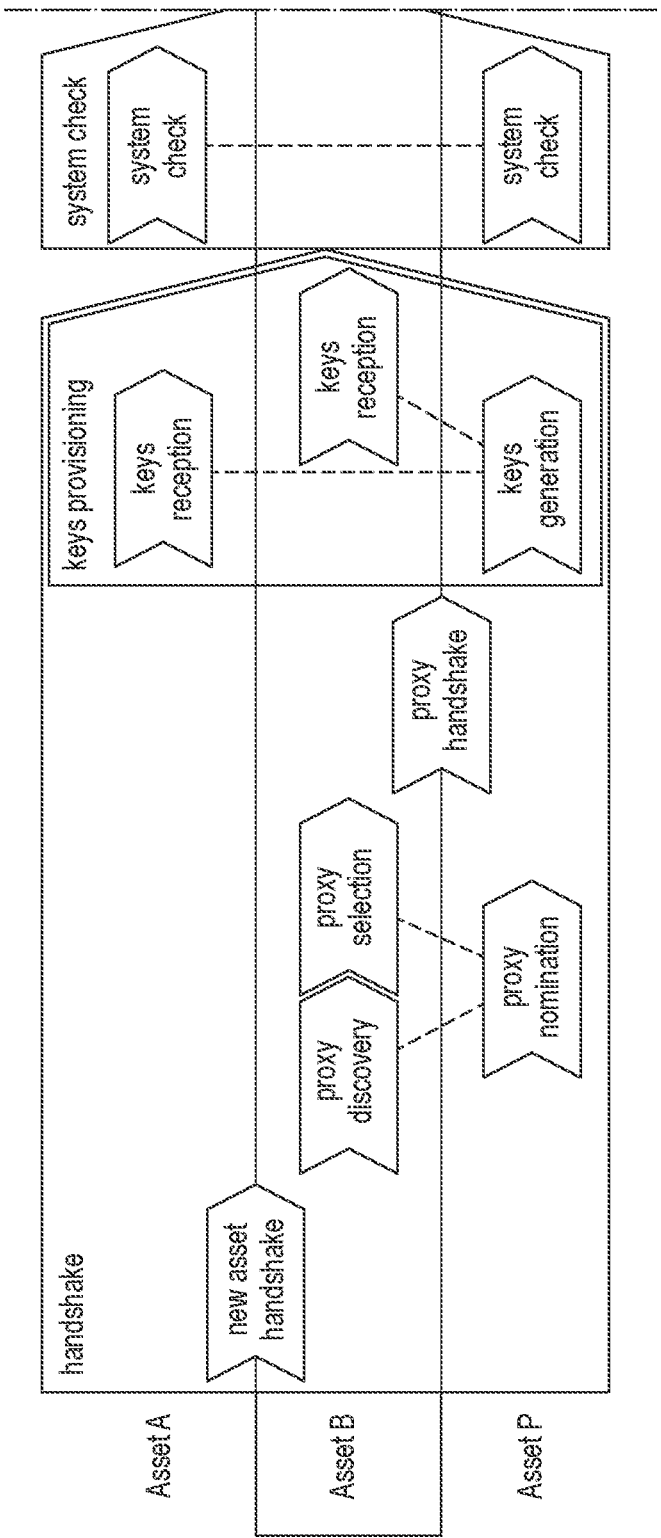
FIG. 8 (split across sub-FIGS. 8a-8c) is a flow chart representing the stages of the AAP process as described in the table of FIG. 6.
Figure 8A:
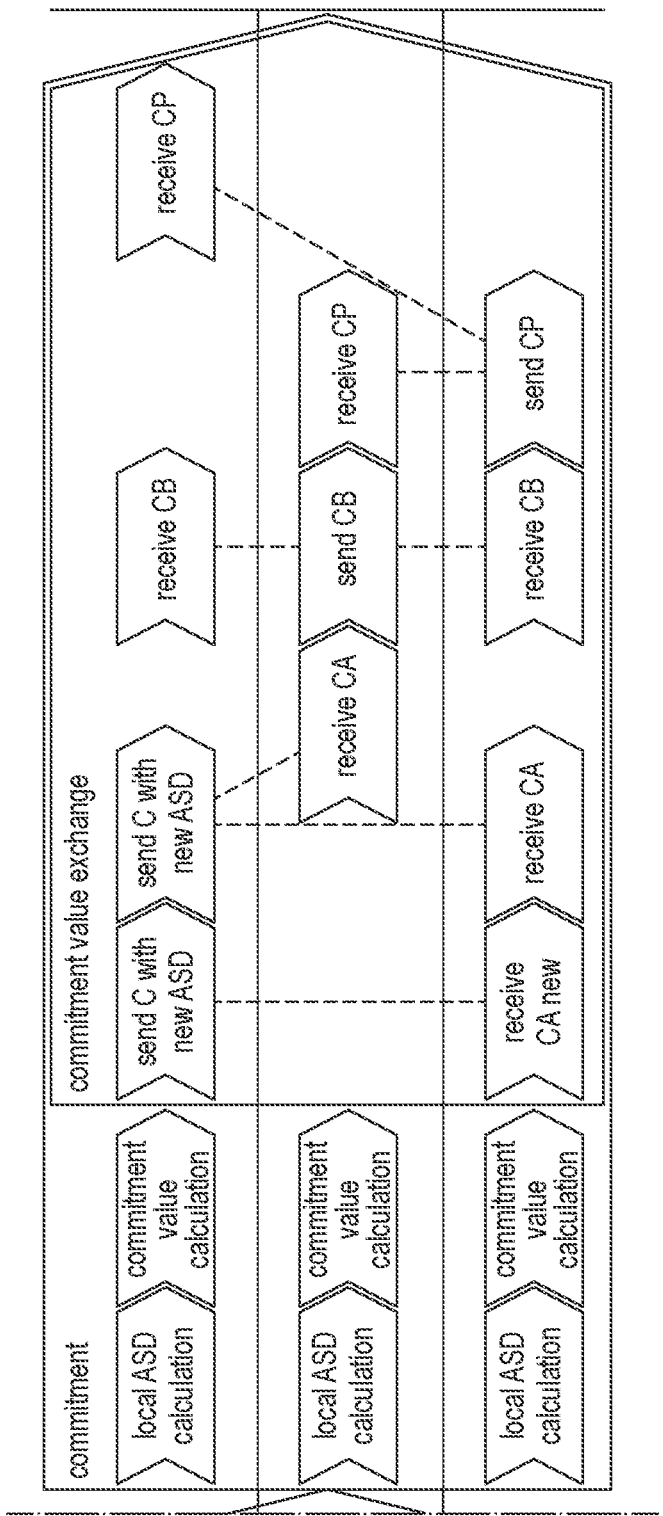
Figure 8B:
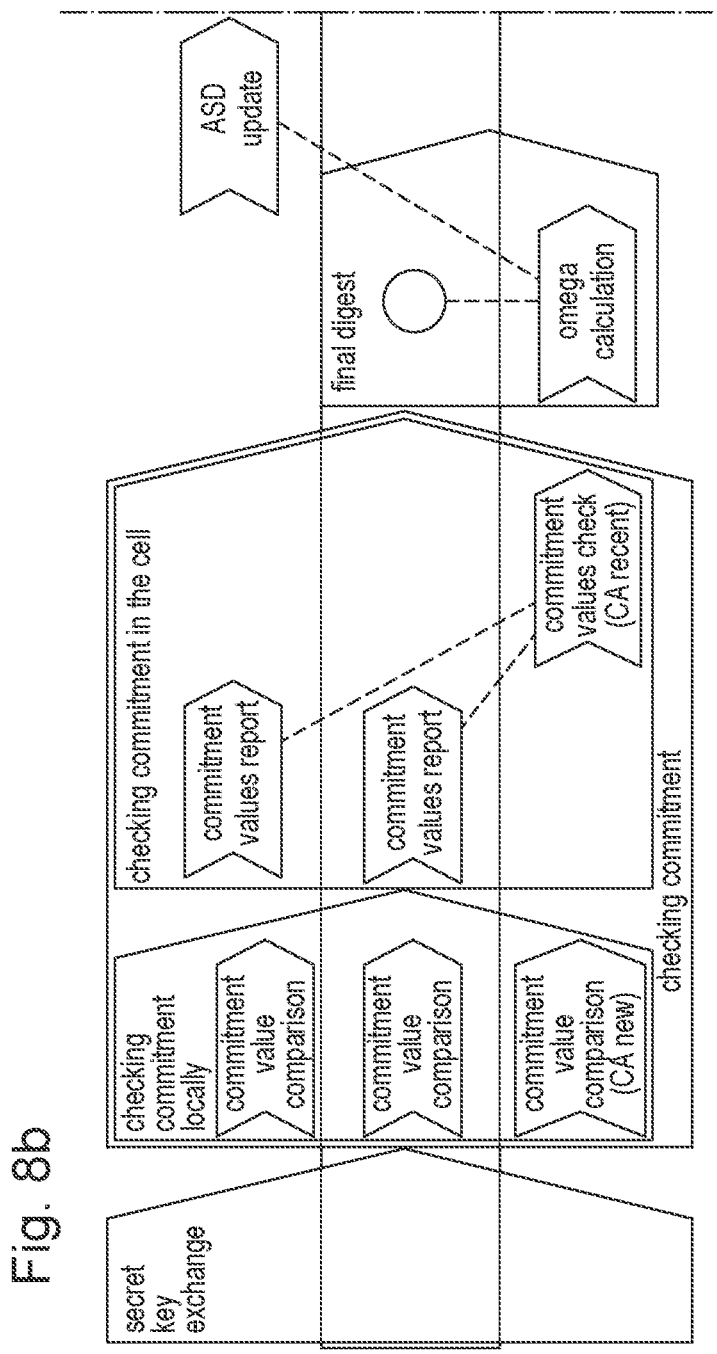
Figure 8B:
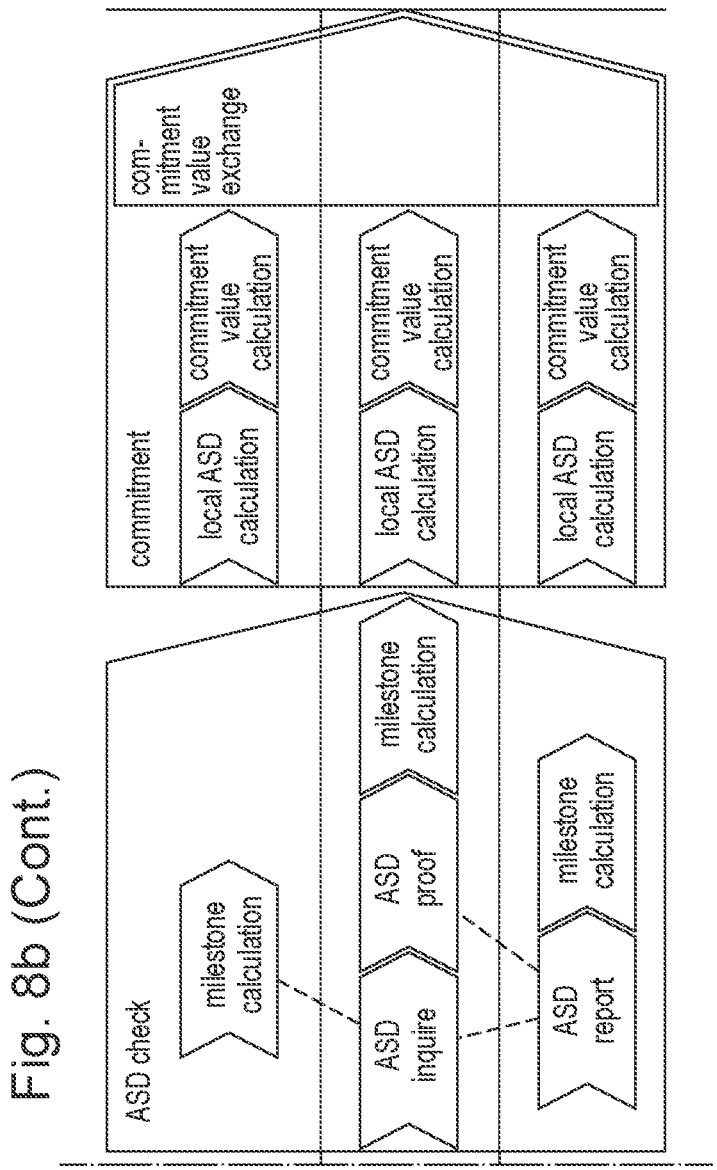
Figure 8C:
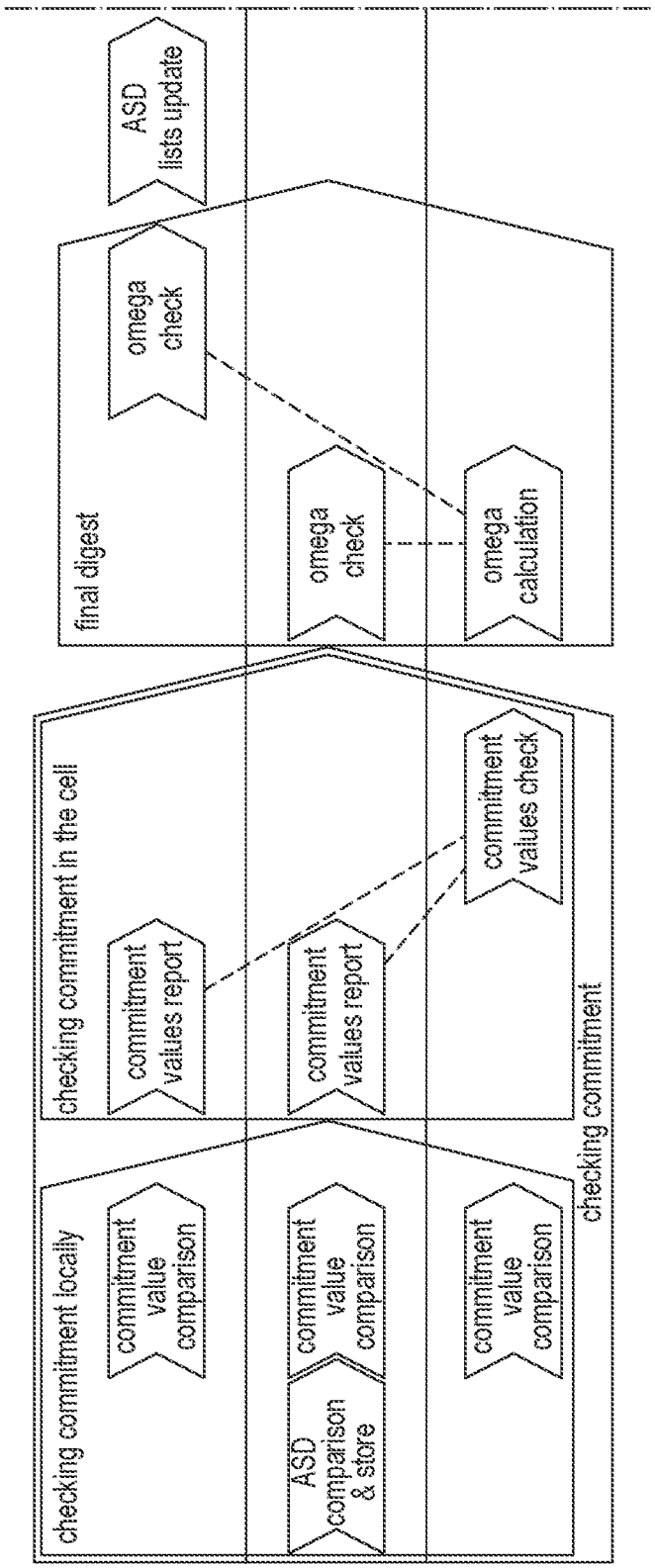
Figure 8C:
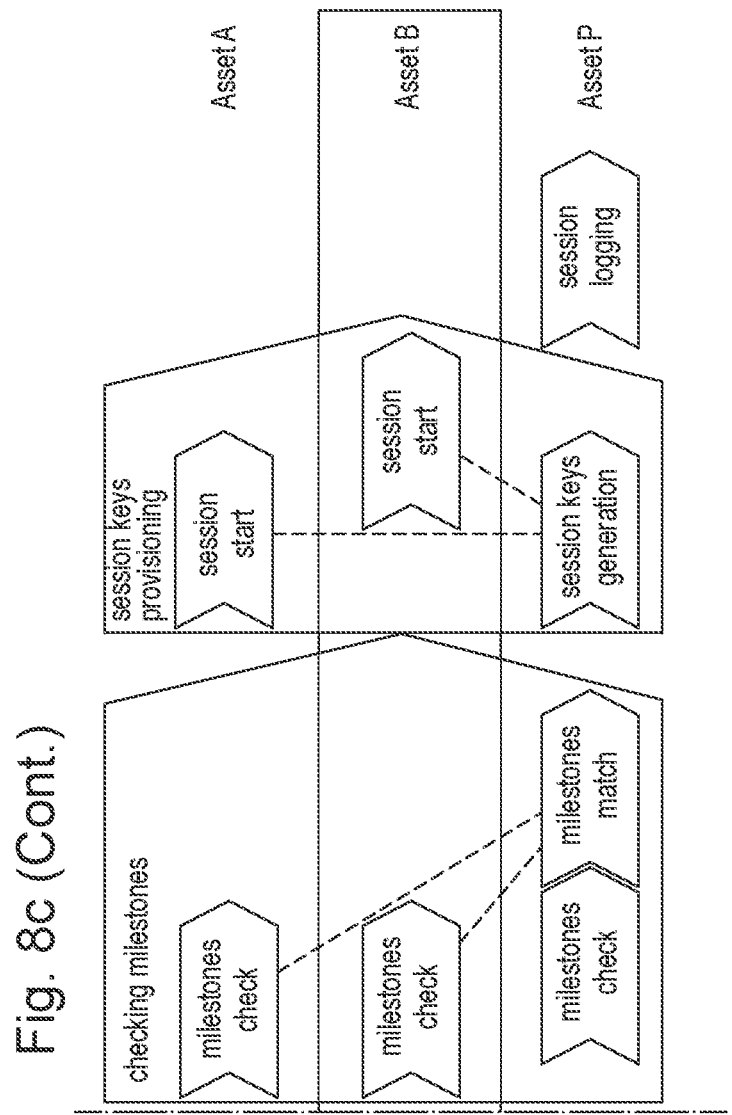

The first process is referred to as 'Asset Authentication Process' (AAP), or 'Automatic Authentication Protocol'. The AAP authentication process as described in the table is also represented as a flow chart in FIGS. 8a, 8b and 8c. FIG. 8a shows stages 401-416 of the authentication process, as shown in FIG. 6 and described herein below. FIG. 8b shows stages 417-435. FIG. 8c shows stages 436-450. Only the stages of FIG. 6 which occur in the AAP process are shown in the flowchart. This kind of authentication takes place when assets have previously authenticated to each other, and simply establishes a fresh OMEGA value, which is then used to derive a shared encryption key, as described above. This allows an encrypted communication link to be established. The devices authenticate by proving: who the assets are, what they can do, and what they know. Some checks are performed twice, while deploying different proof mechanisms. The AAP workflow checks the identity of assets, the system fit (i.e. the X-functions described above), and that a properly provisioned configuration is available for each of the participating assets.

AAP authentication is normally initiated by an asset (e.g. Asset A) if some payload data has to be transferred to another asset (e.g. Asset B), to which Asset A is not currently linked by a valid communication session. In this particular authentication protocol, in order to successfully authenticate, both assets have to possess matching configurations. The link between these assets has to be whitelisted, i.e. explicitly drawn on the backend GUI and the settings should be already provisioned.

The AAP authentication process could be initiated from the backend GUI or by an asset. If, during authentication, an asset finds a mismatch between the values received from authenticating peers and those it expects to receive, it cancels the workflow. After a predefined number of retrials, if the authentication still fails, then the identity of Asset A must be checked in order for the authentication to proceed during DWP (Deployment with Provisioning) as described below. In such a case, the proxy which is participating in the authentication reports the mismatch to the backend and/or to a dedicated reporting server. Based upon such a mismatch, it is possible for the administrator or the system to determine which asset is not as expected i.e. which is the 'troublemaker'. The system, specifically the backend can check the asset's digital twin as well as the correctness of the asset's configuration and can decide to exclude the troublemaker asset from communication immediately, or could cause the asset or other assets in the system to be re-provisioned.

In the AAP example described here, the authentication proceeds in a straightforward manner, since each asset 1a, 1 b, 1c has data, stored in memory, corresponding to inherent properties of that asset, for example its Serial Number, and also data corresponding to inherent properties of any previously authenticated asset. Using this data, and values exchanged during the steps shown in FIGS. 6a-6g, the assets can re-authenticate to each other and thereby generate a shared encryption key, which is randomized and one-time. The key can then be used for secure payload transmission between the assets, during the present authentication session. The communication continues for a limited time, which sets communication session boundaries. The AAP has to be executed anew if a particular session expires, and data transfer is to continue.

However, if an asset, e.g. Asset B, has not previously been 'deployed', meaning that all assets in the system have not been reconfigured to store data corresponding to inherent properties of Asset B, then the identity of Asset B must be checked in order for the authentication to proceed.

This variant of authentication is referred to as 'Deployment with Provisioning' (DWP).

Figure 9A:
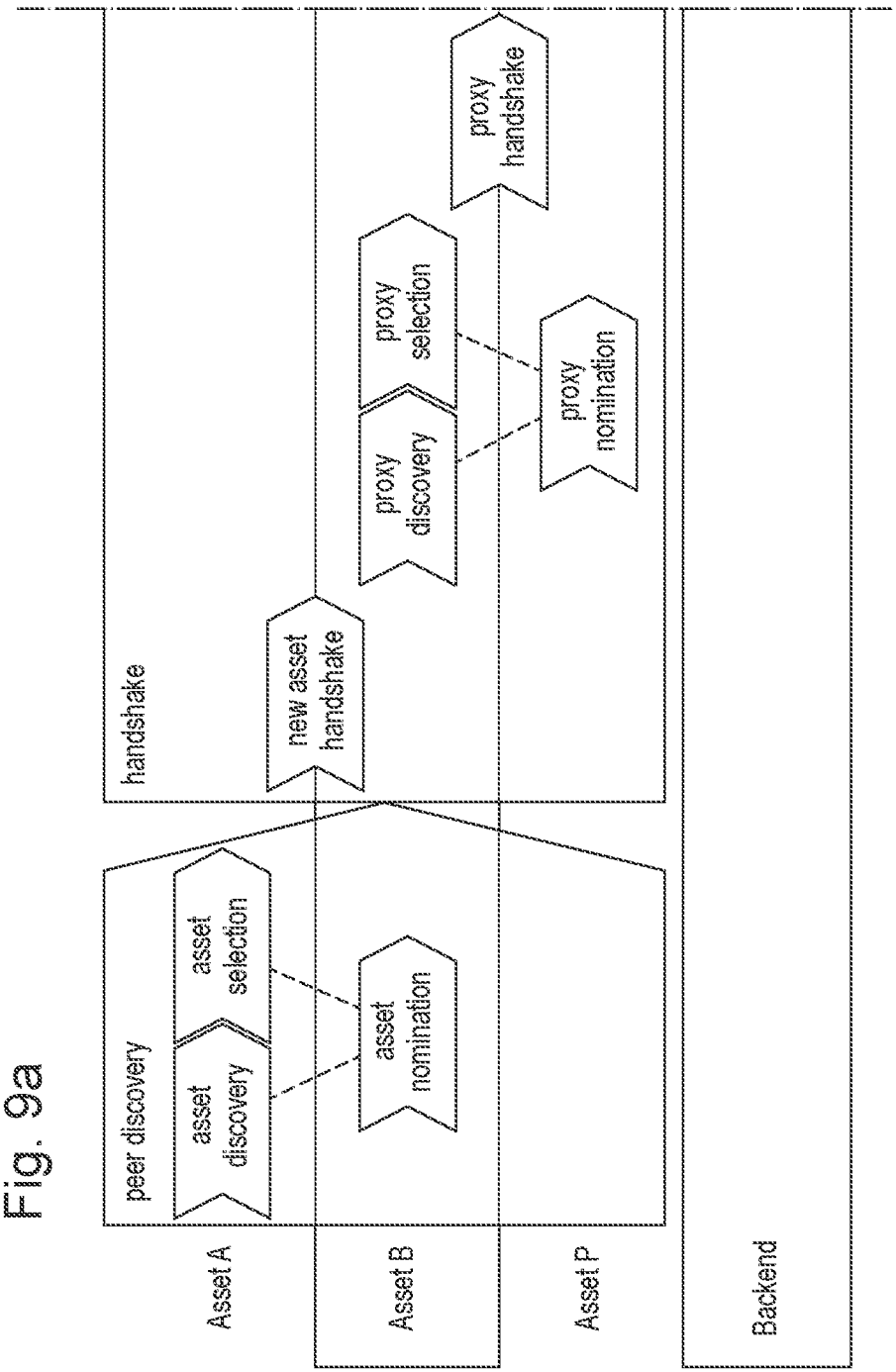
FIG. 9 (split across sub-FIGS. 9a-9b) is a flow chart representing the stages of the DWP process as described in the table of FIG. 6.
Figure 9A:
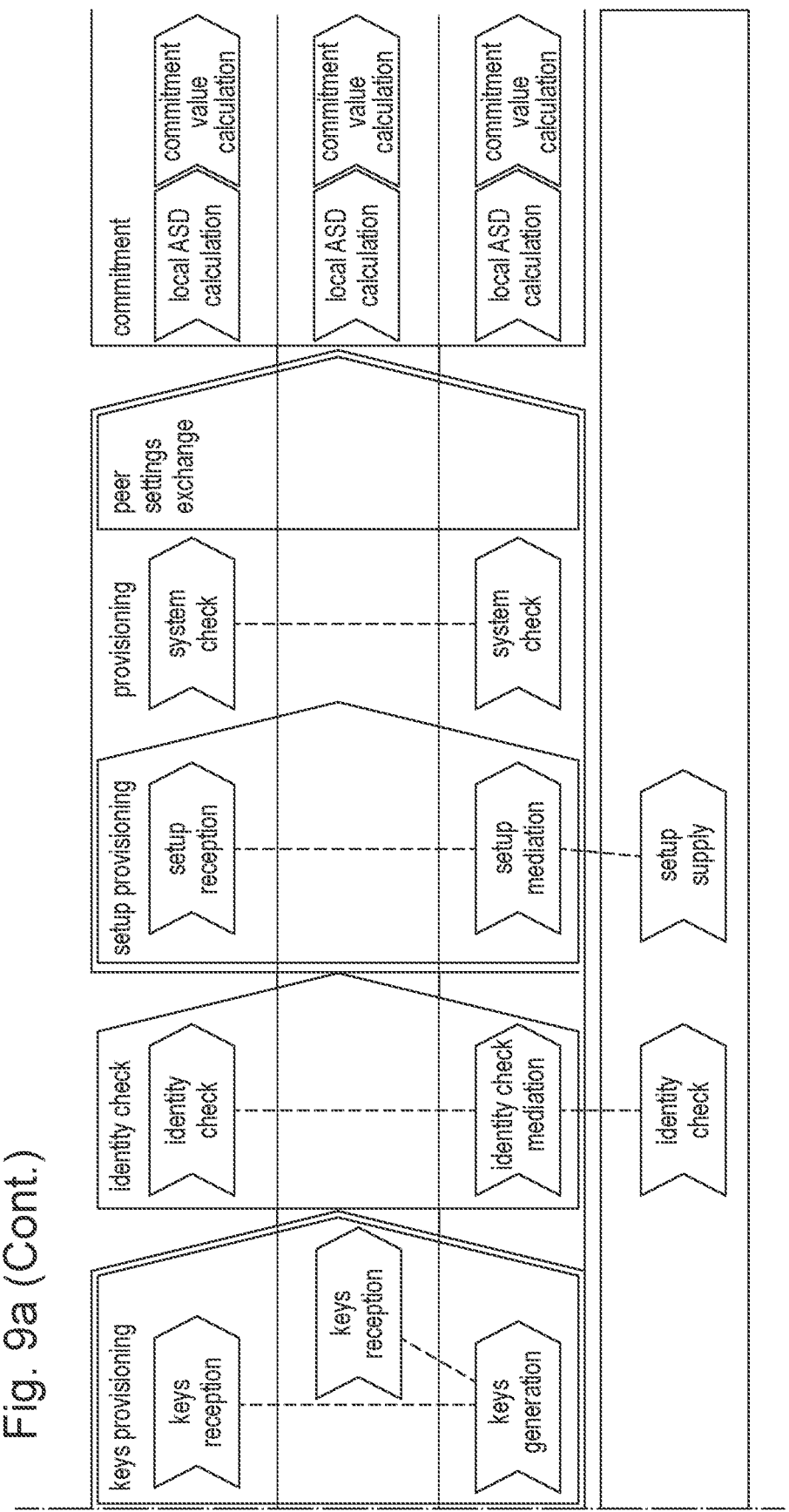
Figure 9B:
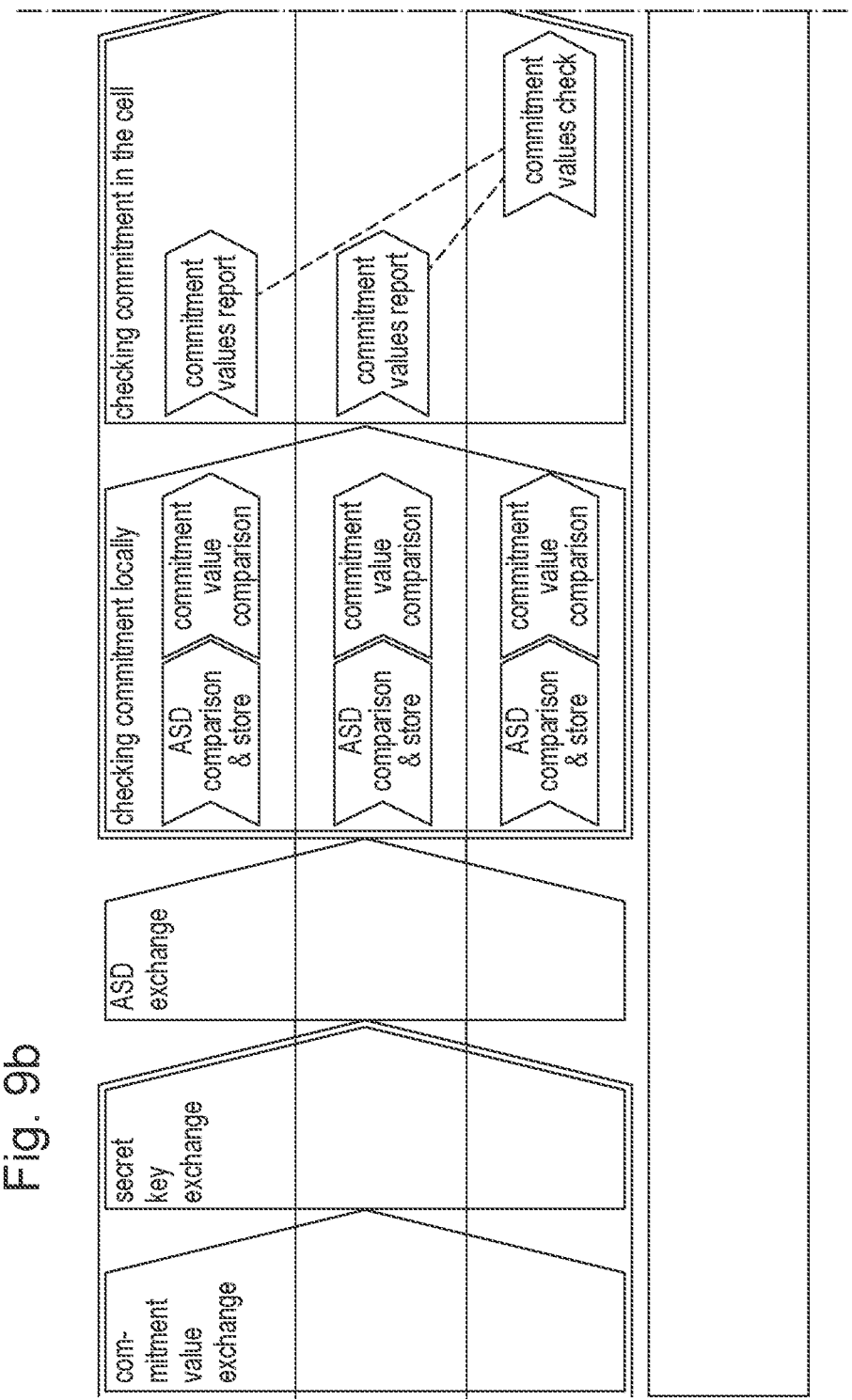
Figure 9B:
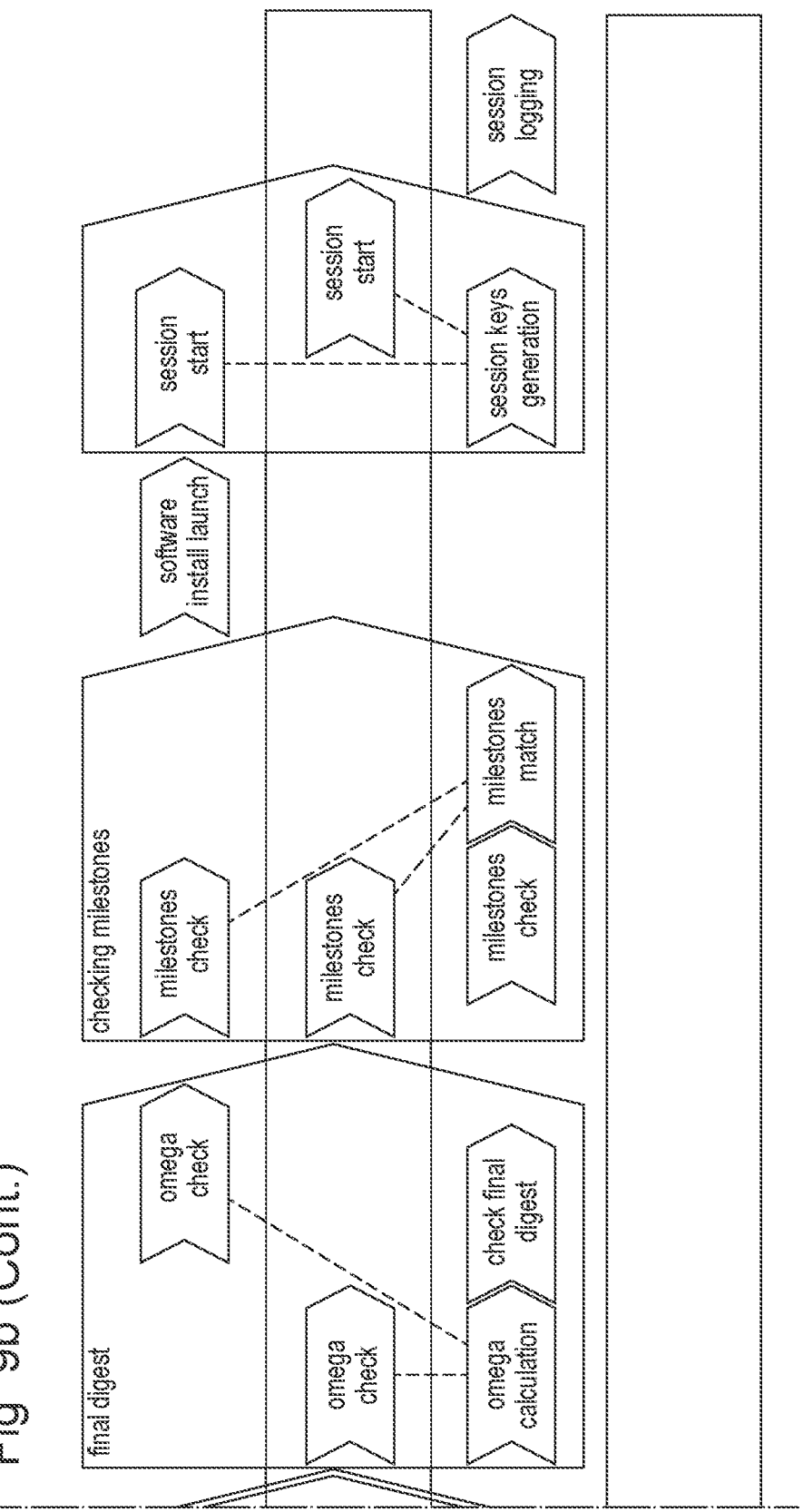

The Deployment with provisioning (DWP) process initializes an asset, e.g. asset A, and updates the configuration of Asset B, Asset P and optionally also updates the configuration of other assets in the system, based on properties of Asset A. The asset configuration of Asset A is firstly manipulated and stored at the backend service, forming a digital twin, which is secondly uploaded to the asset A as part of DWP. The DWP includes all the steps which are required for asset authentication (AAP) and also includes other checks. The stages of the DWP process as described in FIG. 6 are also shown as a flow chart in FIGS. 9a and 9b. FIG. 9a shows stages 401-415 (as described herein below) and FIG. 9b shows stages 416-450, as shown in FIG. 6. Only the stages of FIG. 6 which occur in the DWP process are shown in the flowchart. After a successful DWP process, an encrypted communication session has been established, showing that the assets have been properly provisioned. The length of this communication session may vary.

Since the configuration of each asset includes information about the configuration of all of that asset's peers, a closely linked, functional asset group, may demonstrate an "avalanche DWP" if the configuration of one asset within the group is properly altered. The "avalanche" process will follow down the linked chain of the connected assets until all assets have been provided with new configurations.

If an asset is in sleep mode, i.e. without active communication, when an avalanche DWP process occurs, that asset will miss the opportunity to participate, and by the time the asset wakes up it may have missed the opportunity to connect to the backend service. Since this asset will therefore be unable to successfully complete this particular DWP process, it will therefore be excluded from communication with its peers, until the next DWP opportunity occurs.

This risk may be lessened or avoided by waking an asset up at intervals to check if an asset network environment is present; and/or by providing instructions to users as to how to wake up the asset on demand; and/or by implementing wake-on-LAN functionality, which can detect and respond to DWP events of other assets.

DWP is normally initiated by an asset, that has no configuration on board; or that detects a configuration inconsistency; or that fails to successfully complete AAP authentication after several attempts, or that receives a command from the backend. A command to initiate DWP may be issued manually by an operator, or automatically by the backend service if an asset goes online and its digital twin has been updated.

The authentication process described here depends on two assets 1a, 1b wishing to authenticate and having the same asset configuration. Therefore, once the configuration of a particular asset has been changed, the configuration of all of that asset's peers must be updated. That is, the peers require a re-provisioning because their configuration becomes inconsistent within the actual asset system. The altered configuration of an asset alters its OMEGA calculation, as described below. If the configuration value of a particular asset has changed, and the configurations of other assets have not been updated, then the asset's peers will not be able to accomplish AAP with the asset. After several AAP attempts, each peer initiates DWP to update its own configuration and synchronize settings.

The DWP workflow checks asset identity, integrity (by checking commitment values, described later) and system fit (by checking X-functions). It authenticates assets based on: who the assets are, what they can do, and what they know, what universe (context) (Xv, Xn) they belong to.

In addition to AAP and DWP, a third variant is possible, shown in the table as "ARW", which stands for 'asset re-provisioning workflow'. This combines elements of AAP and DWP, for assets that have already been initiated, but where re-provisioning is required.

Figure 10A:
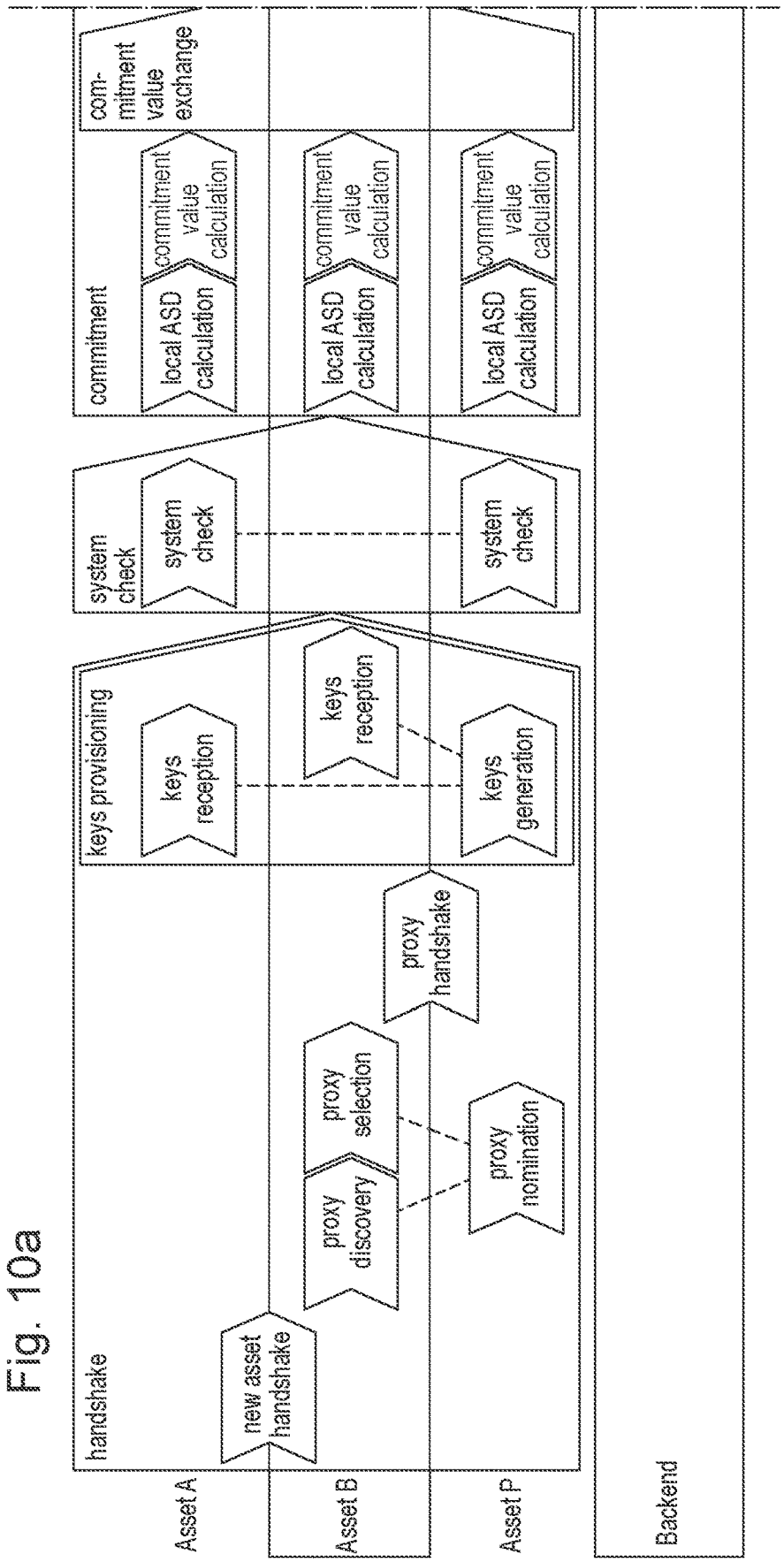
FIG. 10 (split across sub-figures (10a-10b) is a flow chart representing the stages of the ARW process as described in the table of FIG. 6.
Figure 10A:
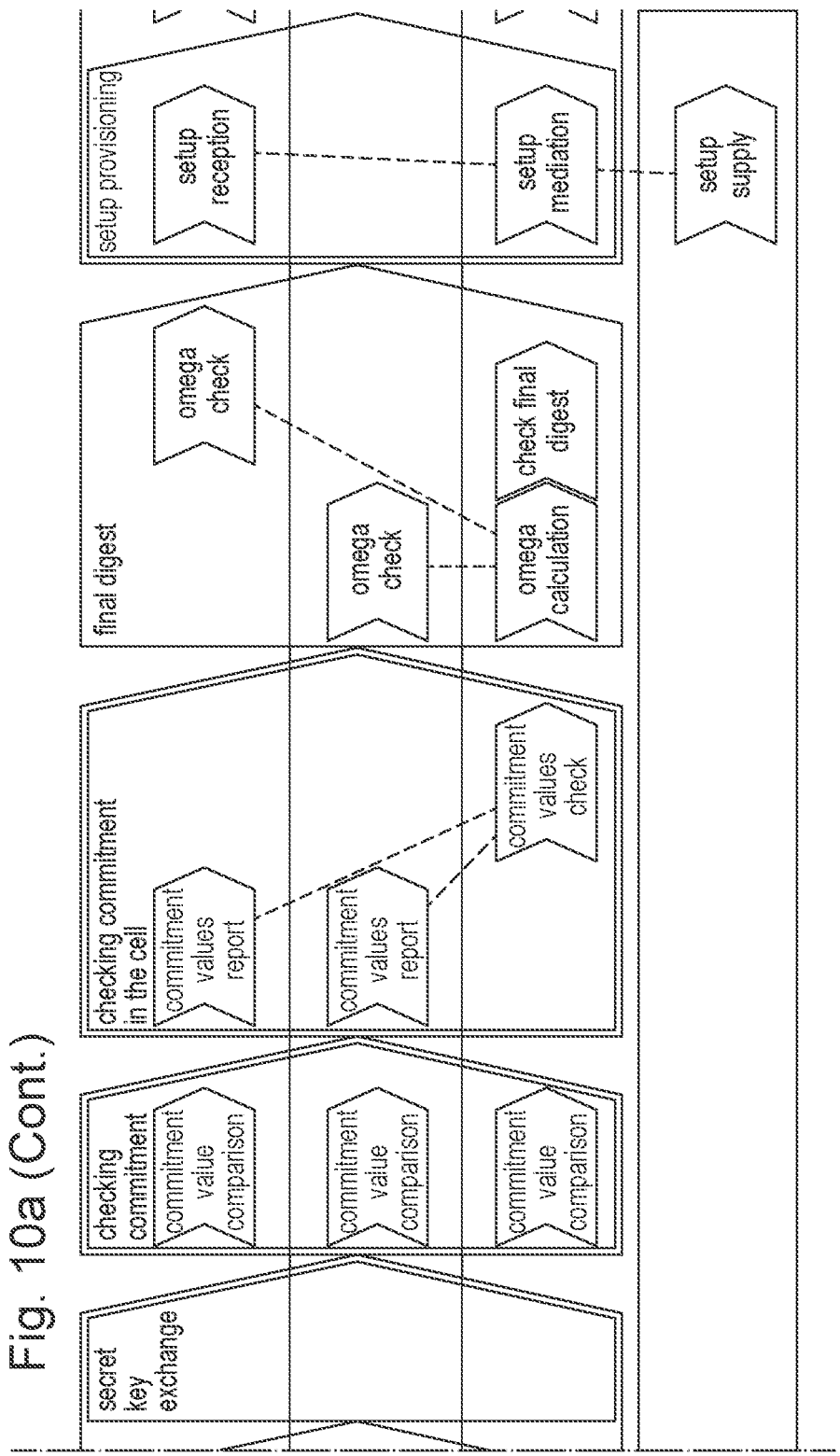
Figure 10B:
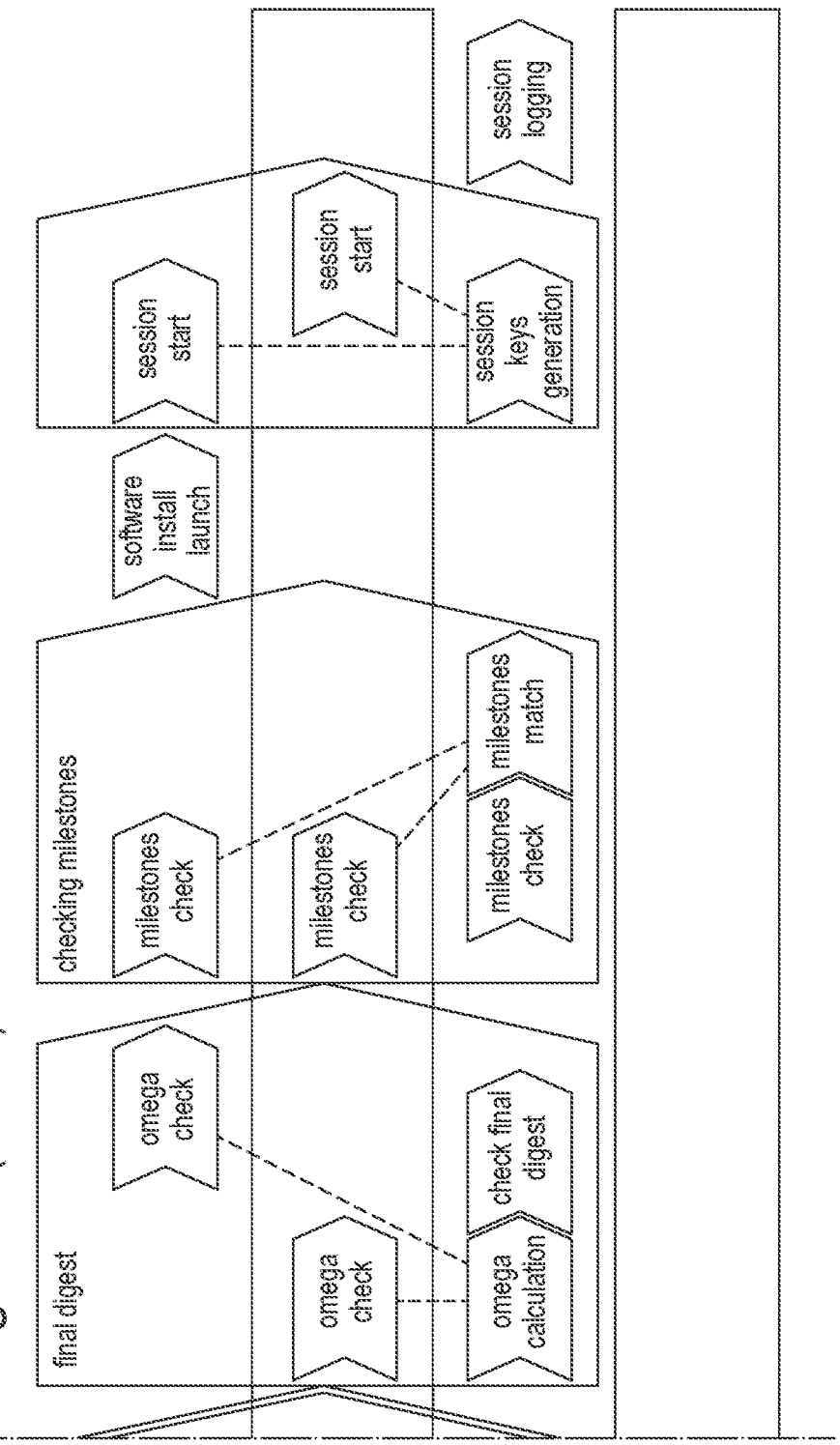

In general operation, all assets in the network will have successfully completed the DWP process and will be able to fulfil their functions without requiring access to backend. The AAP process will be used to authenticate between assets and securely transmit payload data. It may then happen that the administrator requires to change some data in the provisional specification of the assets (e.g. schedule of data transmission, send/receive permissions, etc.) and these changes would then have to be re-provisioned to the assets of the network. This is when ARW can be used to complete this process, without resetting an asset to its factory configuration. The stages of the ARW process as described in FIG. 6 are also shown as a flow chart in FIGS. 10a and 10b. FIG. 10a shows stages 401-426 (as described herein below) and FIG. 10b shows stages 427-450, as shown in FIG. 6. Only the stages of FIG. 6 which occur in the ARW process are shown in the flowchart.

In order to begin the authentication process, two assets 1a, 1b must find each other on a local area network (LAN), virtual private network or in different subnets. Once assets are in communication, and following the steps described above with reference to FIG. 3, the authentication and secure payload transmission process can begin. The authentication process in the case of DWP is more complex than AAP, since one of the assets is not initiated in the system. An uninitiated asset cannot reply to asset system members. It has no information about the asset system layout and where to send its requests. The authentication protocol described implements a strict whitelist principle. That is, an asset can only communicate regularly with assets whose UID values it has been configured with. An asset fresh from a factory does not have a fully formed UID containing customized fields. Such a non-initiated asset should be rejected if it attempted to initiate an authentication process.

In order for a new asset to be introduced into an established asset system, it should offer useful functionality. A new asset indicates its available functionality by broadcasting its utility parameter (its mission ID, or MID, as described above). As shown at step 401 of FIG. 6a, a new asset will seek opportunities to join an established asset network by transmitting its MID value, in a stage 401 referred to as 'asset discovery'. This is represented as block 300 in FIG. 5. If and when the IoT network has an established asset, which might be interested in the utility indicated by the MID, the new asset would receive a reply. This filtering by MID filters according to functionality and not identity and therefore is not as strict as filtering by UID values. A reply to a new asset from an existing asset in an asset system would be considered as an invitation to proceed with DWP, as shown at stage 402 of FIG. 6a. The interest in a utility is programmed in an MID white list, stored locally on each asset. If multiple sponsoring assets (potential MID 'consumers') exist, the fresh asset will receive multiple replies.

Upon receiving one or more replies, the new asset selects a communication counterpart with which to attempt a DWP authentication process. This asset selection stage is shown at stage 403 of FIG. 6a. In order to make this selection, the new asset may analyse two parameters in the reply packages which it receives from assets already deployed within the asset system; namely:

amount of available communication slots; and how many consecutive asset elections have been won by the replier.

A communication slot indicates a capacity of an asset 1a, 1b, 1c to establish a link and transfer data. The default amount of communication slots indicates aggregated asset capacity for simultaneous communication. It may be limited by processing power, envisioned data transfer speeds, or other reasons.

The more often an asset is successful in assisting new assets, as well as the more capacity it has to communicate with peers, the better candidate it is. Once asset selection, at stage 403, is completed, the A and B roles (i.e. asset A—inquiring asset, asset B—receiving asset, and a proxy asset P—an intermediator or 'referee') are set for the prospective communication cell (i.e. a set of three assets 1a, 1b, 1c which together participate in an authentication instance). Once the assets are authenticated the inquirer/receiver roles no longer apply and information can be passed in any direction.

Figure 7A:
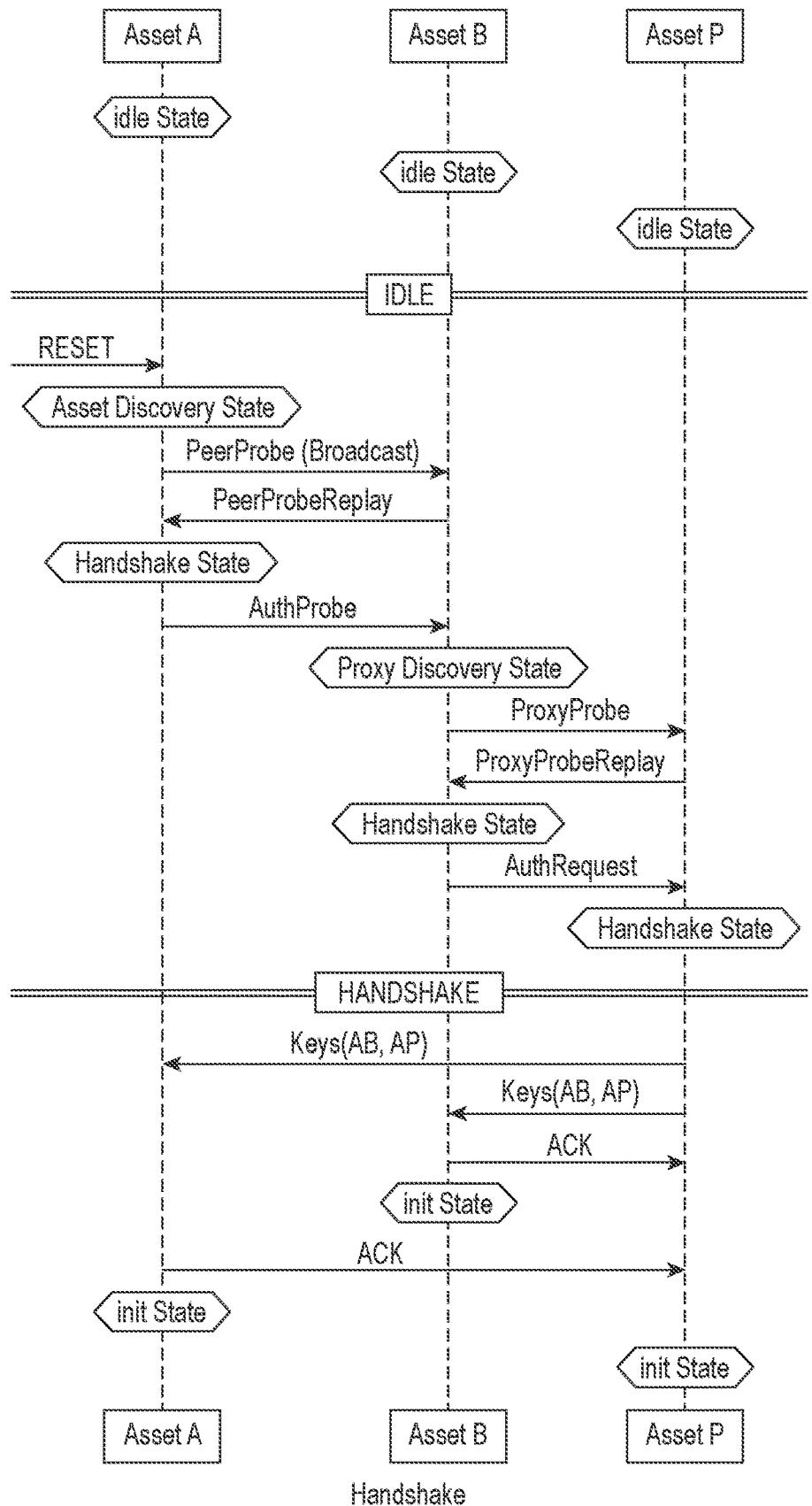
FIG. 7 (split across sub-FIGS. 7a-7e) is a message sequence chart for an authentication process embodying the invention.
Figure 7B:
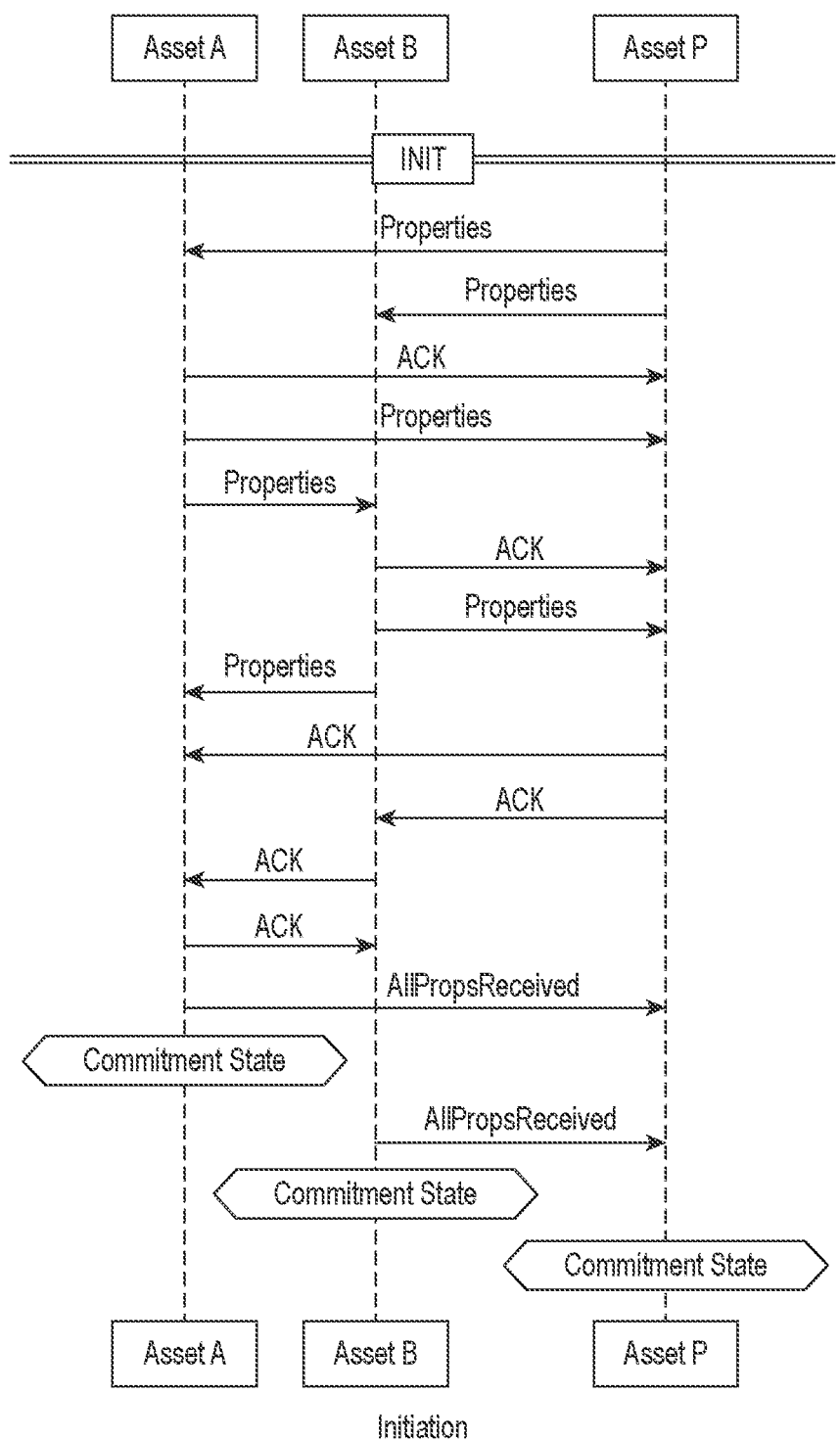

The authentication process starts with a request by asset A in a handshake sequence. This is represented as the "Handshake" block 302 in FIG. 5, while details of the messages that are exchanged are shown in FIG. 7a. The request is not encoded and contains a public key (asymmetric key), as shown at step 404 of FIG. 6a. In some examples, the public key is a lattice based asymmetric public key, specifically an NTRU key. The private-public key pair is generated exclusively on an asset, not outside of the asset, e.g. by trusted third parties. In reaction the peer B selects a proxy asset P and passes the public key to the proxy. This handshake process can include a number of stages (stages 405, 406, and 407) of FIG. 6a. If asset B already has a currently open authenticated link to another asset, which is available to act as a proxy, that asset can be used, including using a currently active shared encryption key to exchange data between B and P. Otherwise, asset B first seeks a list of assets which are online and available to act as proxies, and with which asset B has previously been authenticated, as shown at stage 405. At stage 406, the potential proxy detects this request and responds, sending a 'proxy election value' and indicating that it has available a connection to the backend. Asset B then chooses an acceptable asset to act as a proxy P, and authenticates with this proxy P, using AAP authentication, since the asset B has previously authenticated with the asset. This is shown at stage 407 of FIG. 6a.

Asset B then sends the request received from asset A, including the public key, to the proxy P, triggering the proxy P to generate symmetric AES keys. Each link, A-B, A-P and B-P has its own AES key, and each is different to the others, as shown at stage 408. The proxy then sends the respective symmetric AES keys to the communication cell assets A (A-P and A-B AES keys) and B (A-B AES key), at stage 409. The AES keys which are sent to the new asset, asset A, are encrypted with the public key which was included with the request sent by asset A. The key which is sent to asset B is encrypted with a regular session key, the B-P AES key, which is the result of the previous AAP authentication process which has already taken place between asset B and proxy P. Upon reception of the encrypted symmetric key, asset A deciphers the symmetric key using the asset A specific private key. Each asset has a specific private key which is stored on each respective asset and is not shared with other assets, and which corresponds to the public key which the asset shares. Other assets may then use the asset's shared public key to encrypt data e.g. data which is shared during the authentication process, which is then sent to the asset, which has the private key required to decrypt the data. Thus the private-public key pair is used to share data between assets during the authentication process.

Further asset data exchange (not payload) which occurs within the authentication session can then be encrypted using this symmetric key, freshly supplied by proxy, as disclosed earlier.

At this stage, in the case of DWP, anti-cloning markers (ACMs), which are randomised one-time values generated by the proxy, may also be sent to the assets. In particular, the asset P generates a first random one-time value, Marker A, which is sent to asset B, and a second random one-time value, Marker B, which is sent to asset A. Asset P also calculates a hash of these two marker values, HASH-AB, and sends HASH-AB to asset B. Once receipt of the markers and hash is received by P from A and B, P deletes Marker A, Marker B and HASH-AB from its memory.

In the case of AAP, each asset will have stored its respective marker, from an earlier DWP session (or from a renewal later in an AAP or ARW process, as described below). Asset B will also have HASH-AB stored.

In the case of AAP, assets A and B apply ACMs upon receipt of the keys, asset A will send an acknowledgement to P only, then asset B notifies asset A about the receipt of a new A-B AES key from P (using this fresh A-B AES key). Then Asset A will also send Marker B to asset B. Asset B will then calculate HASH AB, using the Marker B value it has just received, and the Marker A value it has stored. This will then be compared with the HASH AB value, which Marker B has stored. If these values match, then asset B sends an acknowledgement to P, indicating that they keys were successfully received and ACMs for subsequent authentication session must be re-generated and sent to asset A and asset B.

Then asset P re-generates new randomised one-time Marker A and Marker B, as well as calculating a new HASH-AB value from these new marker values. Asset P passes HASH-AB and Marker A to asset B, and Marker B on to asset A. These values are then stored by each of the assets A and B ready to be used during a later AAP authentication process. After A and B confirm receipt of their respective markers and the HASH-AB, proxy P deletes the Marker A, Marker B and HASH-AB values from its memory, and only after this moment the authentication process continues as described below.

In case of DWP, before passing any non-public, security-sensitive information between the asset and the system, an identity check has to be performed, as shown at stage 410. This is shown in the authentication flow diagram of FIG. 5 in the box labelled "Id Proof" along with system proof. The system (specifically the backend) checks to see whether the initiation of the particular new asset is intended by the system administrator. The asset P (proxy) checks if the system does really know to whom it is talking, i.e. if the asset A is expected. If the system does not know the asset, then an impersonation attack is suspected. Such an attack would try to elicit asset parameters to impersonate the asset later in communication with an authentic asset system.

First the Asset A has to submit to asset P (proxy) an identity marker which is intended to prove its identity. For example, the identity marker could be the serial number SN-A and public key PBKA of the asset A. As disclosed above, each asset has a serial number branded on to it by the manufacturer. In order to include an asset within the system the system administrator may read the serial number from the asset package paperback and enter the serial number in the backend GUI. This confirms the administrator's consent to add the asset to an IoT installation. The entry of the serial number by the system administrator may preferably be the final step in non-electronic data transfer on the way from an asset manufacturer to duty post, i.e. this is the final step which a person takes when commissioning an asset into a system. Electronic data transfer evasion may help to protect security-sensitive data from unintentional capture.

The identity marker is preferably never transported over the LAN and therefore an eavesdropping device would not be able to emulate the asset, or the system. The system has to then prove that it already knows the identity of this asset A, in advance, i.e. that it has been supplied to the system by administrator. Asset A does this by connecting to the backend using the proxy P. The backend is checking whether the serial number SN-A and the public key PBKA of the asset A have previously been known by the backend.

Over the A-P encrypted channel, the Asset P first requests the serial number from Asset A; this request includes a hash value, Salt-A, generated by the proxy. The Salt-A is necessary to enable the Asset A to calculate the hash from the concatenation of its serial number, the public key PBKA and the Salt-A. The hash is then submitted to Asset P who submits it to backend who checks whether it matches the hash recalculated by the backend based on the concatenation of the serial number and the public key PBKA stored on the backend and the Salt-A.

Asset A also generates Salt-P for backend and passes it to the backend over Asset P using the encrypted channel P-BK as part of its reply on the request to enable the backend to calculate the hash from the concatenation of the serial number and the public key PBKA stored on the backend and the Salt-P. The Salt-P is necessary to enable asset A to re-calculate the hash from the concatenation of the serial number and the public key PBKA and the Salt-P received from backend. This hash is also turned back to asset A who mutually checks whether it matches the hash calculated based on the concatenation of its serial number and the public key PBKA and the Salt-P stored at the moment on asset A.

The fact that both Asset A and the backend mutually check hashes of one another and return proper hashes indicates that they know a shared secret (i.e. the serial number of asset A, which is not public and cannot have been intercepted electronically), which is not shared with Asset P (proxy) and that the serial number of the Asset A, and the serial number as registered with the backend, match. Asset P (proxy) being intermediary between the Asset A and the backend has no way to acquire any knowledge of serial number of the asset A during the identity proof process. The proxy may be a "Backend Agent", or the proxy may communicate with the backend via a trusted "Backend Agent" with which the Proxy has an authenticated communication link. The Backend Agent (BA) is a virtual asset that is running authentication software according to the authentication method described herein as a real asset and operating in a docker container in Backend environment (e.g., on the same hardware). Normally BA generates no payload data. Every BA can be a Proxy in the described method. BAs have threefold duty: connecting Proxies to assets' Digital Twins on Backend to provision or re-provision an asset, participating in bootstrapping the first Proxy in the network that is outside Backend system, and bootstrapping very first B-P link between two BAs to enable provisioning and authentication of the very first new asset joining a network of assets authenticated using the present method. Not every Proxy can be a BA. If a Proxy is part of the network outside of Backend trusted environment, the Proxy cannot be a BA.

The backend may contain, or generate, a specific key "AES A-BE" for communication between Asset A and the backend. This key can be encrypted with the public key PbK-A of asset A and sent to Asset A, via P, to enable confidential communication (since P has no knowledge of the key AES-BE).

After this the backend supplies twin configurations for Asset A to Asset P, and Asset P supplies the configurations to both Asset A and Asset B.

An Asset network may optionally be divided into groups of assets based on certain criteria, and these groups can be created and maintained by the system administrator. Initial provisioning occurs next in the DWP process, at stage 411 of FIG. 6b. The digital twin of the asset A, which is being initiated, is uploaded to asset A, over Asset P, from the backend. The twin data is encrypted with a one-time encryption key obfuscated with a predefined part of the serial number of Asset A that is known to Asset A and the backend only. Asset P is never aware of the serial number of Asset A, so that if proxy is compromised, it cannot change the twin data of Asset A and provision the Asset A with doctored twin data. Asset P is informed by the backend of the expected ASD (asset settings digest) of asset A. Using the twin information, Asset A calculates its own UID value. Further communication then uses asset A's UID value as asset A's identifier, while prior network packages contained only the HID information together with customization fields which were set to empty. After this stage, it is then possible for this asset to be identified entirely by this UID value.

The authentication continues by checking 'universes' i.e. universe values, also referred to as NPH values, i.e. checking the asset's system compatibility, as shown at stage 412, shown in FIG. 6b. This stage may form one part of the provisioning process. Assets which have different 'universe' parameters are incompatible as a result. Asset A checks the proxy's system settings. The proxy checks Asset A's system settings. To protect the data from a replay attack, every universe value is calculated with a one-time random salt (HSH_NONCE) that is twenty or more bits long. Once Asset A establishes that the NPH values match, it stores its newly calculated UID value, however installation of any software applications which it requires takes place only successful authentication of Asset A and Asset B.

All peers (i.e. Assets A and B, and proxy P) then exchange their setting data, also referred to as configuration, as text, but encrypted using the symmetric key, at stage 413. This is represented by the "Init" block 303 in FIG. 5, and the messages exchanged in this initiation phase are shown in more detail in FIG. 7b. This exchange of settings serves as a first milestone "M1", through which all of the peers must successfully pass in order to successfully complete the authentication process, as indicated by the "M1" shown in FIG. 6b. This process does not occur in the AAP authentication.

The next stage in the process is stage 414, "ASD calculation", in which either an asset settings digest (ASD) is calculated from scratch by each asset (A, B, and P) in the communication cell (process a) or a historical stored value of the ASD is used by the asset (process b). In order to calculate an ASD value, all assets in the communication cell calculate hashes of N blocks of their plain text configuration information (i.e. from the asset's settings—consisting of UID, INFO and PS) INFO includes individual device information, such as device name, Hardware ID, Model ID, Media ID (pressure, temperature, . . . ) and other data defined by its owner. PS stands for permissions specification, and represents what the device is provisioned to do and what it is not allowed to do. The ASD value is then calculated by taking the hash value of the hashes of every of N blocks. The formula for calculating the ASD of a given asset is:

$$ASD_n = \text{hash}(\text{hash}(CS_n) \cdot ASD_{n-1}),$$

where $CS_n$ is checksum of n-th block of asset's plain text configuration information, $ASD_n$ is ASD of n blocks of asset's plain text configuration information, $n \in N$, N is number of blocks of asset's plain text configuration information, $ASD_0 = \text{NULL}$.

Figure 7C:
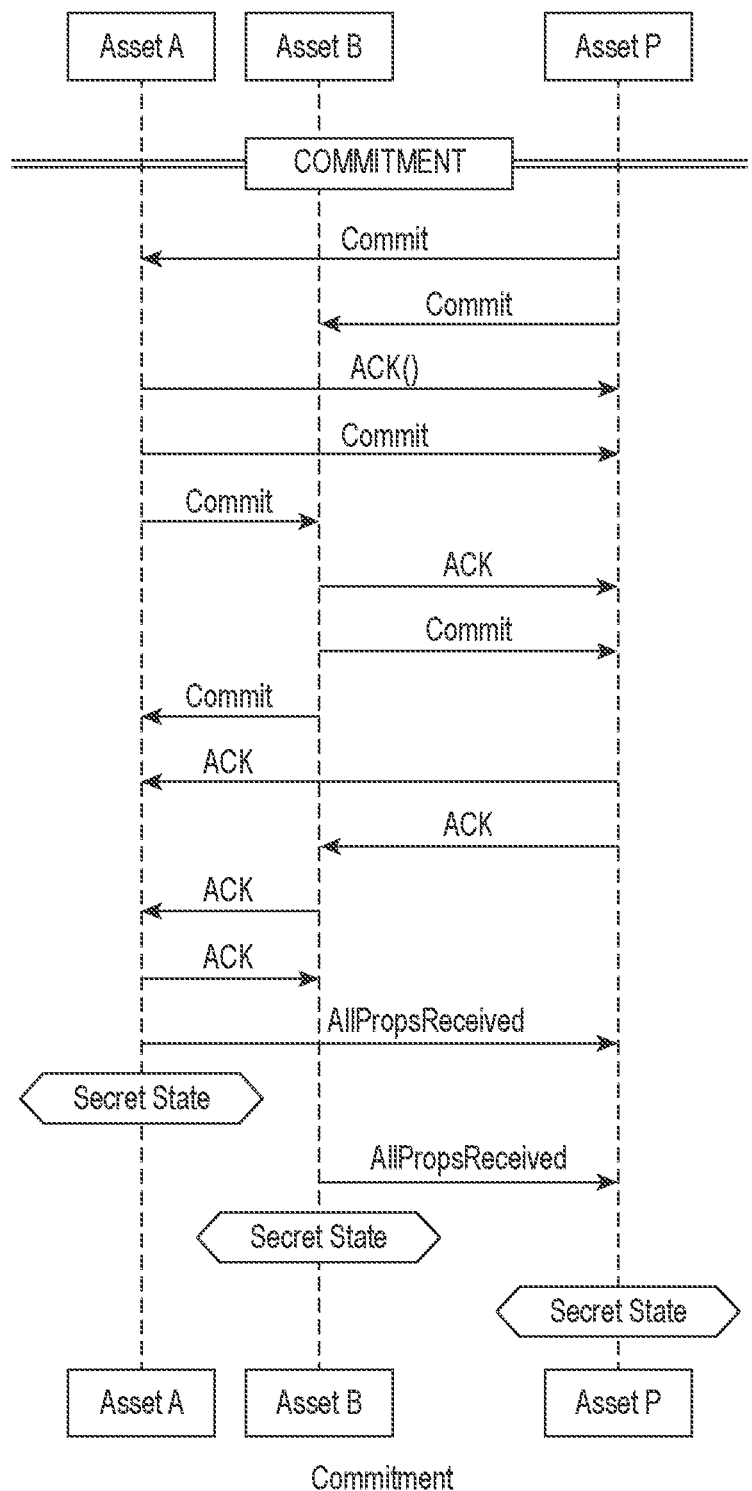
Figure 7D:
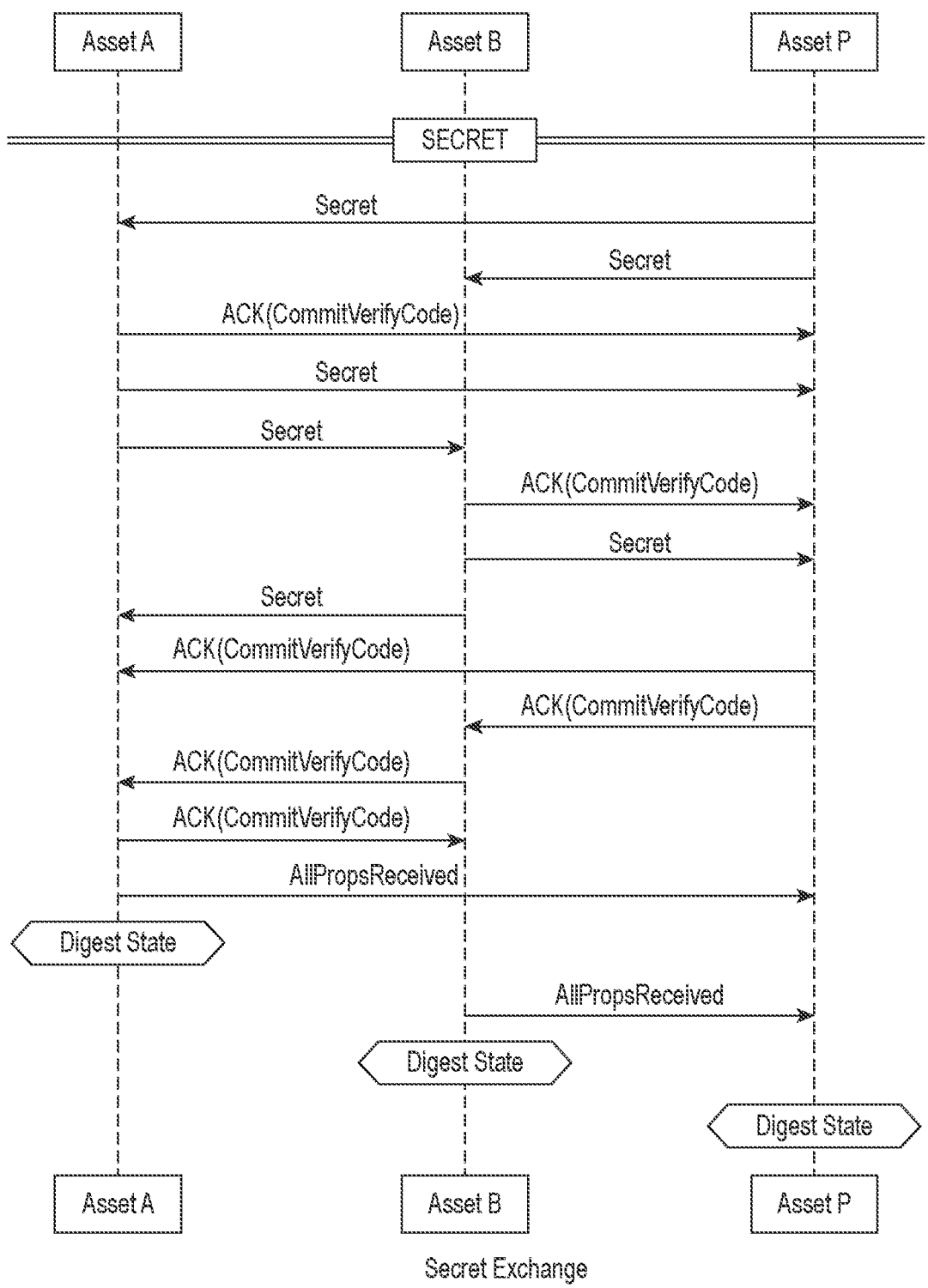

The DWP process then proceeds further with the exchange of one-time digest values. The one-time asset digest value, also referred to as a "commitment value" is calculated at stage 415, as represented by the "Commit" block 304 of FIG. 5. The sequence diagram of FIG. 7c provides details of the data exchanged in this stage. The commitment value is calculated by salting the ASD value from stage 414 with a one-time randomized preferably reverse resistant secret key as well as that asset's universe identifiers Xv and Xn. The calculation of the commitment value may also include asset A Hardware Signature (HS) which is SHA-3 hash of the unique set of hardware ID value(s) that are hardwired (baked-in) into the live processor, memory or other asset hardware that can be called directly on the asset during execution of the method described herein. This, together with anti-cloning markers, described above, helps to prevent cloning of an asset, which is particularly beneficial in a case in which the lifespan of a (or each) payload (operational) AES encryption key is not shorter than the time required to create a clone.

The random one-time key is also referred to as an "ASSET_SECRET value" and is 224 or more bits long. It is a concatenation of a 204 or more bit long random value, "ASSET_NONCE" and an AES-key excerpt, a session specific one-time random value, 20 bits or more long. Salting the asset settings digest with this random value provides protection against replay attacks.

Each asset in the communication cell then sends these one-time digests to the two other peers, at the "commitment value exchange" stage 416. At the end of the process each asset 1a, 1b, 1c has three sets of one-time digest values. This stage is the second milestone (M2) in the authentication process. Additional security can be provided by sending commitment values via a secondary communication band. This creates structural complexity of the protocol and demands additional non-trivial measures from intruders. For security reasons assets, during day-to-day operations, peers do not store or disclose the configuration information of their assets in clear text or the hashes of N blocks of configuration information or even encrypted (as occurs at stage 413); instead pairs of asset settings digests (ASD) and asymmetric asset's public key (APBK) are used to reference the asset's configuration information.

Referencing an asset on side of peers using the pair ASD-APBK is required to eliminate the possibility of authentication for a rogue asset that uses a stolen ASD of a compromised asset, while the compromised genuine asset is being subjected to DOS\DDOS, (Distributed) Denial of Service, by an adversary. Asset's information stored on other assets may be referenced by an Asset Identity Signature (AIS) as represented schematically in FIG. 12, which shows as an example the AIS 112 of Asset A stored on Asset B. The Asset Identity Signature (AIS) 112 may include the ASD of asset A 116, the Asset PBK of asset A 118 and the HS of asset A 120, as described above, which together form a "real" part (or constant part) 114 of the AIS. The AIS may also include an "imaginary" part (or variable part) 122, containing variable data, including anti-cloning markers (ACM), Marker A, Marker B (in this case ACM of asset A 124) and/or HASH AB 126, as described above. In this case the Asset Identity Signature is represented on other assets by the parameters ASD, PbK, HS and ACM.

The APBK key of an asset crosses the asset's boundary only once during the DWP process, and during the AAP process, when assets "live their own life" without accessing the backend, as well as during the ARW process, the APBK key is not disclosed by the assets any more during the authentication process. Optionally, a second time at which the APBK key could cross an asset boundary is during re-provisioning of an earlier authenticated asset in the network. Assets never disclose their asymmetric private key, they only use it for deciphering.

Peers each have to know the secret key value used by each of the other peers in calculating the digest value, in order to be able to recalculate the commitment values and check that they are correct. So the next step (the "Secret key exchange" step 417 of FIG. 6c) for all variations of the authentication process sees each asset sending its ASSET_SECRET value to both of its peers in the communication cell. At the end of the process each asset has three ASSET_SECRETs. This stage is the third milestone (M3) in the authentication process.

This phase is represented by the "Secret" block 305 in FIG. 5. The messages exchanged are shown in more detail in FIG. 7d.

The next stage 418, "ASD exchange", is required only for DWP, and not in the AAP process. All three assets in the communication cell have stored their own hashes of N blocks of their plain text configuration information (i.e. from the asset's settings—consisting of UID, INFO and PS) and an asset settings digest (ASD) value, based on the N block hashes. All three assets then send the N hashes and the ASD to both of their peers. At the end of this stage of the process each asset has three pairs ASD—APBK—the asset's own ASD-APBK pair and two ASD-APBK pairs of the peers. At the next stage 419, "ASD comparison & store", each asset calculates the ASD value of each of its two peers, based on the hashes which is has previously received at stage 413. Each asset then compares the calculated ASD value with the ASD value received from each respective peer. Upon determining that the ASD value is correct, each asset removes the hashes which it received from its peers from its memory, and instead stores the ASD value of each peer.

The next process (the "commitment value comparison" step, 420) checks whether the commitment values received by each asset match commitment values calculated locally by each asset. It proves that the peers are who they are expected to be. In the case of AAP or ARW, in which the assets have previous been authenticated to each other, each asset has stored in its memory the pair ASD-APBK of the other asset. Each asset therefore uses this pair ASD-APBK, together with the secret key they have just received, and locally calculated universe parameters Xv, Xn to recalculate the commitment value and check that is it correct.

In the case of DWP, each asset does not have a stored ASD for the other asset, but they have previously been sent this information, and have also previously been sent, at stage 413, the settings information i.e. the hashes of N blocks of their plain text configuration information and an assets settings digest, ASD, based on the N block hashes, for each of their peers. Each asset then recalculates its peers' ASD values from scratch using the N hashes representing N blocks of settings information in stage 419, as described above. Using the secret key received at stage 417, each asset then calculates the one-time digest commitment values of its peers and confirms that the commitment values match. This stage is the fourth milestone (M4) in the authentication process.

The next stage, 421, is then the "commitment values report" stage, in which the recalculated commitment values are received by the proxy asset P. Then, in the "commitment values check" step, stage 422, the assets of the communication cell have each proven that they know asset specific settings information, which they should know, about themselves. The proxy asset 1c then checks that the commitment values calculated by each of the other assets 1a, 1b are the same. For this purpose, asset A 1a and asset B 1b send the full set (all three commitment values) to the proxy 1c. The proxy 1c checks that values do match among each other.

The session descriptor OMEGA is then calculated, at stage 423, after the commitment values have been proved to be correct.

This phase is represented by the "Digest" block 306 in FIG. 5. The messages exchanged are shown in more detail in FIG. 7e.

The OMEGA value includes the random numbers ASSET_SECRET, generated by each of the assets, and therefore OMEGA is unique for each session. The proxy asset P initiates this process by first calculating an OMEGA value, including the random values shared in this particular authentication session, and then sending this value to each of the proxy assets A and B. Then, at stage 424 "omega check", the assets A and B each calculate the OMEGA final digest value themselves, and check that this value matches the value sent to them by the proxy. Completion of this stage of the authentication process is the fifth and final required milestone, M5.

The OMEGA value is calculated as a SHA3 digest from three concatenated asset settings digests salted with session secrets.

$$\Omega = \text{hash}(K \cdot \text{INFOS} \cdot Xn \cdot Xv),$$

$\Omega$ is SHA-3 hash of concatenation of K, INFOS, Xn and Xv where $$K = S_A \oplus S_B \oplus S_P$$

where $S_X$ is the secret key of asset x, and where $\oplus$ represents bitwise XOR.

INFOS is a concatenation of the information for every asset participating in the authentication process, sorted in alphabetic order before the concatenation: $\text{ASD}_A \cdot \text{ASD}_B \cdot \text{ASD}_P$ The asset-settings digests of three participating assets summarize the asset's configuration state. The digest length is 128-512 bits. The digest should not change during an ongoing authentication session. The session secrets are one-time semi-random variables. Their length is 224 bit and may be more if the assets in the network have sufficient computing power. Every participating asset calculates its session secret anew for every authentication instance. It changes OMEGA every time, when a new authentication attempt is pursued for the same set of assets.

At stage 425, the results of each significant authentication phase are digested into a check value in the "Milestones check" process. This stage of the process occurs in all variations of the authentication process, AAP, ARW and DWP.

Checking milestones CM value:

$$CM = \text{hash}(\text{ASD}_P \cdot C_P \cdot C_A \cdot C_B \cdot S_P \cdot \Omega_P),$$

SHA-3 hash of concatenation of the following values:
$\text{ASD}_P$—asset settings digest of proxy P,
$C_P$—commitment of asset P,
$C_A$—commitment of asset A,
$C_B$—commitment value of asset B,
$\Omega_P$—OMEGA value calculated by proxy P,
$S_P$—Secret key P.

For authentication of gateways, servers and other high performance assets, to further strengthen the protocol, the advanced checking milestones value ADCM can be calculated using the following formula:

$$\text{ADCM} = \text{hash}(\text{XOR}(\text{ASD}_A \cdot \text{ASD}_B \cdot \text{ASD}_P) \cdot \text{XOR}(S_A \cdot S_P \cdot S_P) \cdot \text{XOR}(C_A \cdot C_B \cdot C_P) \cdot \text{XOR}(S_A \cdot S_B \cdot S_P) \cdot \Omega_P),$$

SHA-3 hash of concatenation of the following values:
$\text{XOR}(\text{ASD}_A \cdot \text{ASD}_B \cdot \text{ASD}_P)$—bitwise XOR of asset settings digest $\text{ASD}_X$ of asset A, B and P respectively,
$\text{XOR}(S_A \cdot S_P \cdot S_P)$—bitwise XOR of one-time secret keys $S_X$ of asset A, B and P respectively,
$\text{XOR}(C_A \cdot C_B \cdot C_P)$—bitwise XOR of commitment values $C_X$ of asset A, B and P respectively,
$\text{XOR}(S_A \cdot S_B \cdot S_P)$—bitwise XOR of secret keys $S_X$ of asset A, B and P respectively,
$\Omega_P$—OMEGA value calculated by proxy P.

Assets A and B calculate their check values, and then each send these values to the proxy. To improve security, the secondary communication band could be utilized to send these check values to the proxy. The proxy calculates the CM and/or ADCM value and then compares it with the values received from the assets and this proves, if the values match, that all three assets 1a, 1b, 1c in the communication cell have passed each authentication stage properly. It proves that there has been no interference with the code and that none of the assets skipped any of the stages of the authentication process.

In the ARW authentication process variant, stages 426, 427, 428, 433, 434, 435, 436, 437 438, 439, 440, 441, 442 and 445 occur after the stages already described, and correspond to the processes shown at stages 411, 412, 413, 414, 415, 416, 418, 419, 420, 421, 422, 423, 424, 425 respectively. These process stages therefore occur twice in the case of ARW authentication, but the second time these stages occur there is no exchange of secret keys. This is because the newly provisioned settings will result in different ASDs, and a successful run of the stages 426-445 proves that all assets in the cell A-B-P may trust each other again and that the new provisional specifications have been applied successfully. There is no need for a second exchange of secret keys since it is the same active authentication session, and therefore the one-time secret keys for the assets remain the same throughout the session.

In the ARW authentication variant, there are a number of additional stages. At stage 429, if an asset's ASD value has changed since the last time it was sent to the other assets in this communication cell, then that asset e.g. Asset A, informs the other assets about the change by sending its updated hashes to the other assets. Then at new stage 430, "ASD inquire", the receiving asset e.g. Asset B inquires with the updated asset for its updated ASD value. At "ASD report" stage 431, the proxy responds to the inquiring asset with the most recent ASD which it has for the updated asset. Then at stage 432, the "ASD proof stage", the asset which receives the new ASD value from the proxy e.g. Asset B, compares the ASD value to an ASD value based on the updated hash values which it previously received at stage 429, and confirms that these values match. Then, at stage 444, referred to as "ASD list update", the initiating asset e.g. Asset A, updates the list of assets which are informed about its new ASD e.g. asset B is now on the list of informed assets.

At stage 446, (which occurs in all variants of the authentication process) it is checked by the proxy that the results calculated by all of the assets are the same i.e. the proxy then confirms that all of the three calculated OMEGA values match. Once the proxy P confirms authentication e.g. by setting a session flag to "AUTHENTICATED", proxy P and asset B each submit their public keys to asset A, which stores them, for use in future authentication processes.

Then at stage 447, which may occur only in the DWP and ARW processes, software is installed on the respective assets, by an asset application launched by the asset, and specified in the settings of the respective asset.

Then, at stage 448, the proxy 1c issues new AES session keys. There is a specific session key for each of the possible encrypted communication channels resulting from the authentication process A-P, A-B, B-P, and there may be separate keys for each direction of communication between these asset pairs e.g. A-P and P-A, giving a total of six AES keys. These session keys are calculated by the proxy, seeded by the final digest OMEGA The proxy 1c then sends the relevant encryption keys (also referred to as AES session keys) to the peers 1a, 1b, which store these to use as a shared encryption key in communication i.e. for payload encryption, during the currently active communication session, as described above.

In some embodiments, the payload AES keys may be generated by authenticated assets, e.g. A-B and A-P by asset A, P-A and P-B by proxy P, and B-A and B-P by asset B, then the asset would confidentially exchange the respective keys using relevant NTRU PbK keys For transmitting payload data e.g. an operational message 101, the message format may be used as shown in FIG. 11. In this format, a total payload 100 is encrypted using the device pair-specific (and possibly direction specific) AES key. This payload message includes additional components (in addition to the operational message 101) to be checked by the receiving asset.

Specifically, the operational message 101 is prepended by OMEGA 102, the final one-time digest value described above. The operational message 101 is also prepended by the Checking milestones (CM) value 104, described above. The operational message may also be prepended by service data 106.

The block of data containing operational message 101, OMEGA 102, CM value 104, and service data 106 is appended by SHA-3 hash 108 of all the data in the block and by padding value 110, which fills up block of data 101, 102, 104, 106, 108 with preferably random bytes with the last byte (in the padding) defined by the number of padding bytes, to ensure that all AES cypher blocks are of 16-bytes size for the data inside total payload 100.

When the receiving asset decrypts the payload envelope, the first thing it checks for is envelope integrity (by checking the SHA-3 hash 108), then it checks if the digest value 102 matches the expected value, then if the CM value 104 matches the expected value. If these checks are successful it then reads the operational message 101. This may be done by the asset service, and once completed the operational message 101 will be submitted to the final recipient e.g. the asset application.

The new AES session keys can also be used as authentication keys during subsequent authentication sessions e.g. the pre-existing B-P AES key described above, used to encrypt information transmitted for mutual authentication, but not used to encrypt payload data.

Thus, at stage 449, an encrypted communication session is started, using the session keys calculated during the authentication session. The proxy then assigns a UAN number to the session and, at stage 450, logs the session to the backend or the reporting server. If no authenticated link to backend is available at the time, the proxy stores the log and then sends the log to the backend at a later time when they are connected. This logging documents successful ending of the authentication process.

Distributed Internet of Things (IoT) networks may have functional redundancy, such that many network nodes (e.g. assets 1a, 1b, 1c) can substitute for each other in fulfilling basic network-supporting services. There is no need for a central authority and service to assist network members in delivery of their function according to their current provisional specification. This is similar for the authentication and communication processes disclosed herein—any asset can fulfil any role in the process, unless restricted by computational capacity. The backend described herein does not act as a central authority for authenticated assets during their normal operation—rather it carries out the roles of intelligent onboarding and provisioning and acts as a digital twin management hub for the asset network. An asset's priority may vary, but its ability to perform its core duties remains.

Normally, asset applications 4a, 4b, 4c and the underlying security layer described herein will function in a quasi-structured environment. After a finite period of time all initiation processes settle down, and communication happens regularly via recurring events among the same set of network nodes. However, before this happens, and before a cache within the asset (which stores previous authentication links) is filled with proper entries, calls to an unknown service provider are necessary for the system to start set up, and thus the distributed network is arranged to allow these. That is, there is a set of functionality that must be performed without prior knowledge of network topology, taxonomy and population, i.e. in a non-structured environment.

Discovery processes may be used to determine information about an unknown environment. As a result of announced discovery, some network members may nominate themselves for a role that has to be fulfilled—i.e. active nomination. Sometimes discovery occurs unannounced, in silence by observing network traffic. Network nodes which seem to be able to fulfil certain roles may be passively nominated—i.e. nominated without their consent. Upon collecting nominations, a node that demands a service to be fulfilled by another party, may select the best fulfilment candidate and initiate service delivery request.

Therefore, a distributed IoT system requires a set of processes: discovery, nomination, selection. However, these processes are inefficient and slow. The larger the IoT system, the slower and heavier these processes might be. Therefore, the authentication and communication protocol described herein minimises the use of these processes. Discovery is used only as a fall-back mechanism, when all other methods don't produce the expected result.

A discovery process may be needed in the exemplary process described above on only two occasions: firstly if a new and uninitiated asset attaches to the network, and secondly if none of the peers already known to an asset which wishes to authentication are suitable to act as a proxy, in which case proxy discovery occurs, as described above.

Once authentication has occurred, all three assets 1a, 1b, 1c are equally trusted partners. There are then three authenticated links: A-B, A-P, B-P. Each link has its own randomized and unique AES-key. For example, asset A cannot eavesdrop on communication between asset B and asset P, as it does not have the required AES key. After authentication, the links between authenticated assets are symmetric. Data can be passed uninhibited in any direction, for example from asset A to asset B or from asset B to asset A. This can all be done transparently to the existing software applications 4a, 4b, 4c, as already explained.

Figure 13:
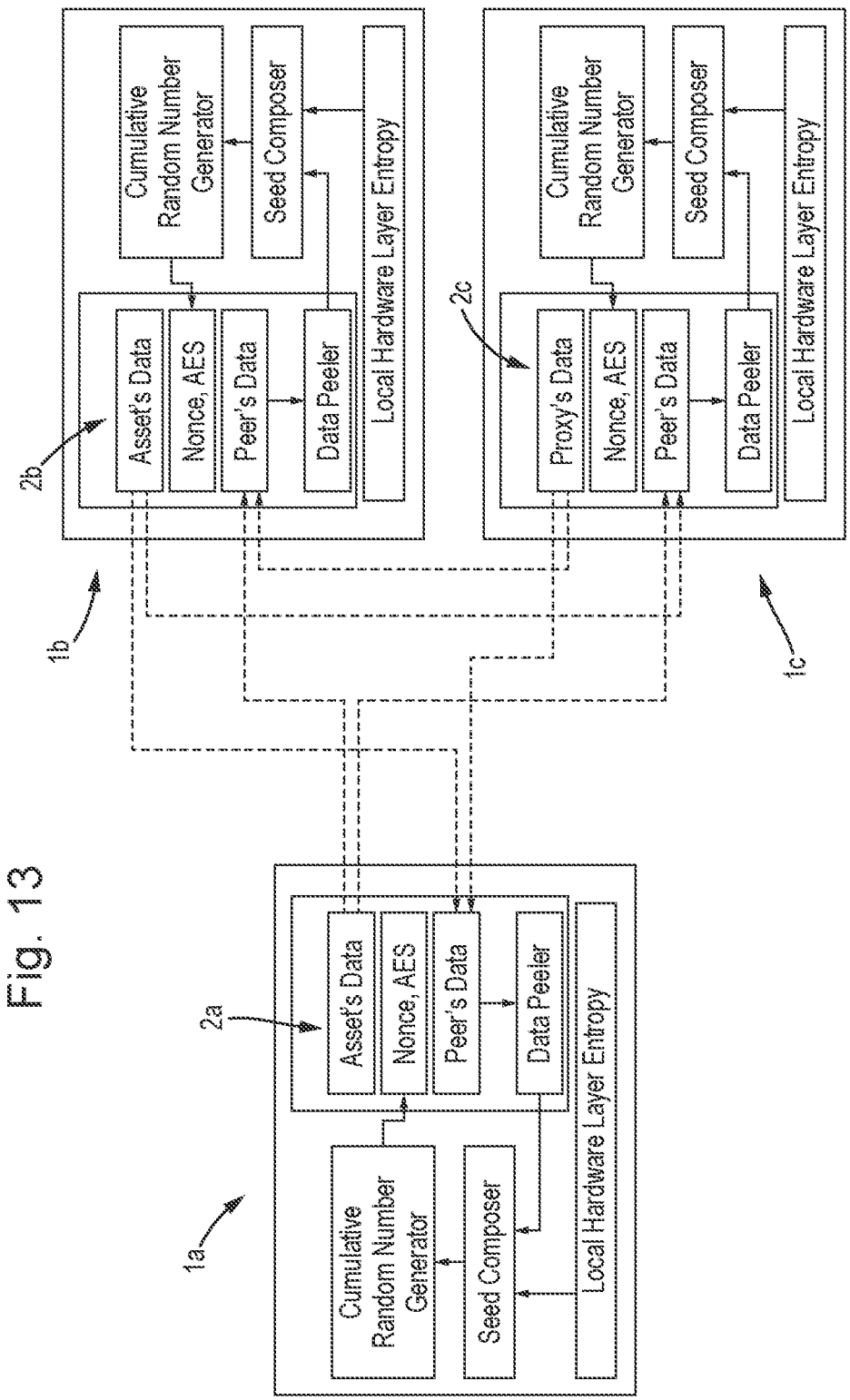
FIG. 13 is a schematic drawing representing the process of random number generation by each of the devices of FIG. 1.

Throughout the authentication process described above, random numbers are generated by each of asset A 1a, asset B 1b and the proxy P 1c. FIG. 13 is a schematic drawing representing the process of random number generation by each of these assets.

Each asset contains a respective asset service 2a, 2b, 2c which stores that asset's data, current nonce and AES key, as represented in FIG. 13. The asset service 2a, 2b, 2c also stores data received from the other assets, as represented by the dashed arrows. A data peeler extracts data from the external data which has been received from the other assets, and passes this to the seed composer as shown. The seed composer combines the value extracted from the external data with a value generated locally on the asset by "local hardware layer entropy". These values are used by the seed composer to in turn seed the cumulative random number generator of the asset, which generates a random number which can be used as described above.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A communication system comprising a first device, a second device, and a third device, wherein:
   the first device comprises a first-device-memory, storing first-device-specific identification data;
   the second device comprises a second-device-memory, storing second-device-specific identification data;
   the first device is configured to receive a copy of the second-device-specific identification data from the second device and to store the copy in the first-device-memory of the first device;
   the second device is configured to receive a copy of the first-device-specific identification data from the first device and to store the copy in the second-device-memory of the second device;
   the first device is configured to derive a first encryption key from the first-device-specific identification data and the received copy of the second-device-specific identification data;
   the second device is configured to derive the first encryption key from the second-device-specific identification data and the received copy of the first-device-specific identification data;
   the first device is configured to encrypt transmission data using the first encryption key and to transmit the encrypted transmission data to the second device;
   the second device is configured to receive the encrypted transmission data from the first device and to decrypt the encrypted transmission data using the first encryption key;
   the third device is configured to communicate at least with the second device and with a remote server, and wherein the third device is trusted by the second device, the third device being arranged and configured to mediate communication between the second device and the first device;
   such that when in a provisioning phase, the third device is configured to communicate at least with the second device and the remote server in order to determine whether the received copy of the first-device-specific identification data corresponds to first-device-specific identification data stored on the remote server,
   wherein the second device is configured not to proceed to derive the first encryption key if the copy of the first-device-specific identification data does not correspond to the first-device-specific identification data stored on the remote server.

2. The communication system of claim 1, wherein the first device is configured to generate a random value, and to send the random value to the second device, and wherein the first and second devices are each configured to use the random value when deriving the first encryption key.

3. The communication system of claim 1, wherein the first device is configured to encrypt and transmit transmission data using the first encryption key during a first time period, and is configured, after the end of the first time period, to generate a subsequent encryption key using the first-device-specific identification data and the second-device-specific identification data, and to encrypt further transmission data using the subsequent encryption key.

4. The communication system of claim 1, configured to perform an authentication process, the authentication process comprising:
   the first device generating first-device-authentication-information from the first-device-specific identification data and an authentication-random-value, and sending the first-device-authentication information and the authentication-random-value to the second device; and
   the second device generating the first-device-authentication information from the copy of the first-device-specific identification data stored in the second-device-memory of the second device, and checking that the first-device-authentication-information generated by the second device matches the first-device-authentication-information received from the first device.

5. The communication system of claim 4, wherein there is no permanent authentication between the first device and the second device.

6. The communication system of claim 1, wherein the first-device-specific identification data and the second-device-specific identification data comprises or is derived from one or more of: a model number, a serial number, a unique ID, a class, an owner, a mission identifier, a hardware unique identifier, a vendor identifier, a customer identifier.

7. The communication system of claim 1, wherein the third device and the second device share a third-device second-device encryption key, and wherein the third-device second-device encryption key is used to encrypt data exchanged between the second device and the third device.

8. The communication system of claim 1, wherein:
   the first device is configured to derive a second encryption key from the first-device-specific identification data and the received copy of the second-device-specific identification data;

the second device is configured to derive the second encryption key from the second-device-specific identification data and the received copy of the first-device-specific identification data;

the second device is configured to encrypt transmission data using the second encryption key and to transmit the encrypted transmission data to the first device; and the first device is configured to receive the encrypted transmission data from the second device and to decrypt the encrypted transmission data using the second encryption key.

9. A method for establishing an encrypted communication link between a first device and a second device in a communication system, the communication system further comprising a third device and a remote server, wherein:

the first device stores first-device-specific identification data;

the second device stores second-device-specific identification data; and the third device is configured to communicate with the second device and with the remote server, and is trusted by the second device, the third device being arranged and configured to mediate communication between the second device and the first device, the first device is configured to receive a copy of the second-device-specific identification data from the second device and to store the copy in a first-device-memory of the first device; and the second device is configured to receive a copy of the first-device-specific identification data from the first device and to store the copy in a second-device-memory of the second device, the method comprising:

the first device deriving a first encryption key from the first-device-specific identification data and the received copy of the second-device-specific identification data;

during a provisioning phase, the third device communicating with the second device and the remote server in order to determine whether the received copy of the first-device-specific identification data corresponds to first-device-specific identification data stored on the remote server; and the second device deriving the first encryption key from the second-device-specific identification data and the received copy of the first-device-specific identification data only if the copy of the first-device-specific identification data received by the second device corresponds to the first-device-specific identification data stored on the remote server, wherein the first device is configured to encrypt transmission data using the first encryption key and to transmit the encrypted transmission data to the second device, and the second device is configured to receive the encrypted transmission data from the first device and to decrypt the encrypted transmission data using the first encryption key.

10. The method of claim 9, further comprising the first device generating a random value, and sending the random value to the second device, wherein the deriving of the first encryption key by the first device uses the random value and the deriving of the first encryption key by the second device uses the random value.

11. The method of claim 9, comprising the first device using the first encryption key to encrypt and transmit transmission data during a first time period, and further comprising, after the end of the first time period, the first device using the first-device-specific identification data and the second-device-specific identification data to generate a subsequent encryption key, and to use the subsequent encryption key to encrypt further transmission data and transmit the encrypted further transmission data to the second device.

12. The method of claim 9, wherein the method comprises performing an authentication process, the authentication process comprising:

the first device generating first-device-authentication-information from the first-device-specific identification data and an authentication-random-value, and sending the first-device-authentication-information and the authentication-random-value to the second device; and the second device generating the first-device-authentication-information from the copy of the first-device-specific identification data stored in the second-device-memory of the second device, and checking that the first-device-authentication-information generated by the second device matches the first-device-authentication-information received from the first device.

13. The method of claim 9, wherein the third device and the second device share a third-device second-device encryption key, and wherein the third-device second-device encryption key is used to encrypt data exchanged between the second device and the third device.

14. The method of claim 9, wherein the first-device-specific identification data and the second-device-specific identification data comprises or is derived from one or more of: a model number, a serial number, a unique ID, a class, an owner, a mission identifier, a hardware unique identifier, a vendor identifier, a customer identifier.

15. The method of claim 9, wherein the encrypted communication link expires such that there is no permanent authentication between the first device and the second device.

16. The method of claim 9, further comprising:

the first device deriving a second encryption key from the first-device-specific identification data and the received copy of the second-device-specific identification data;

the second device deriving the second encryption key from the second-device- specific identification data and the received copy of the first-device-specific identification data;

the second device encrypting transmission data using the second encryption key and transmitting the encrypted transmission data to the first device; and the first device receiving the encrypted transmission data from the second device and decrypting the encrypted transmission data using the second encryption key.

* * * * *